Figure 11:
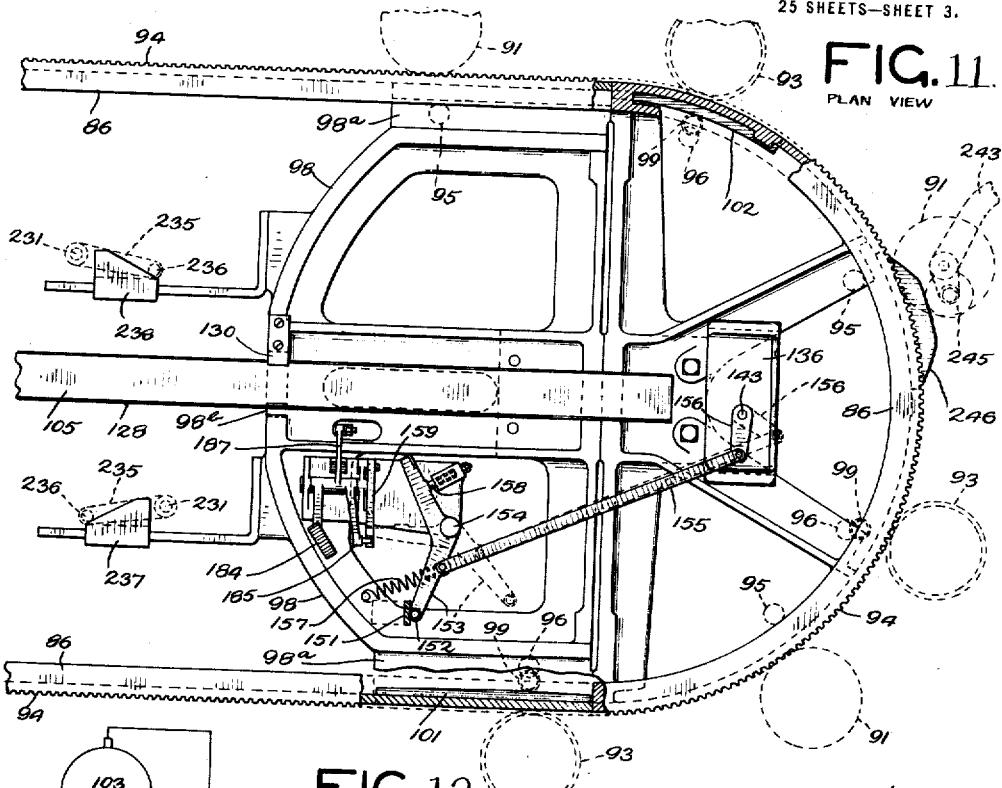

H. D. COLMAN.
WINDER.
APPLICATION FILED NOV. 28, 1916.
1,267,977.
Patented May 28, 1918.
25 SHEETS—SHEET 1.
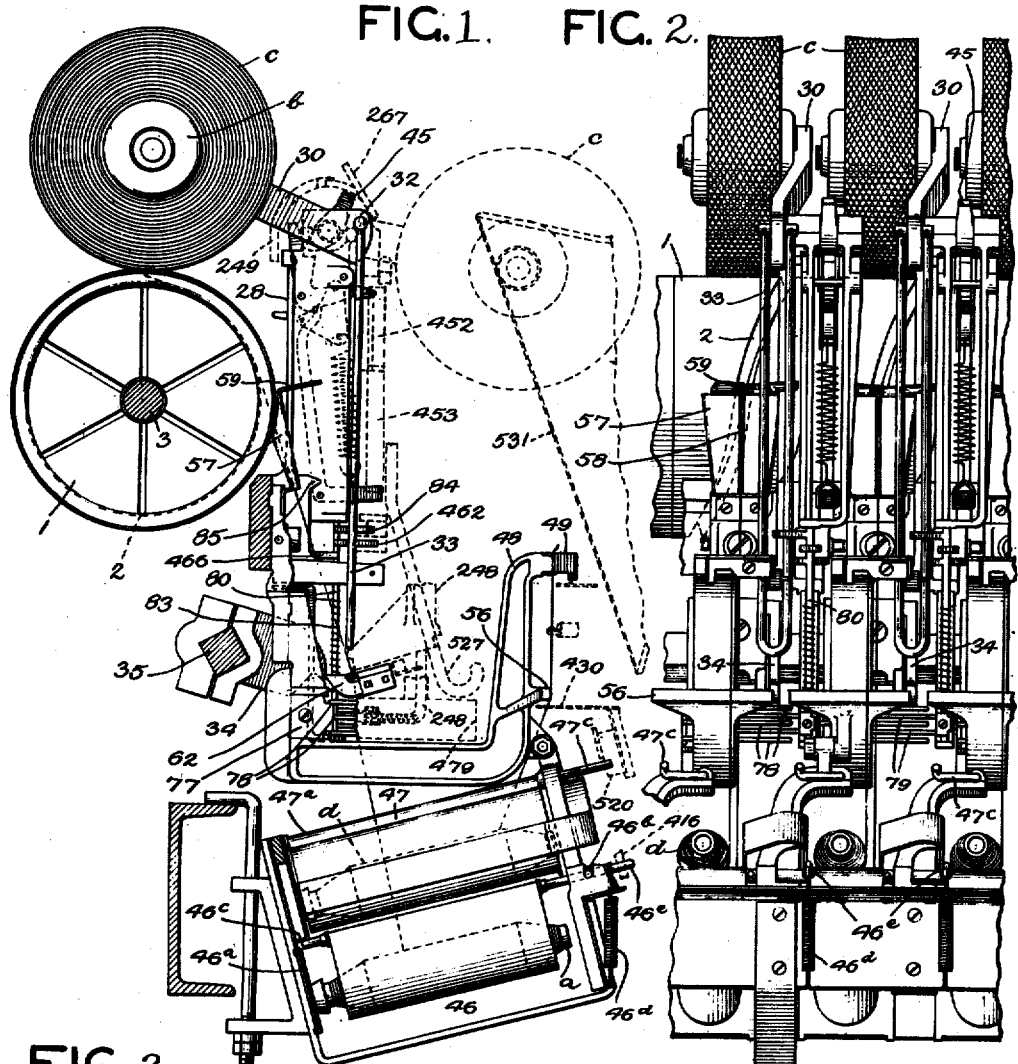
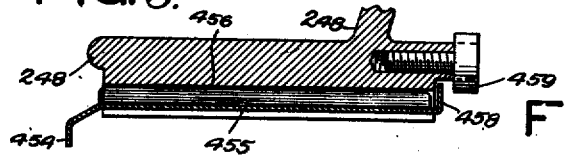
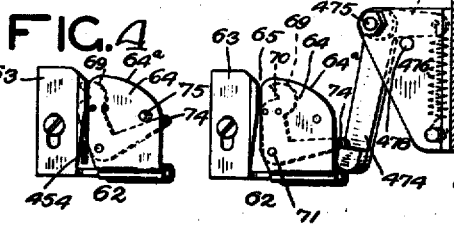
Witnesses:
J. C. Devits
D. L. Chindahl
Inventor:
Howard D. Colman.
By Luther L. Miller
atty.

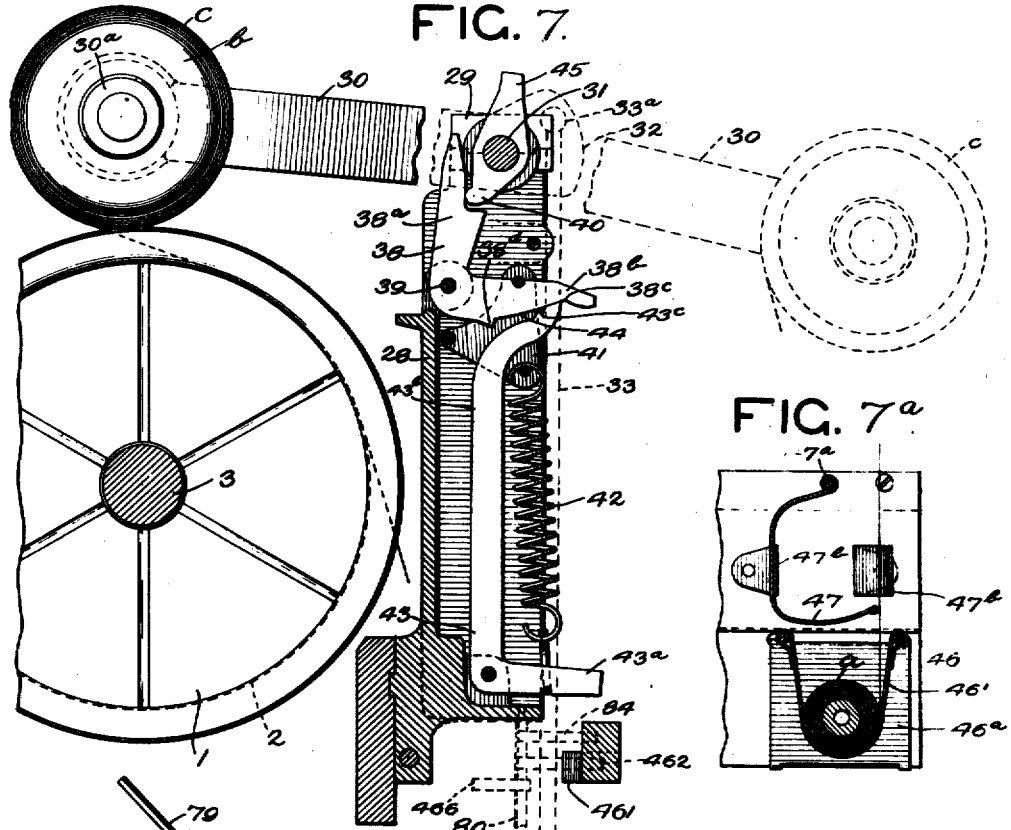

H. D. COLMAN.
WINDER.
APPLICATION FILED NOV. 28, 1916.

1,267,977.

Patented May 28, 1918.
25 SHEETS—SHEET 3.

PLAN VIEW

Witnesses:
J. C. Devick.
G. L. Chindahl

Inventor:
Howard D. Colman.
By Luther L. Miller
Atty.

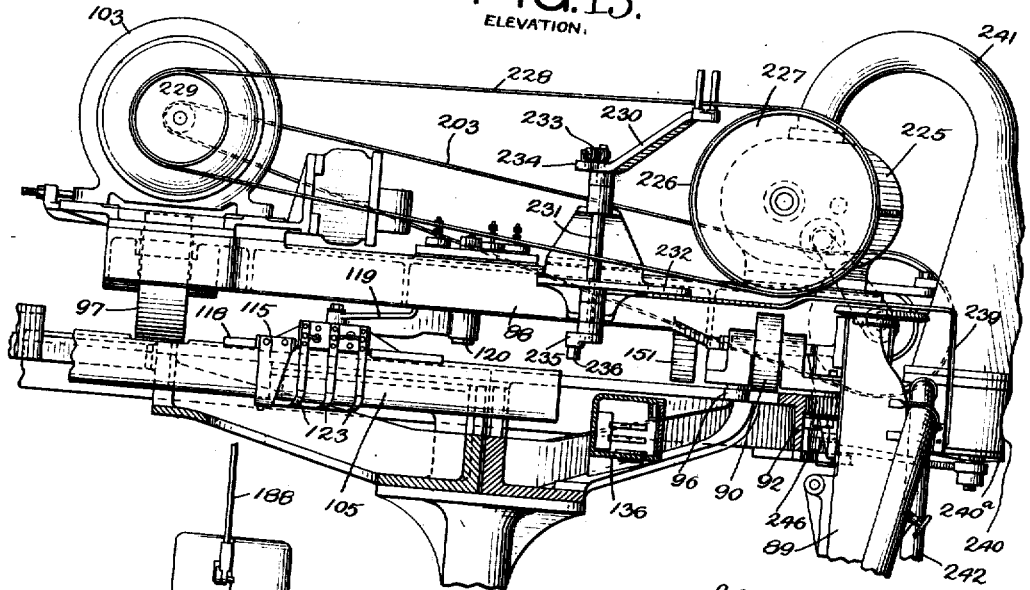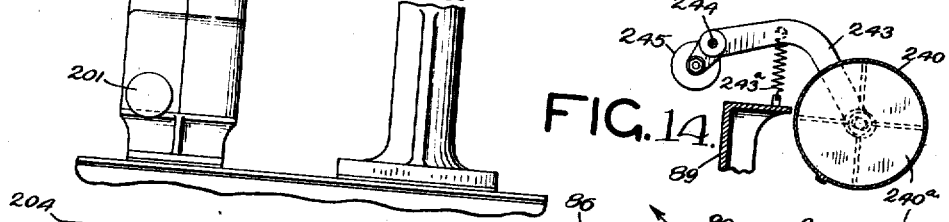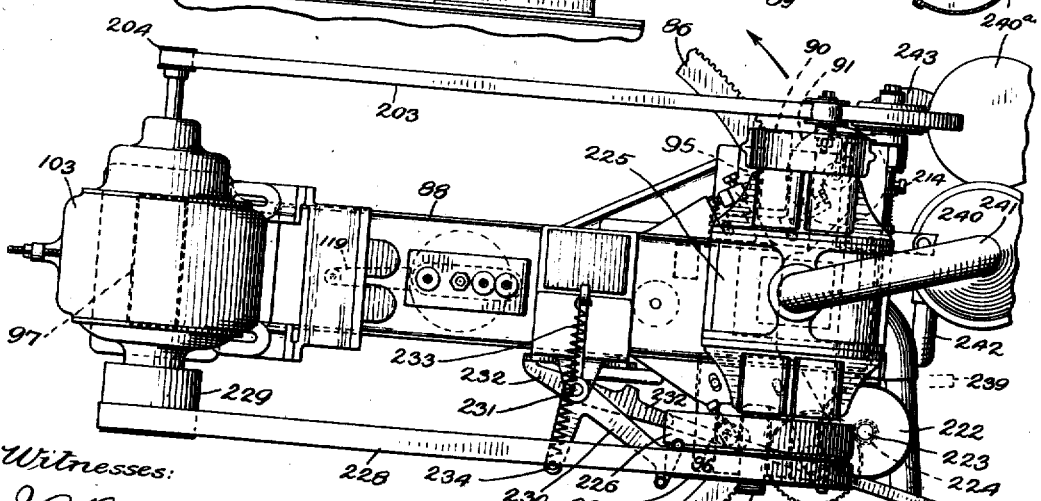

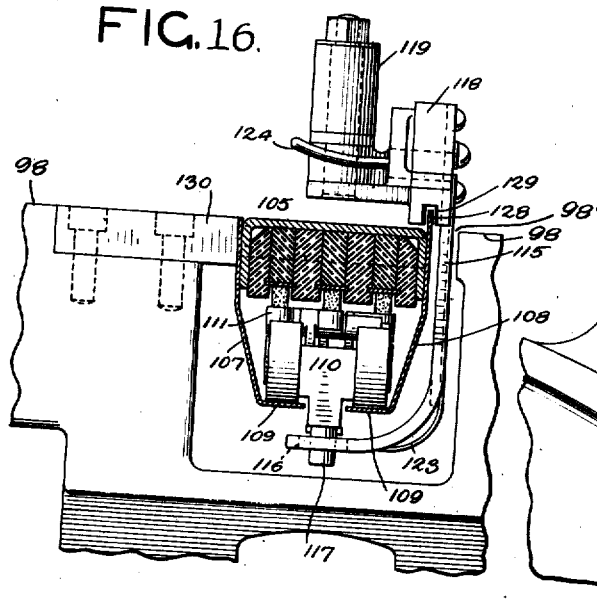
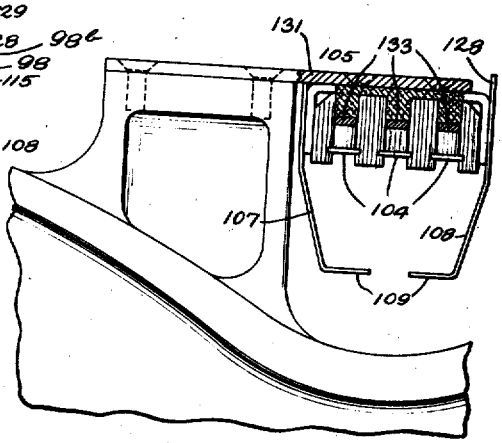
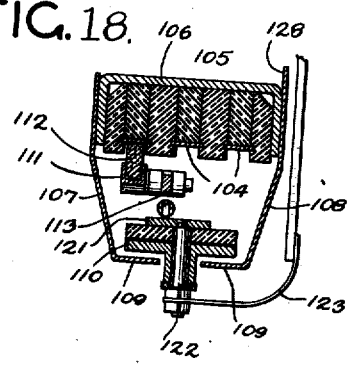
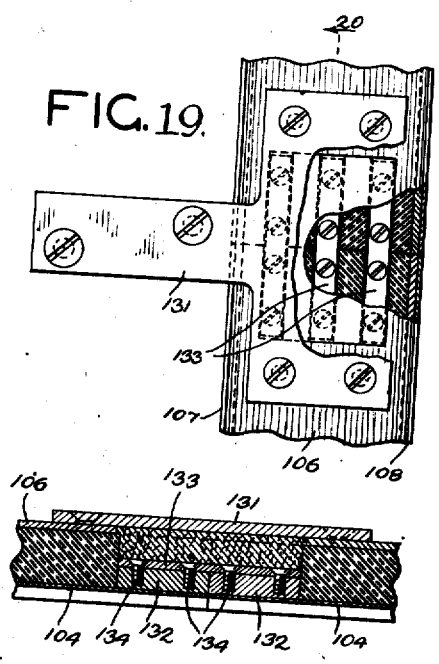
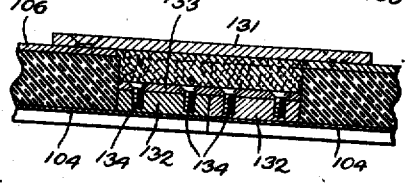

H. D. COLMAN.
WINDER.
APPLICATION FILED NOV. 28, 1916.

1,267,977.

Patented May 28, 1918.
25 SHEETS—SHEET 6.

Witnesses:
J. C. Devick.
G. L. Chindahl.

Inventor:
Howard D. Colman.
By Luther L. Miller
atty.

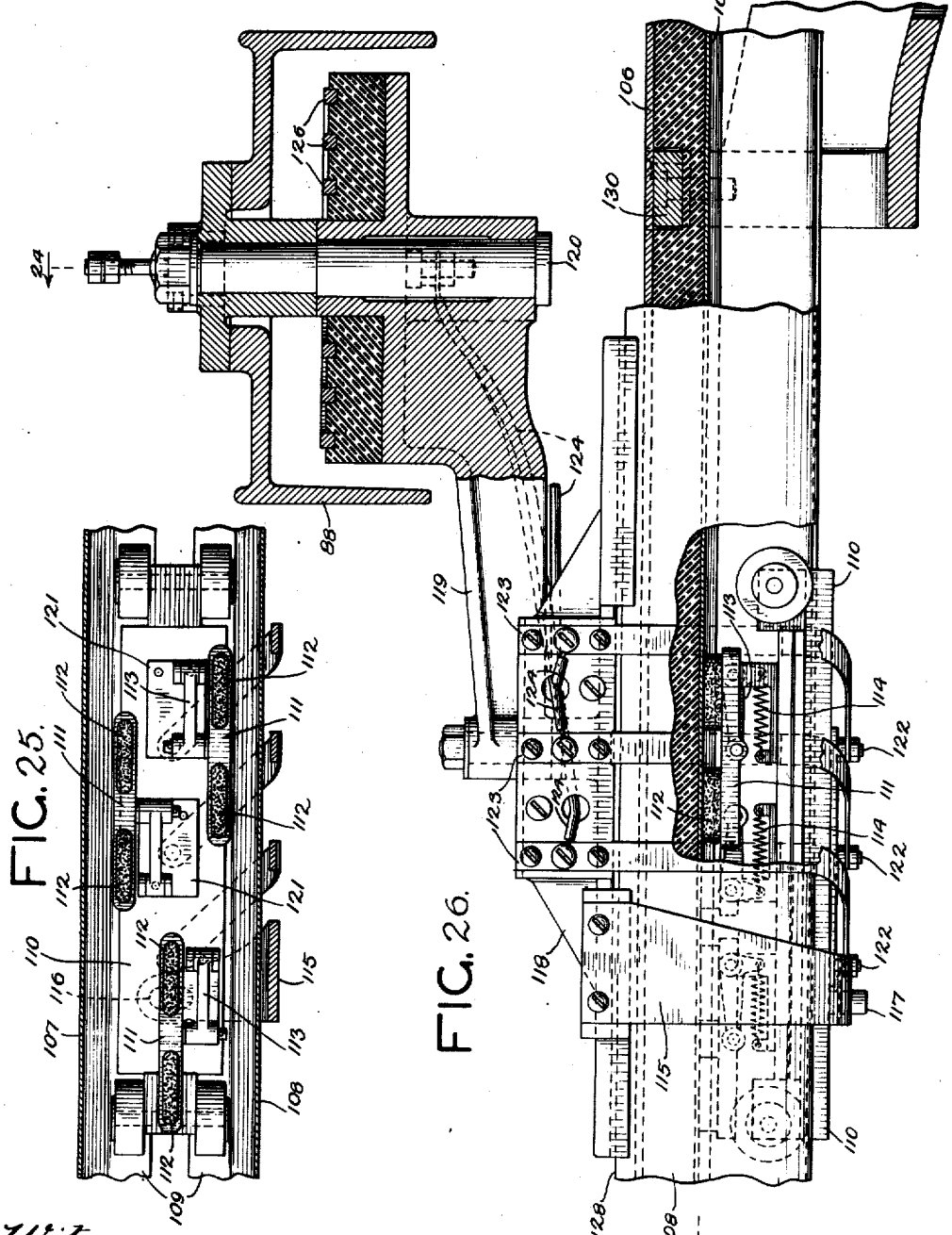

H. D. COLMAN.
WINDER.
APPLICATION FILED NOV. 28, 1916.

1,267,977.

Patented May 28, 1918.
25 SHEETS—SHEET 8.

Witnesses:
J. C. Devik.
G. L. Chindahl

Inventor:
Howard D. Colman.
By Luther L. Miller
Atty.

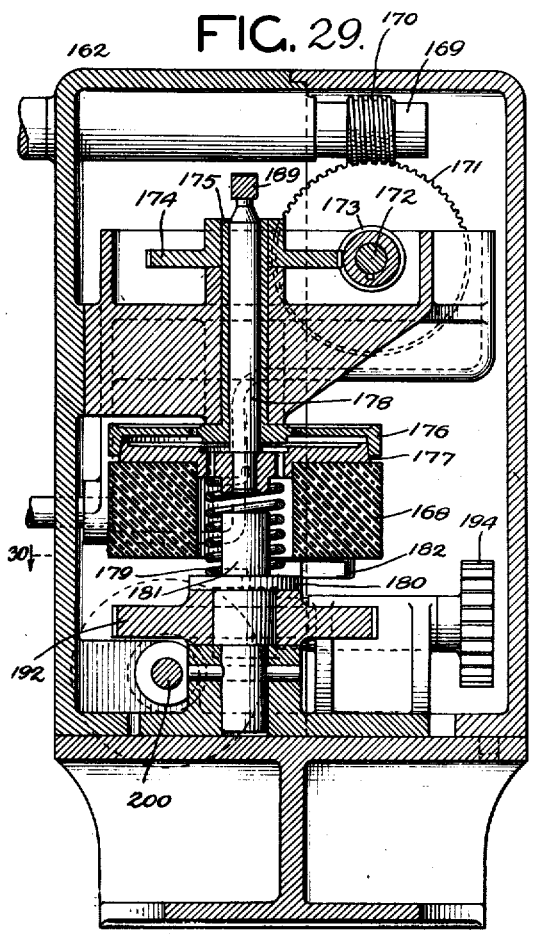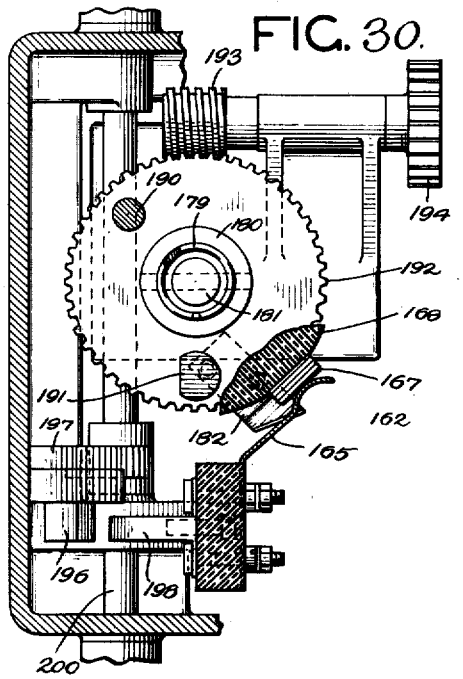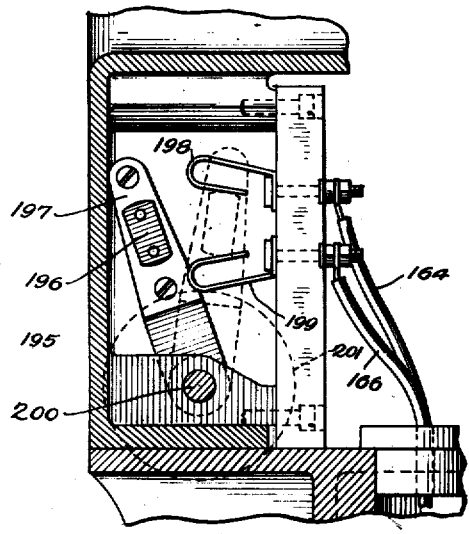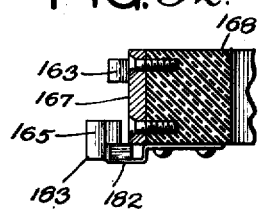

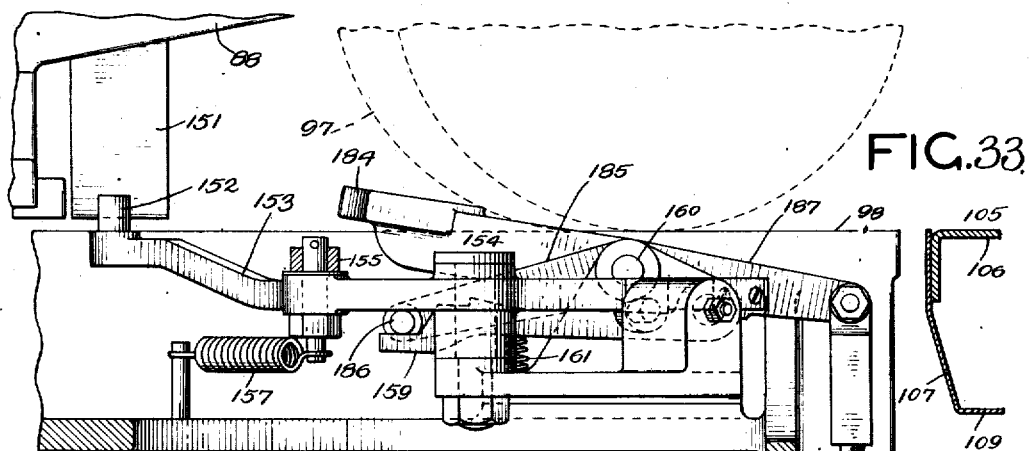
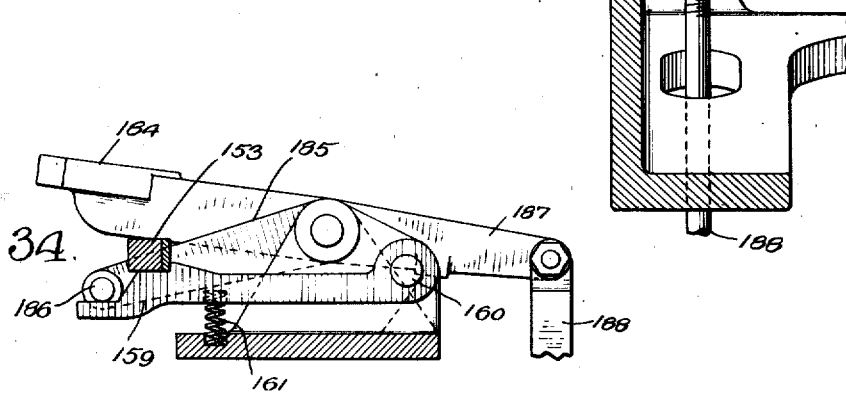
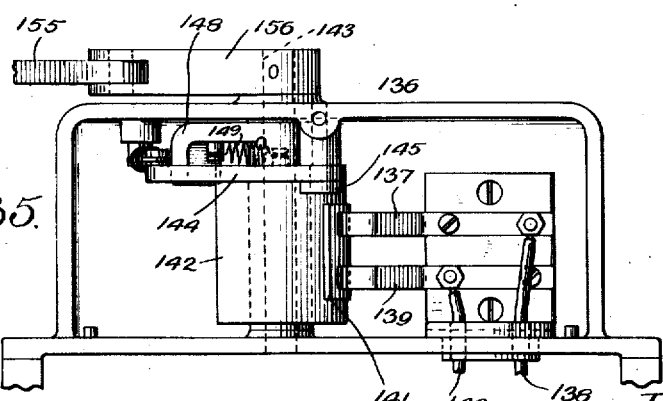

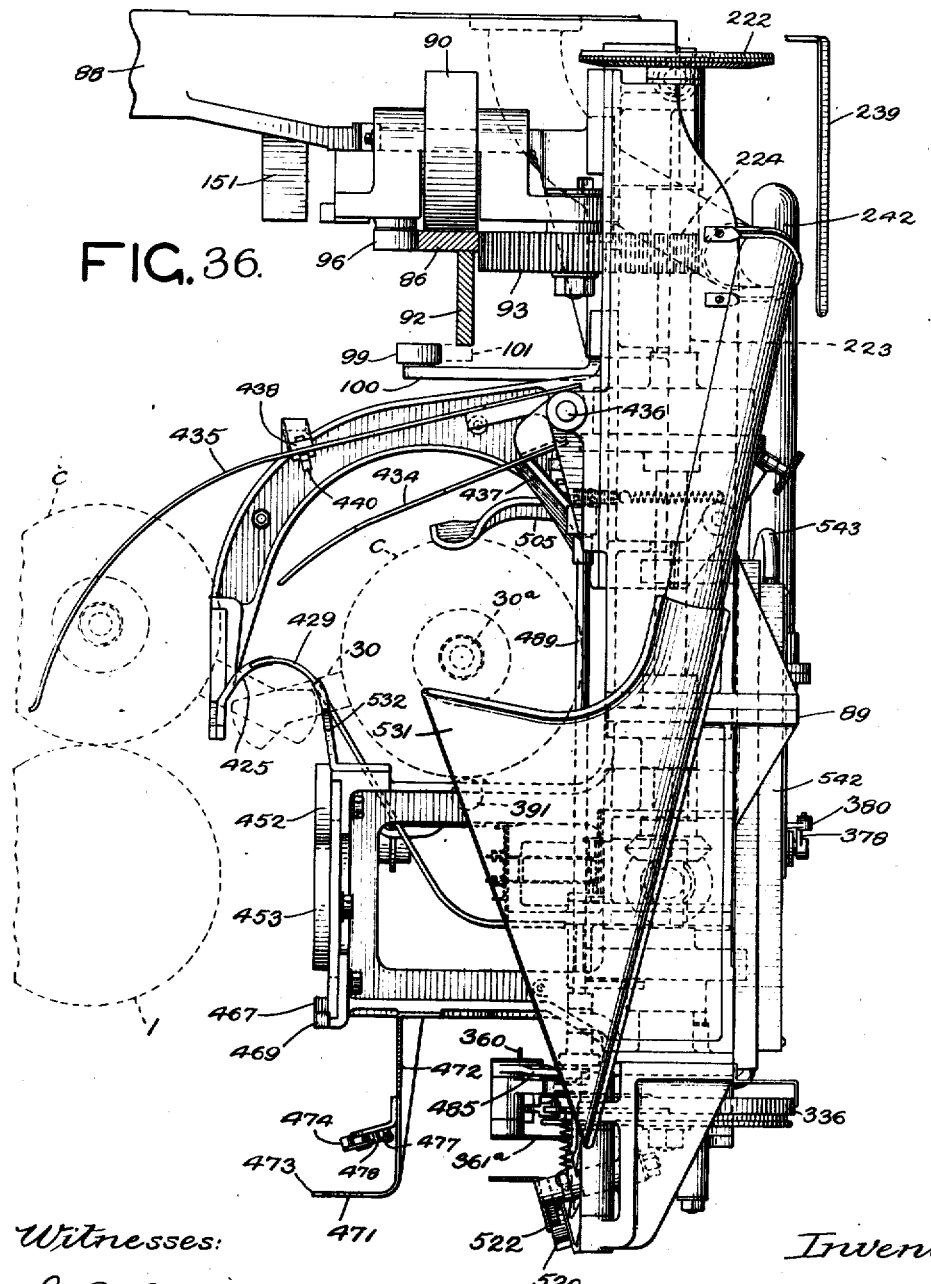

H. D. COLMAN.
WINDER.
APPLICATION FILED NOV. 28, 1916.

1,267,977.

Patented May 28, 1918.
25 SHEETS—SHEET 12.

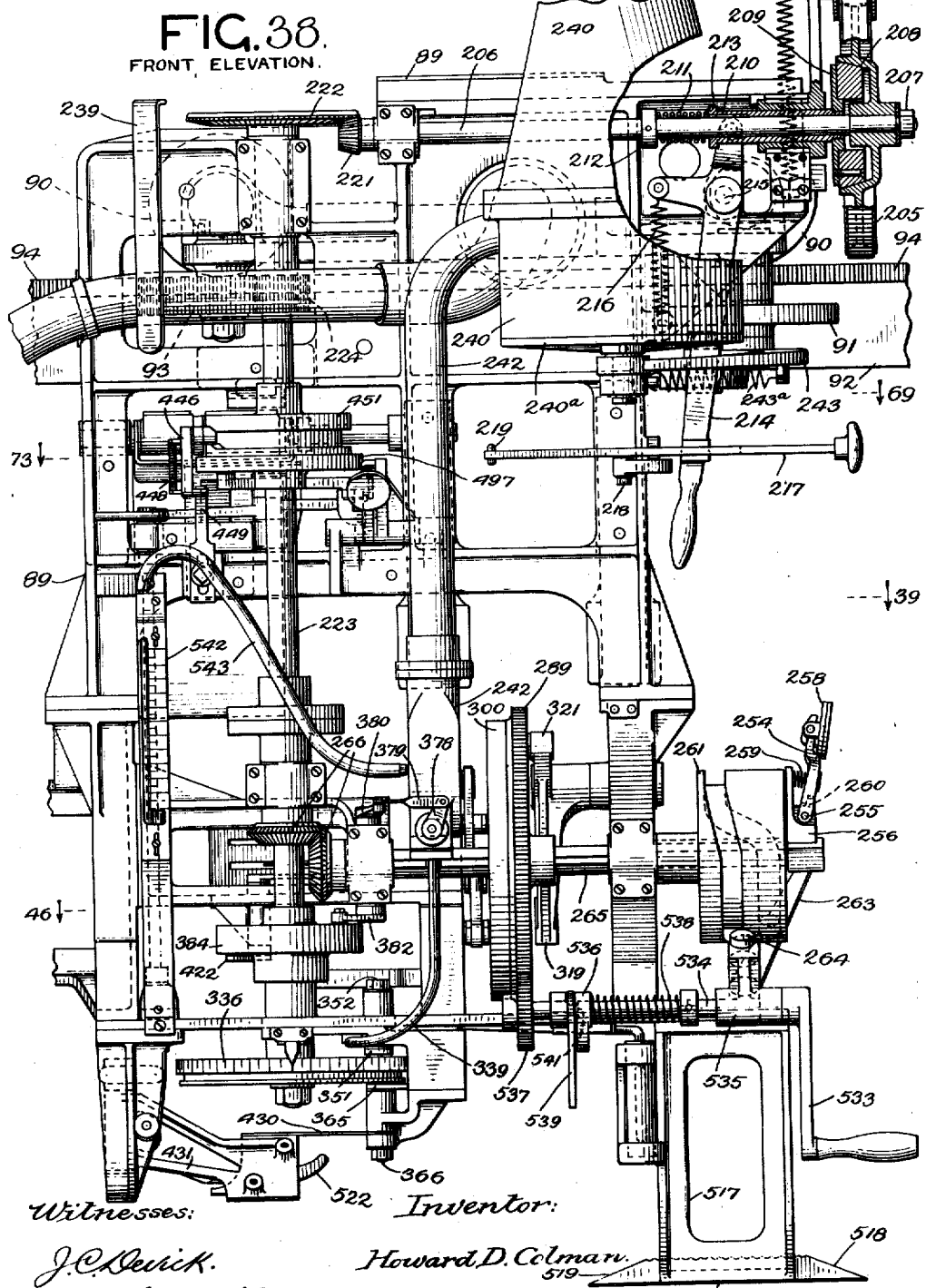

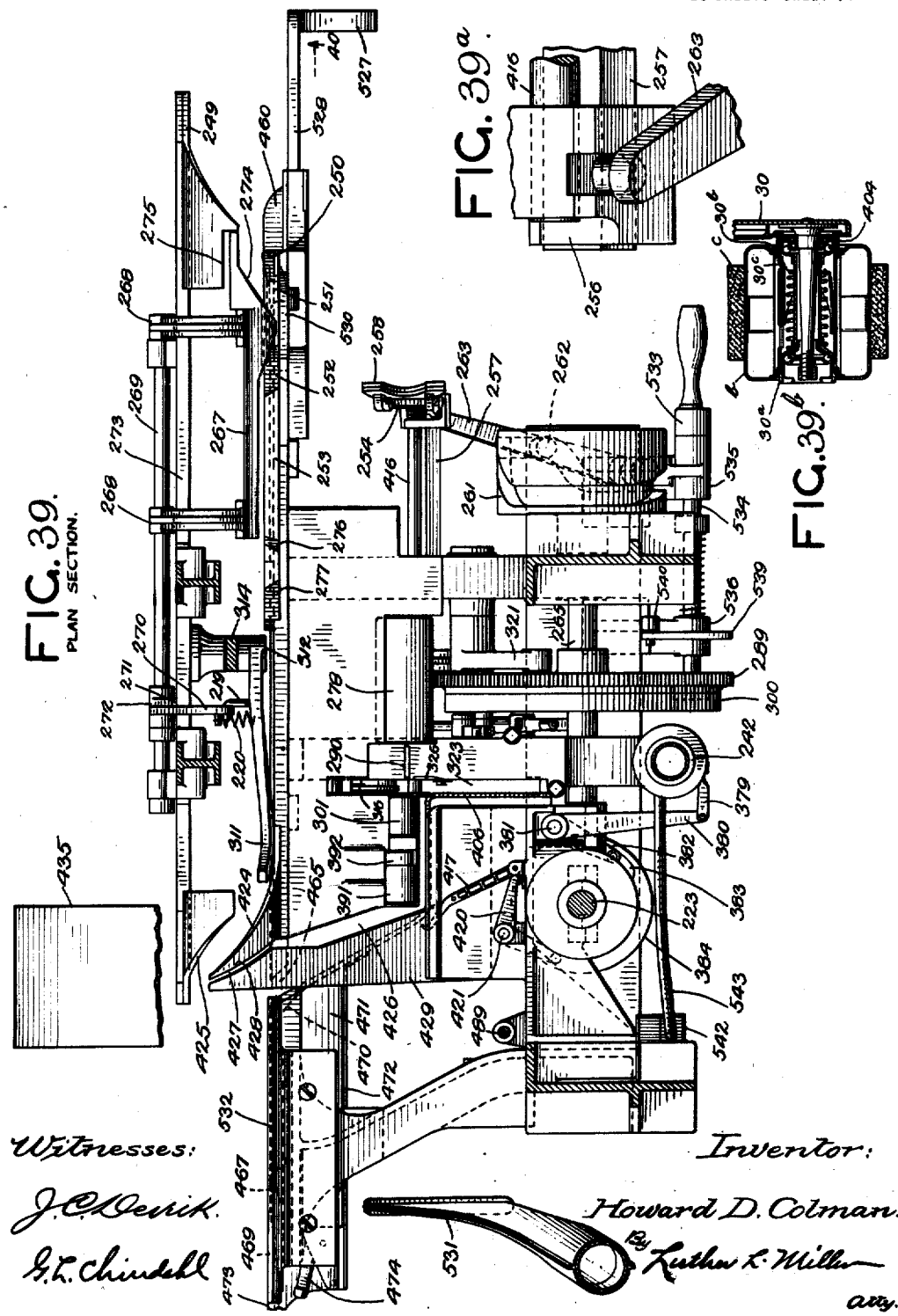

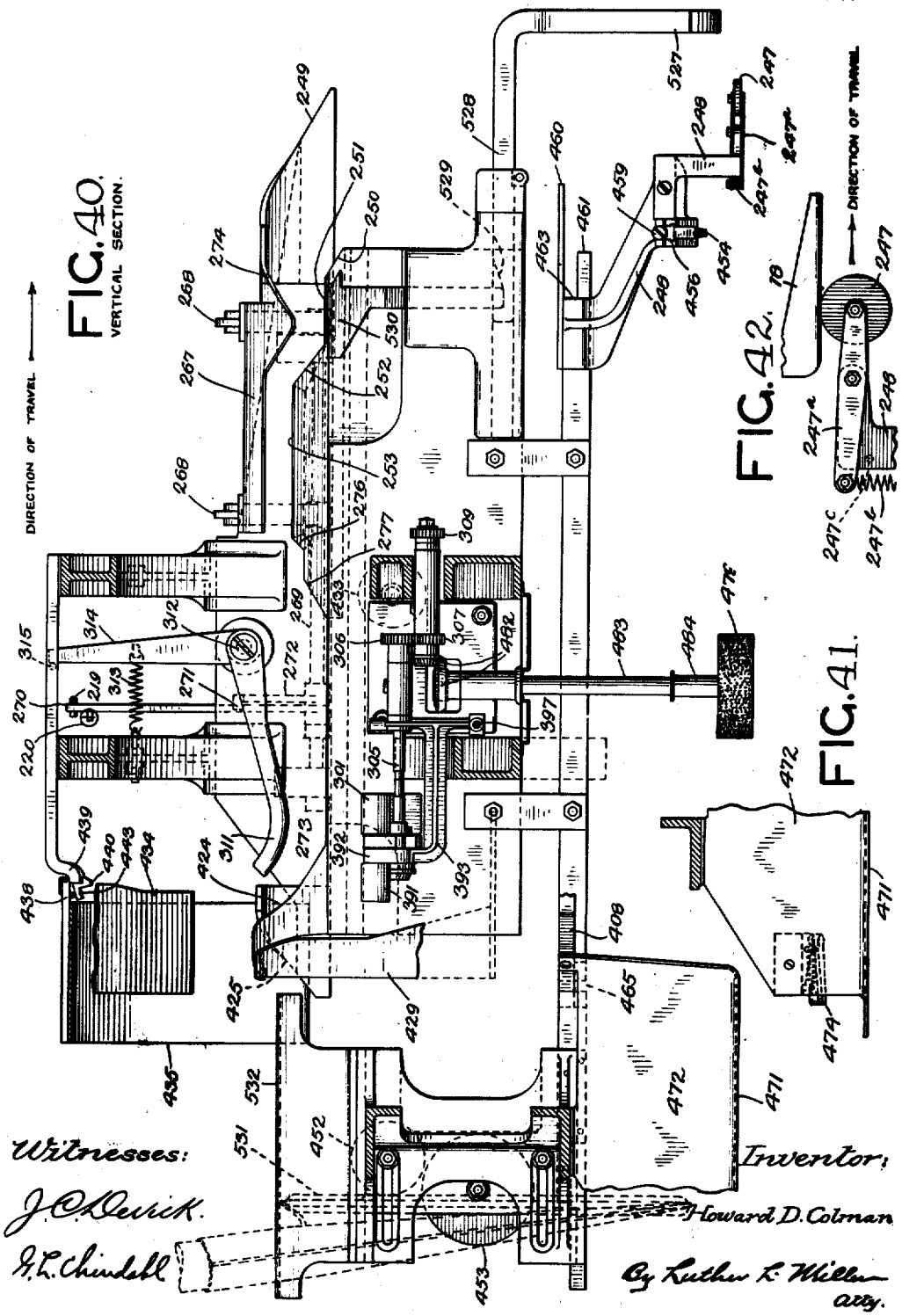

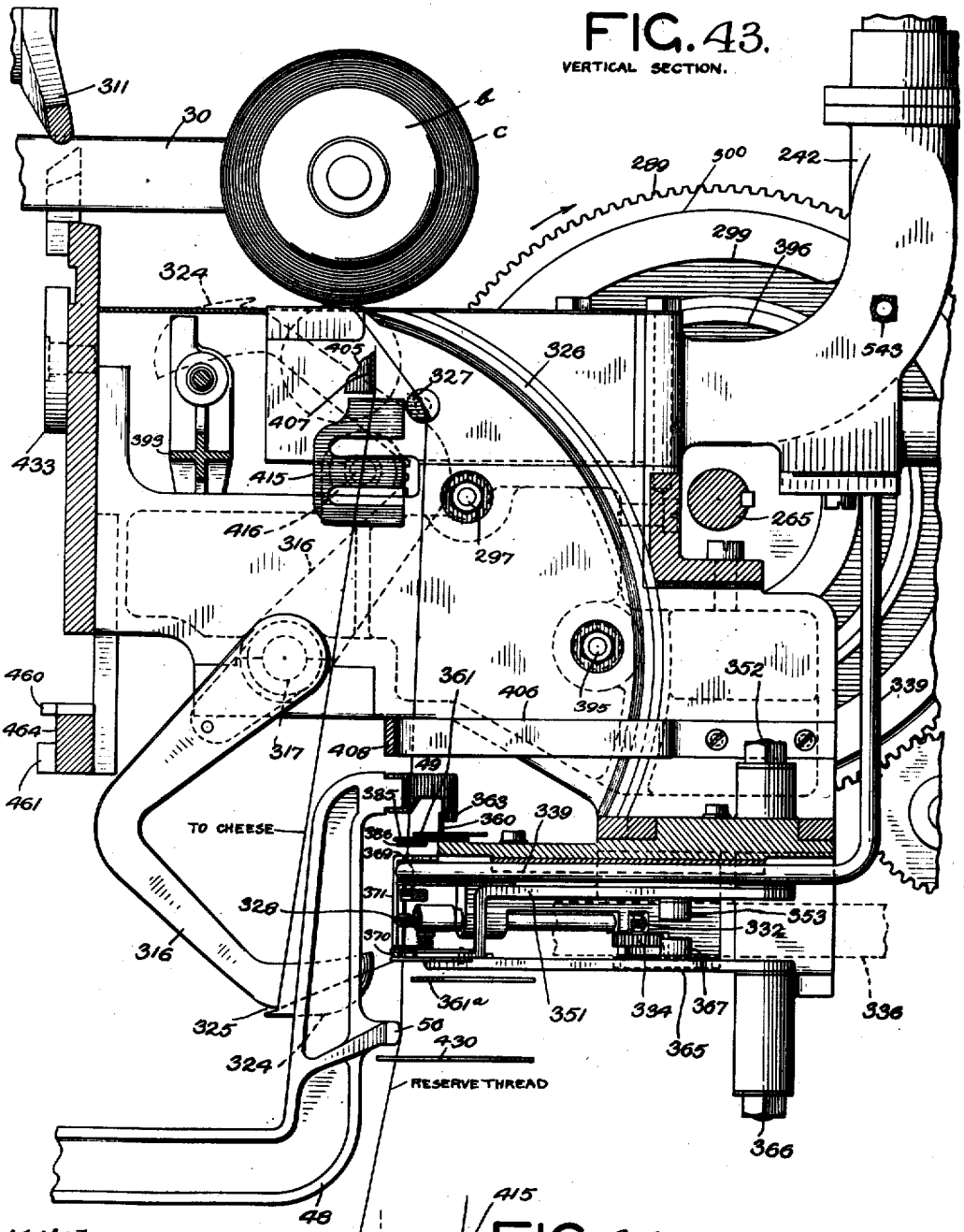

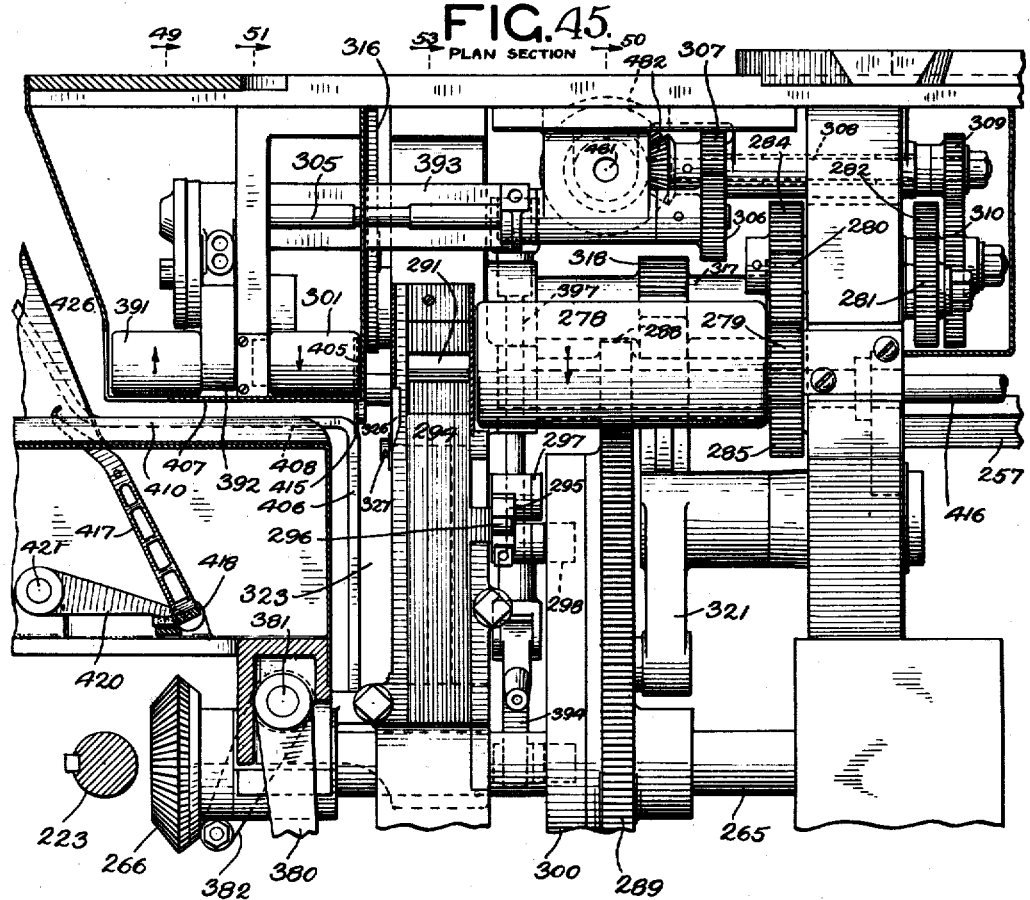
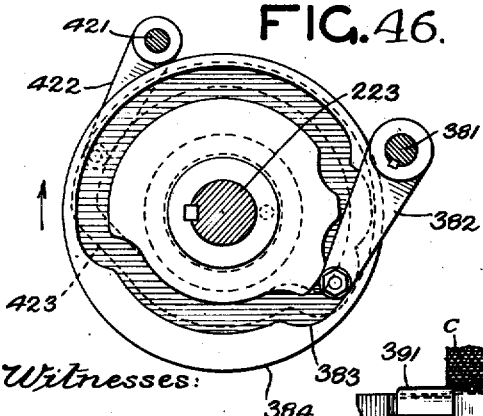
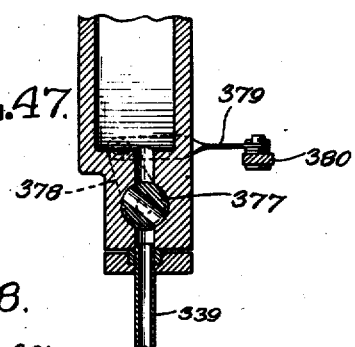
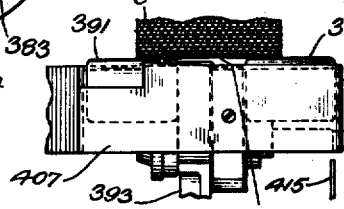

H. D. COLMAN.
WINDER.
APPLICATION FILED NOV. 28, 1916.

1,267,977.

Patented May 28, 1918.

25 SHEETS—SHEET 19.

Witnesses:
J. C. Devick.
G. L. Chindall.

Inventor:
Howard D. Colman.
By Luther L. Miller
atty.

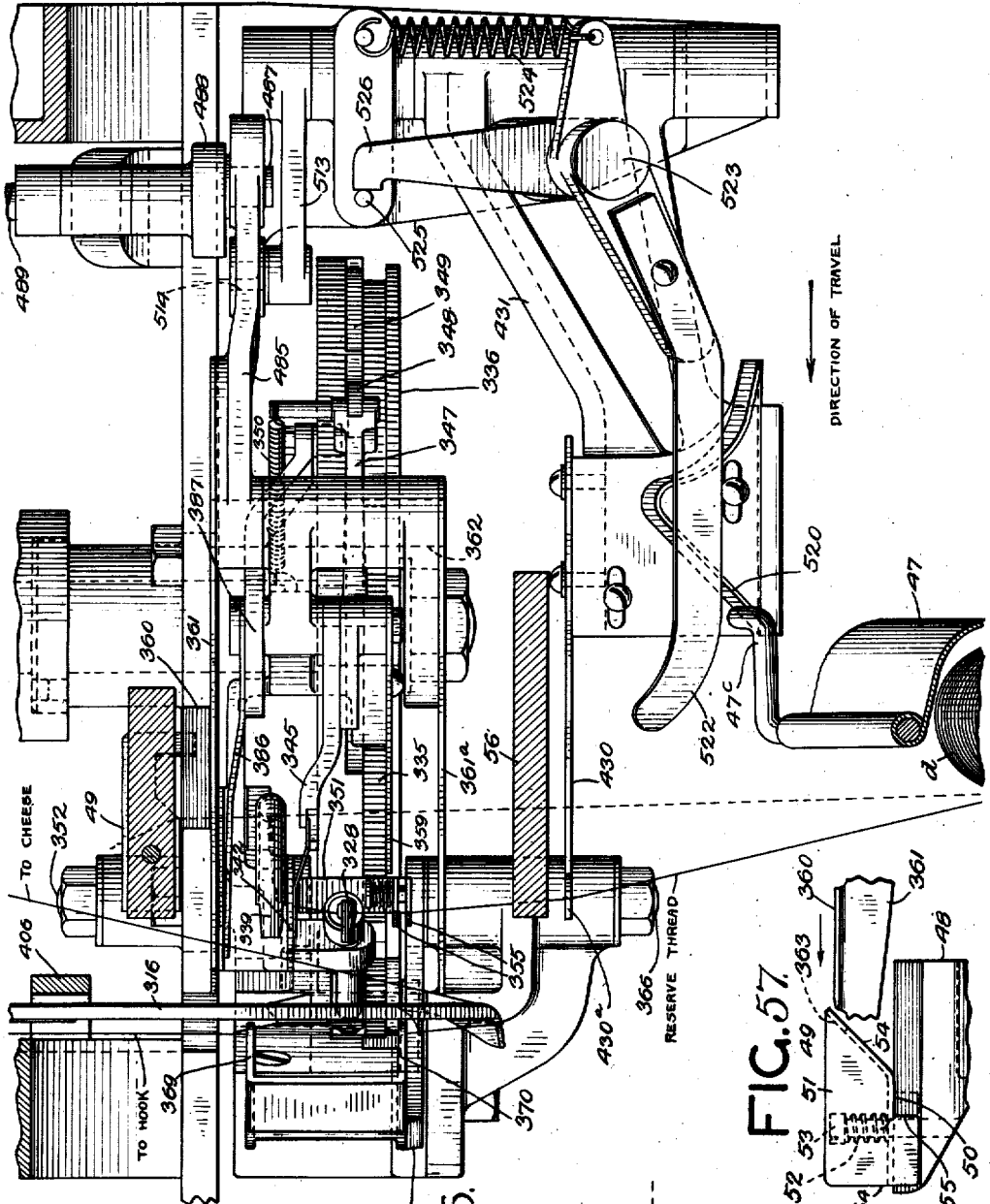

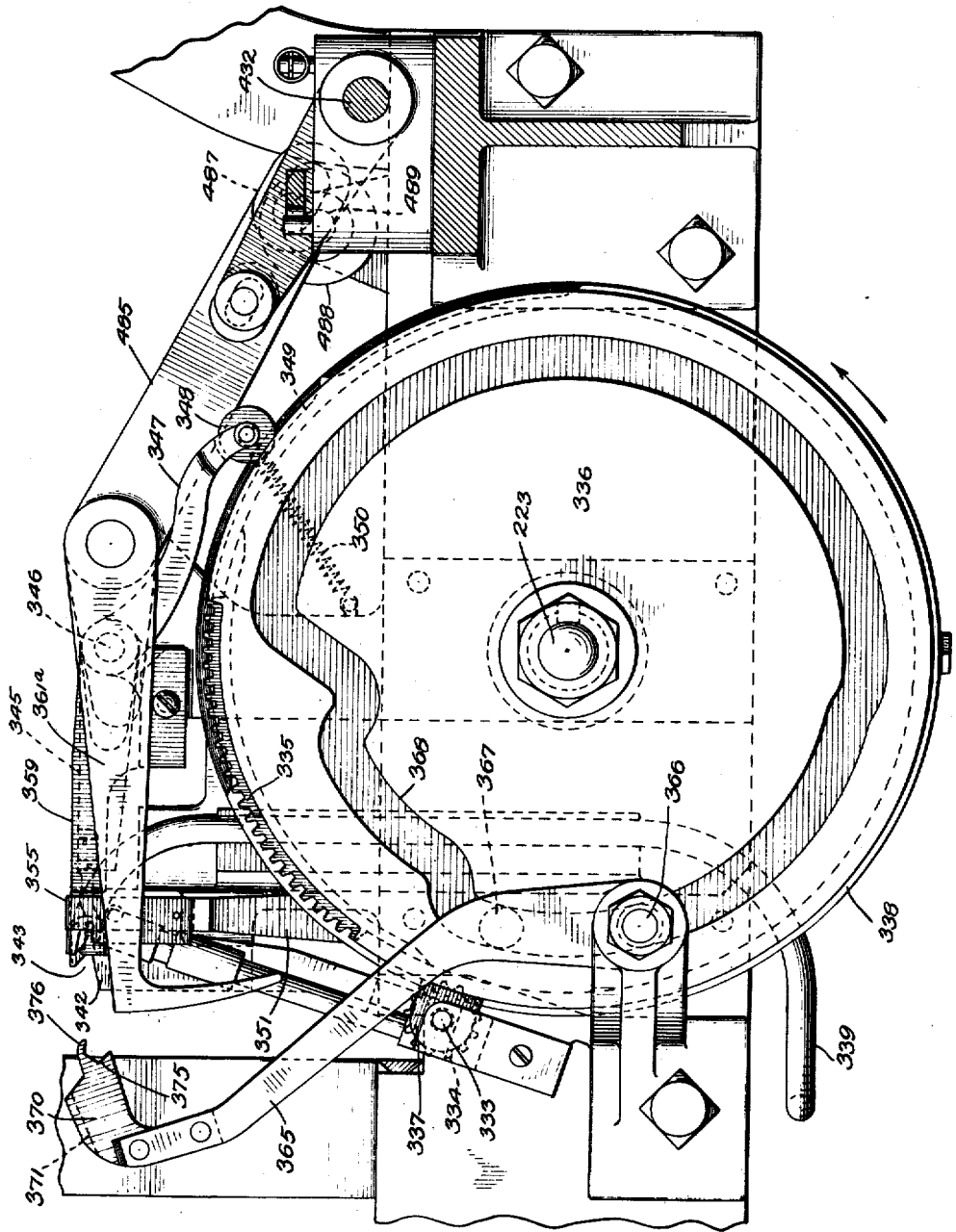

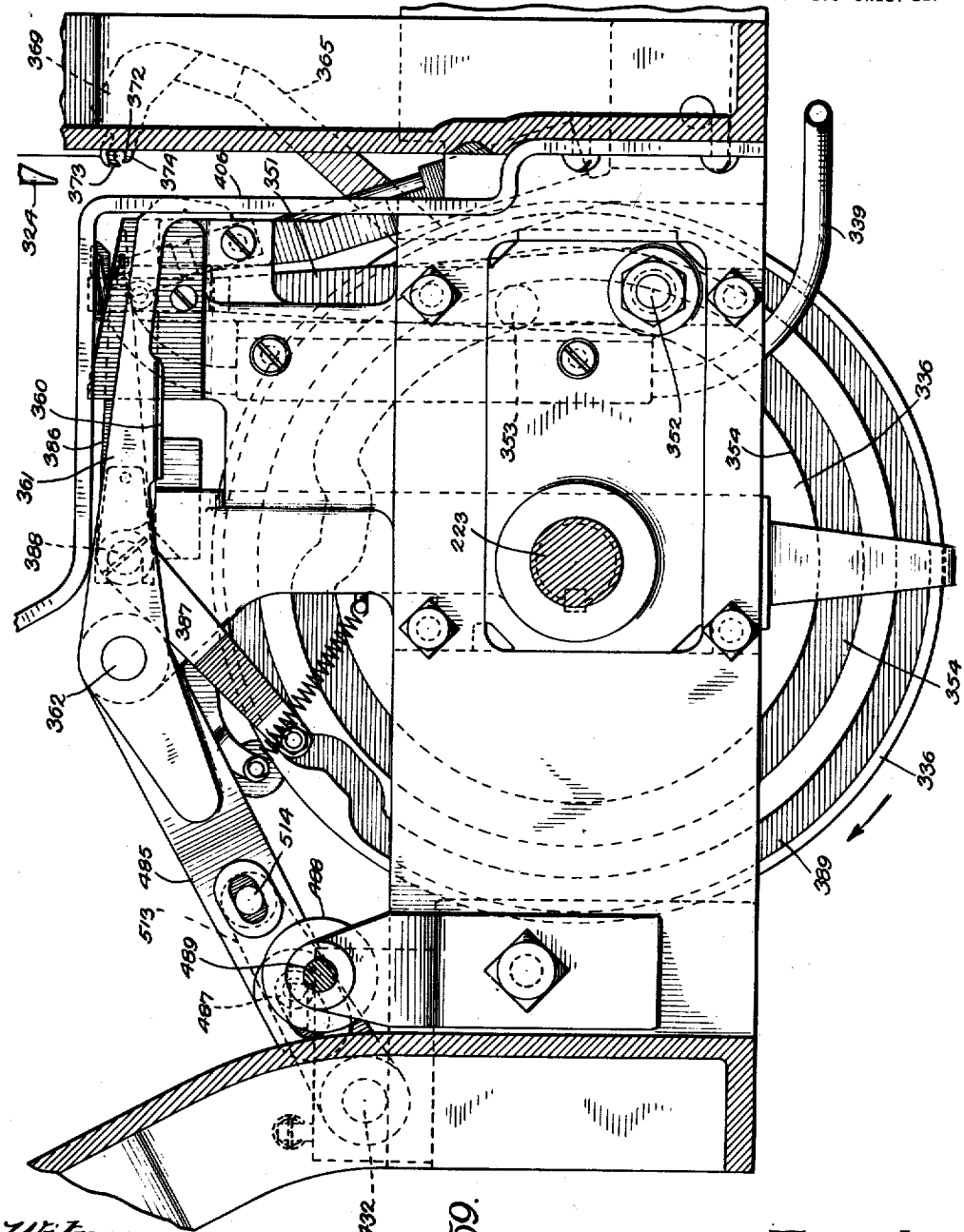

H. D. COLMAN.
WINDER.
APPLICATION FILED NOV. 28, 1916.
1,267,977.
Patented May 28, 1918.
25 SHEETS—SHEET 23.
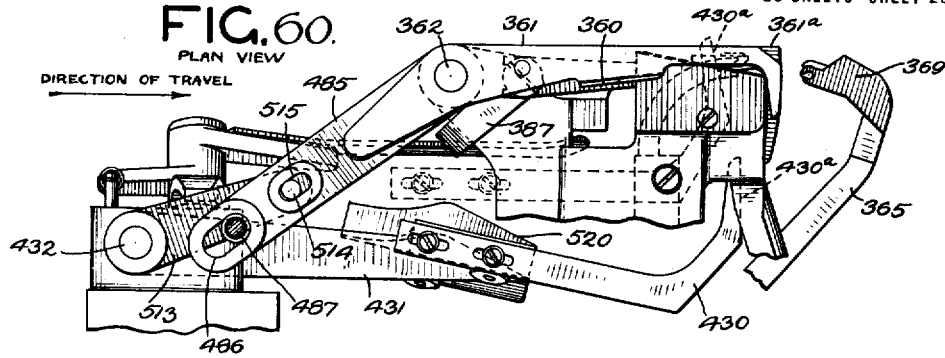
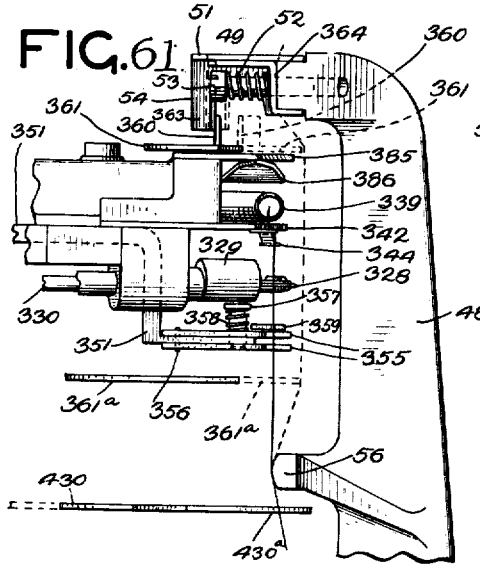
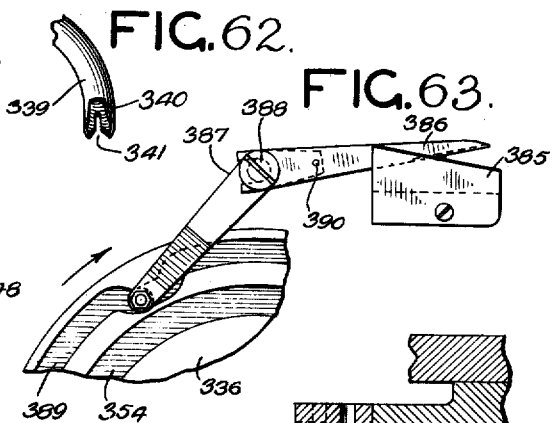
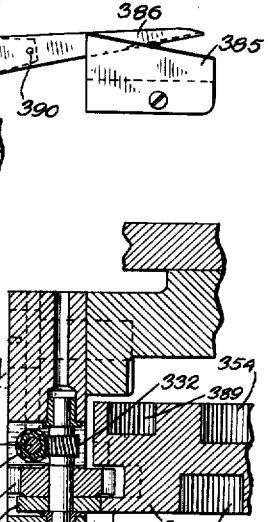
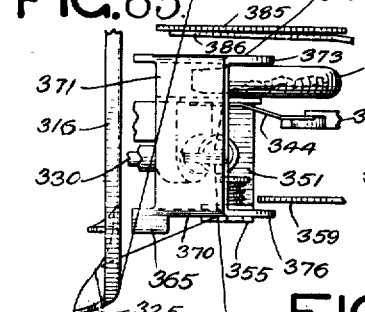
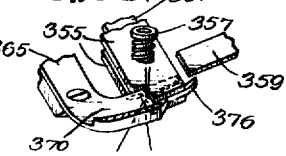

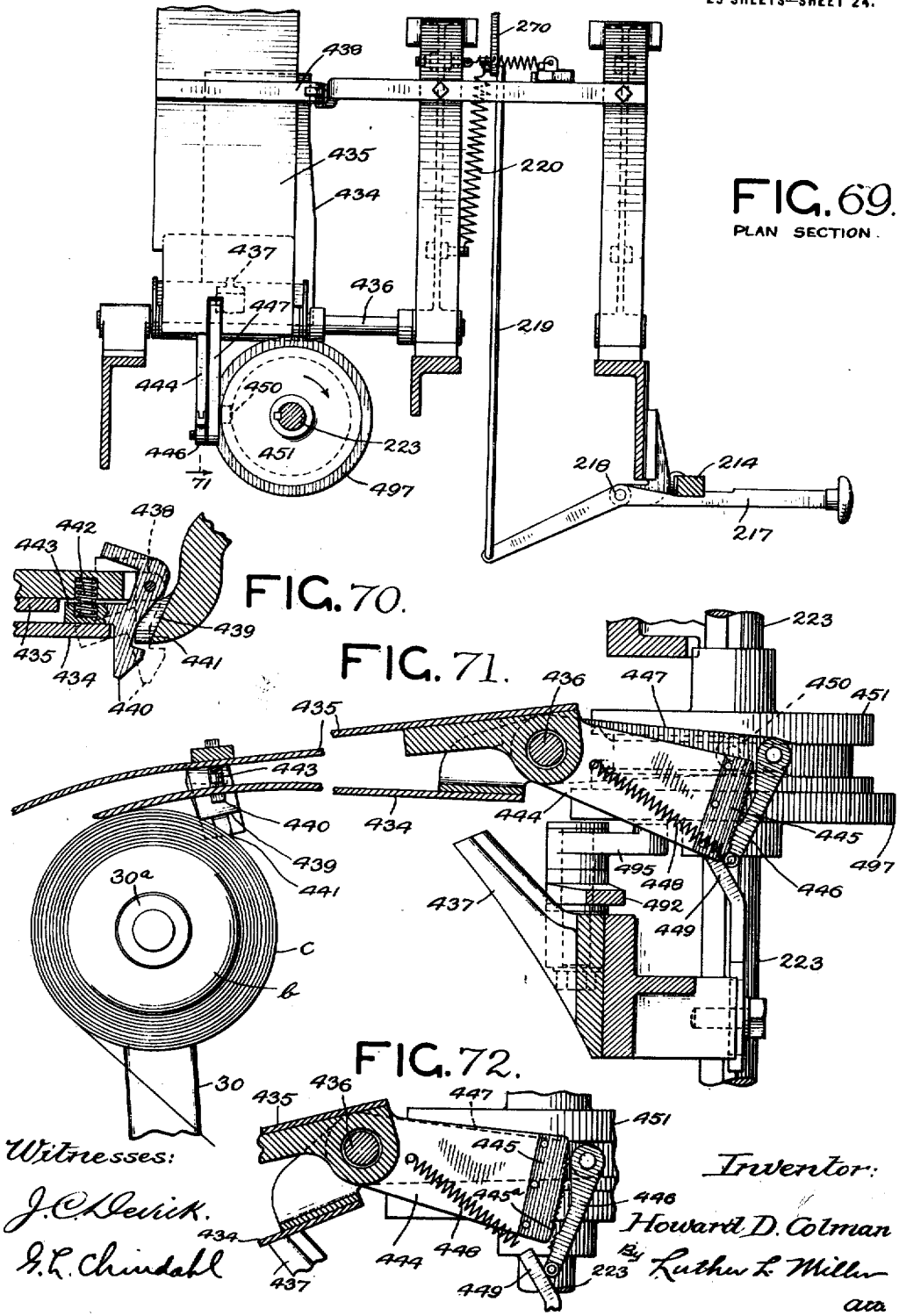

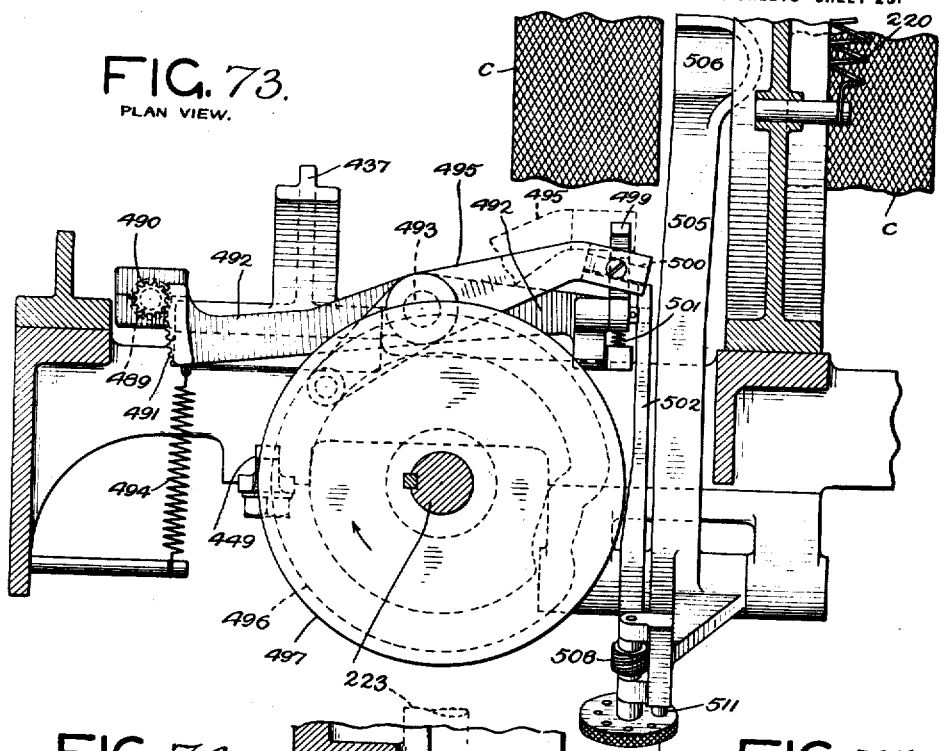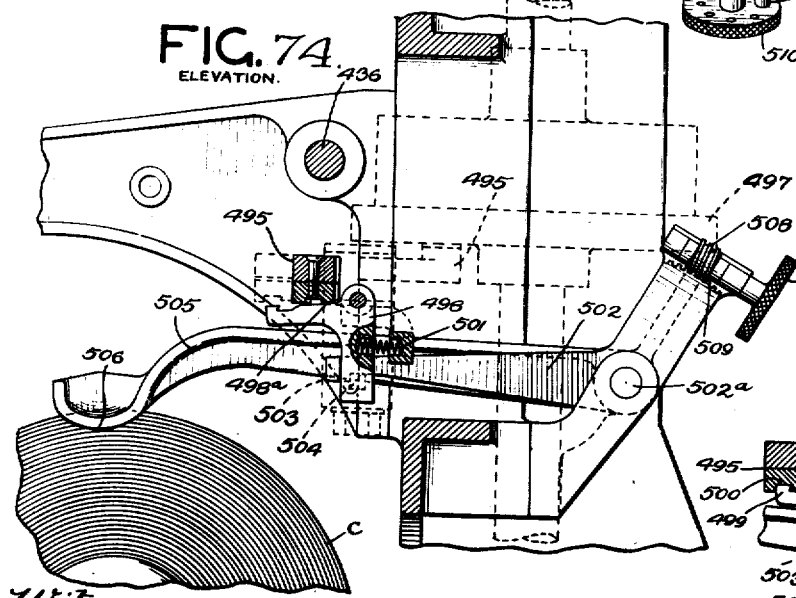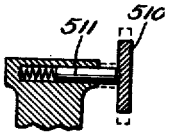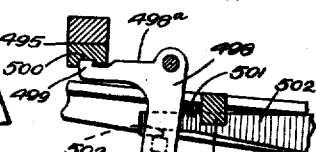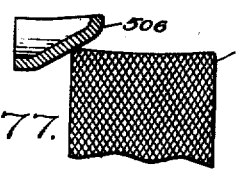

UNITED STATES PATENT OFFICE.

HOWARD D. COLMAN, OF ROCKFORD, ILLINOIS, ASSIGNOR TO HOWARD D. COLMAN, LUTHER L. MILLER, AND HARRY A. SEVERSON, COPARTNERS TRADING AS BARBER-COLMAN COMPANY, OF ROCKFORD, ILLINOIS.

WINDER.

1,267,977.   Specification of Letters Patent.   Patented May 28, 1918.

Continuation in part of application Serial No. 809,797, filed December 31, 1913. This application filed November 28, 1916. Serial No. 133,981.

*To all whom it may concern:*

Be it known that I, HOWARD D. COLMAN, a citizen of the United States, residing at Rockford, in the county of Winnebago and State of Illinois, have invented certain new and useful Improvements in Winders, of which the following is a specification.

This invention relates to machines for winding yarn from bobbins to spools or cheese cores, and in some respects has particular reference to winders which are provided with a winder-tending mechanism arranged to travel along the sides of the winder.

One of the objects of this invention is to provide means whereby the travel of the winder-tending mechanism may be controlled in accordance with the length of time required to unwind bobbins of different characteristics.

Another object of the invention is to provide means for automatically suspending the operation of the air-current-creating means comprised in the winder-tending mechanism at such times as the air-current-creating means is not needed.

A further object of the invention is to provide improved means for paying out the exhausted thread to the arm that carries said thread to the knot-tying mechanism.

A further object of the invention is to provide improved means for preventing the thread from slipping off the periphery of the cheese while the thread is being operated upon by the winder-tending mechanism.

A further object of the invention is to provide an exhaust air duct or conduit of such form as to improve the hold upon the thread drawn into said conduit.

A further object is to provide means on the winder-tending mechanism for insuring that the cheese is properly positioned and locked on its supporting member.

A further object is to provide improved means for preventing the cheeses from unwinding while they are being placed in operative position.

A further object is to provide improved means for shearing the yarn in case the end-finder picks up a coil of yarn in addition to the loose end.

A further object is to provide means for opening, cleaning and closing the yarn-cleaners on the winder.

A further object is to provide means for discharging the spent bobbins from the bobbin-holders.

A further object is to provide means for discharging the reserve bobbins from the reserve-bobbin supports to the bobbin-holders.

A further object is to provide means for gaging the cheeses and for throwing out of operation those cheeses which have reached the desired size.

A further object is to provide means for preventing a reserve thread from being tied to a full cheese.

A further object is to provide means for preventing the reserve bobbin from being discharged into the bobbin-holder if the chees of that particular unit has reached the desired diameter.

A further object is to provide means for breaking the thread of a unit in case the thread has not exhausted by the time the winder-tending mechanism reaches it.

A further object is to provide means for brushing pieces of yarn from the detectors of the winder units.

A further object is to provide means for blowing lint and dust from the winder units.

A further object is to provide means for stopping the travel of the winder-tending mechanism in the event that said mechanism meets with some obstruction.

The invention also relates to various other features of improvement in automatic winders.

Figure 12:
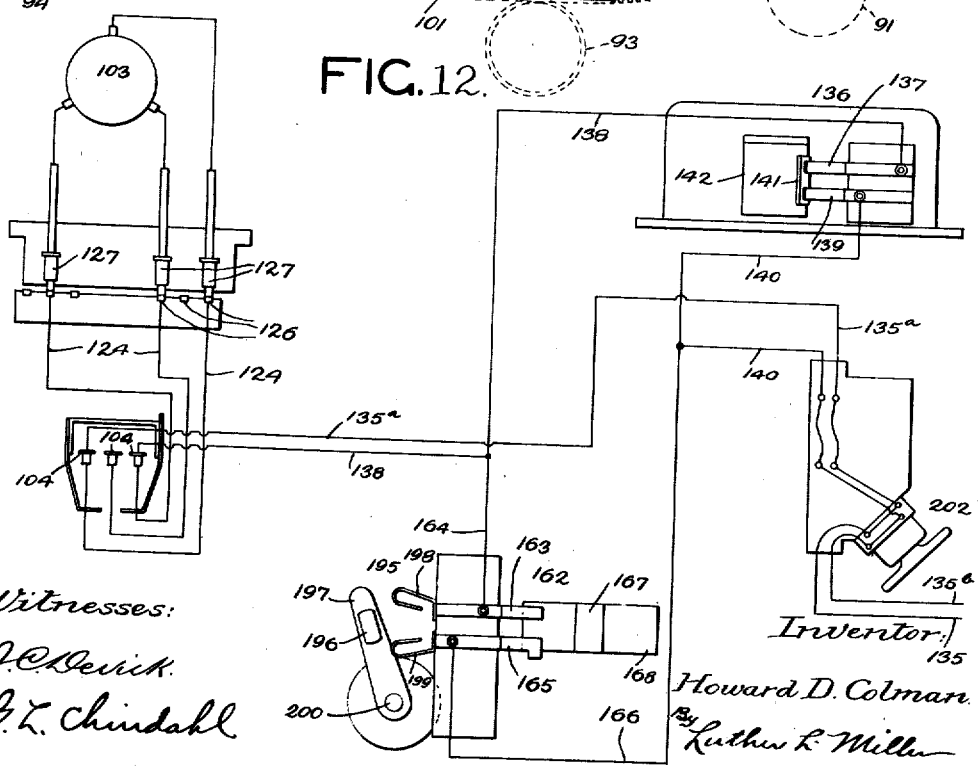
Figure 21:
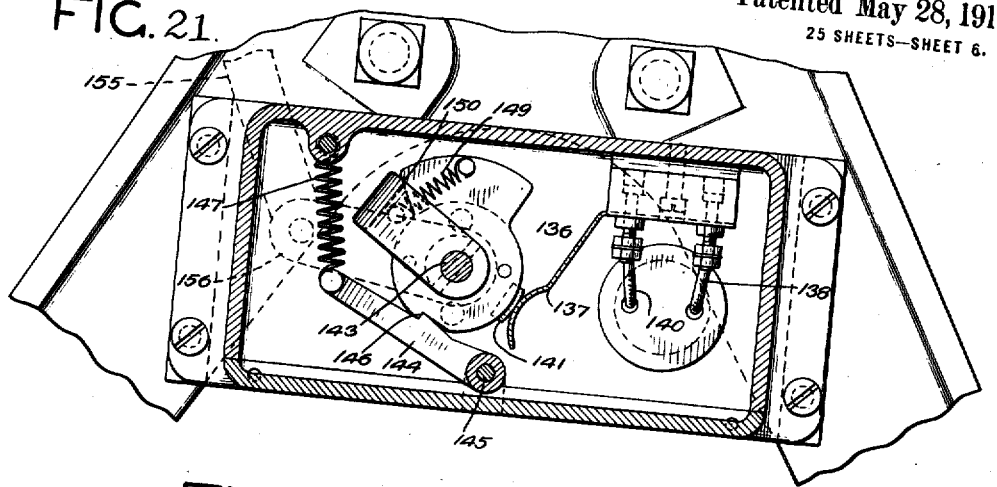
Figure 22:
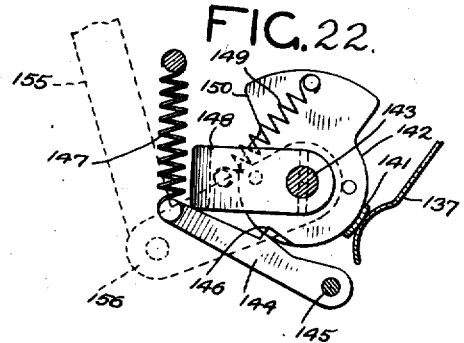
Figure 23:
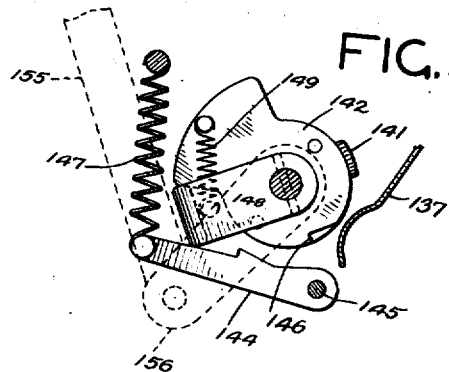
Figure 24:
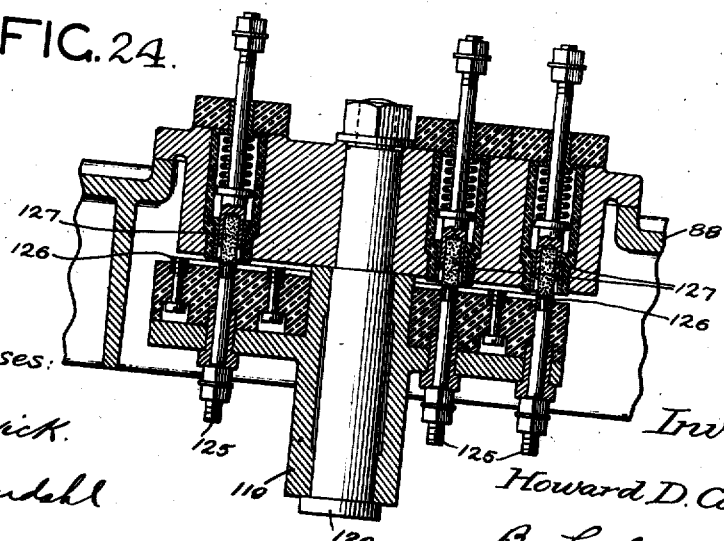
Figure 27:
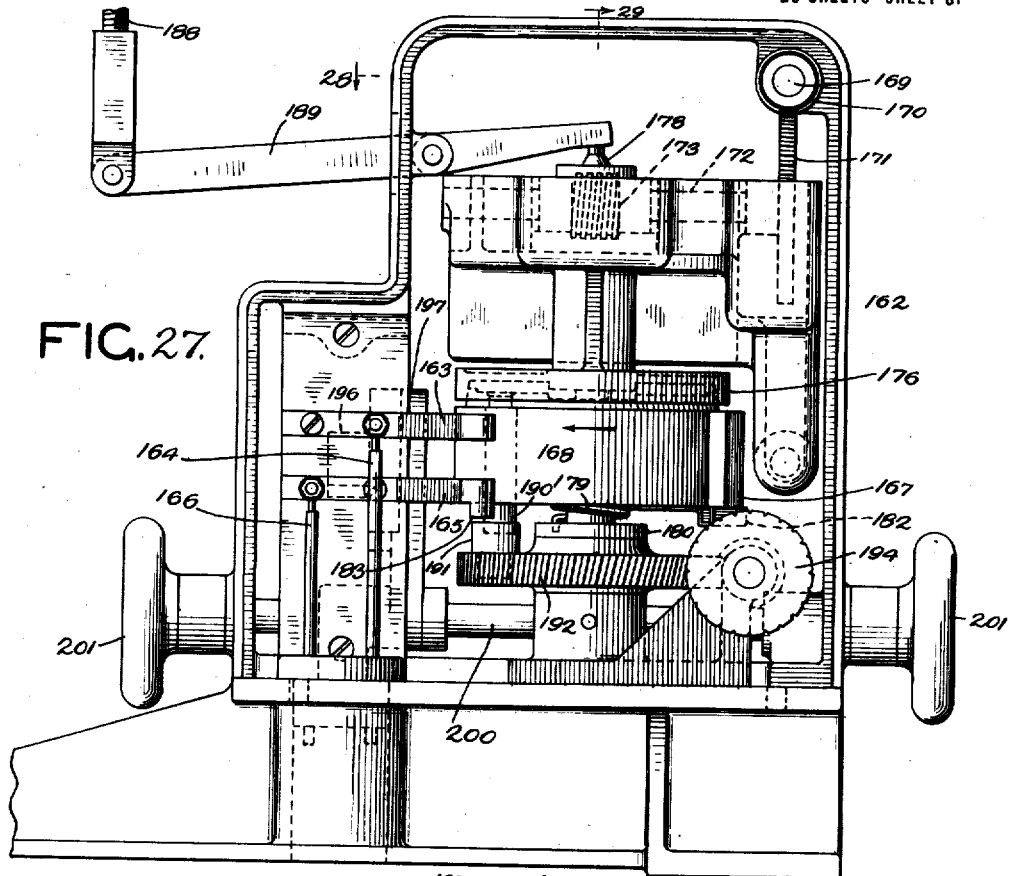
Figure 28:
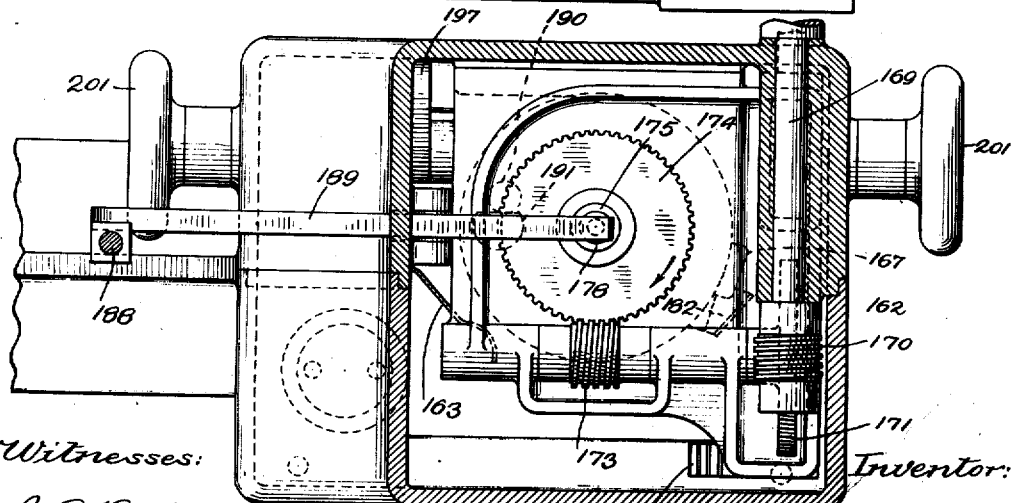
Figure 37:
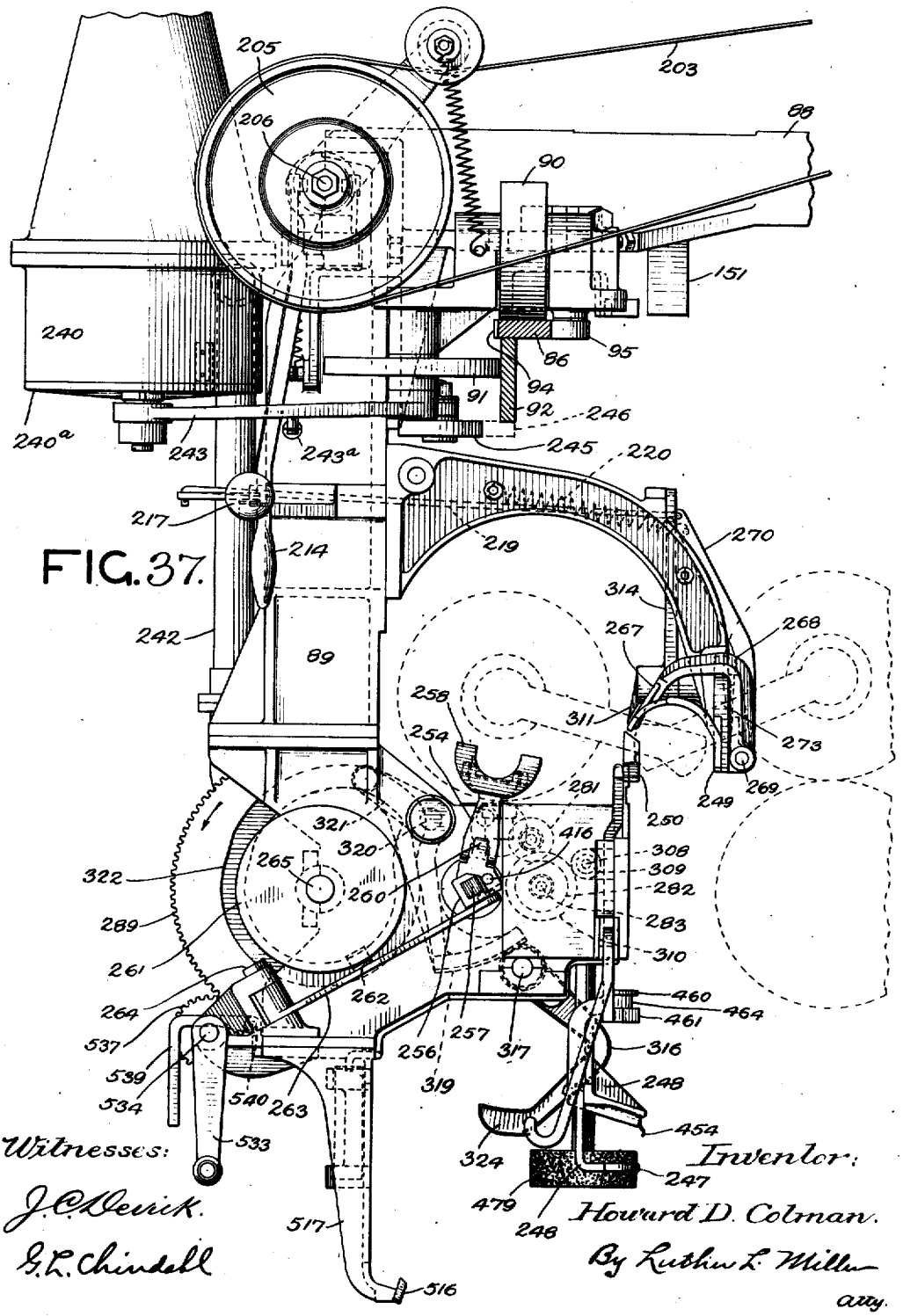
Figure 49:
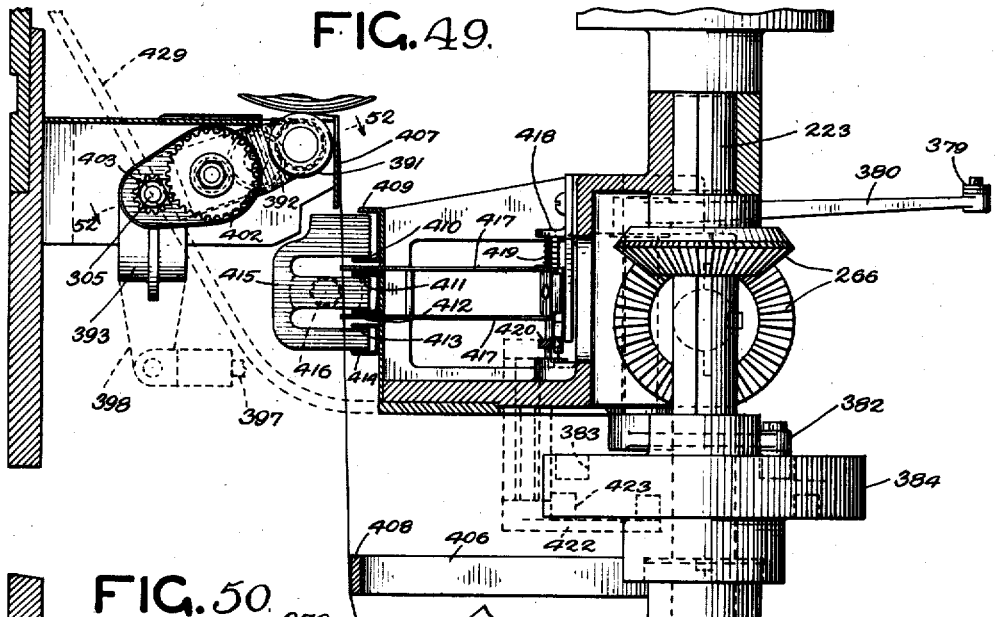
Figure 50:
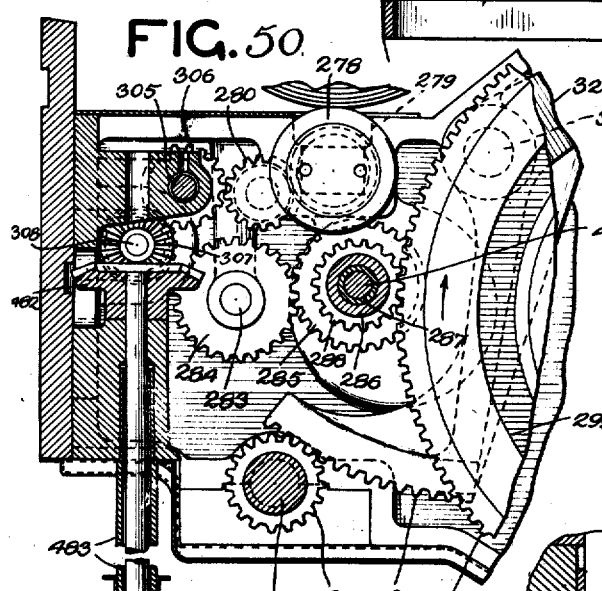
Figure 51:
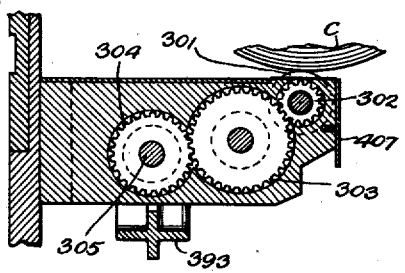
Figure 52:
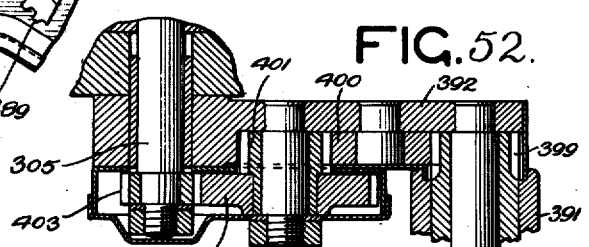
Figure 53:
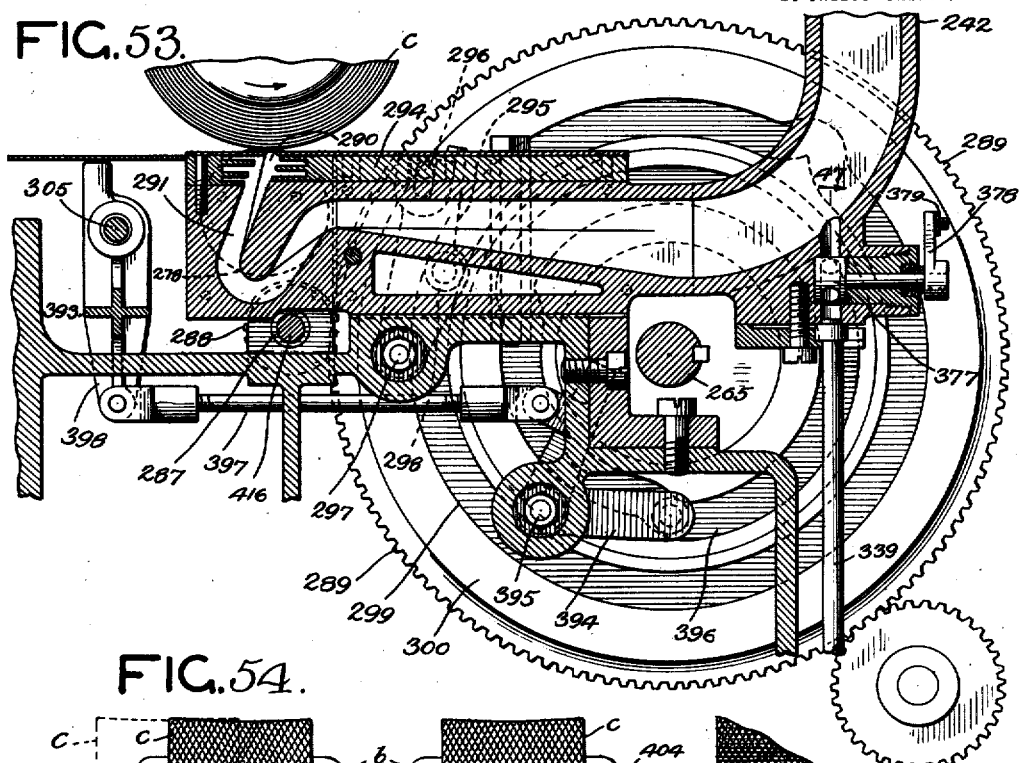
Figure 54:
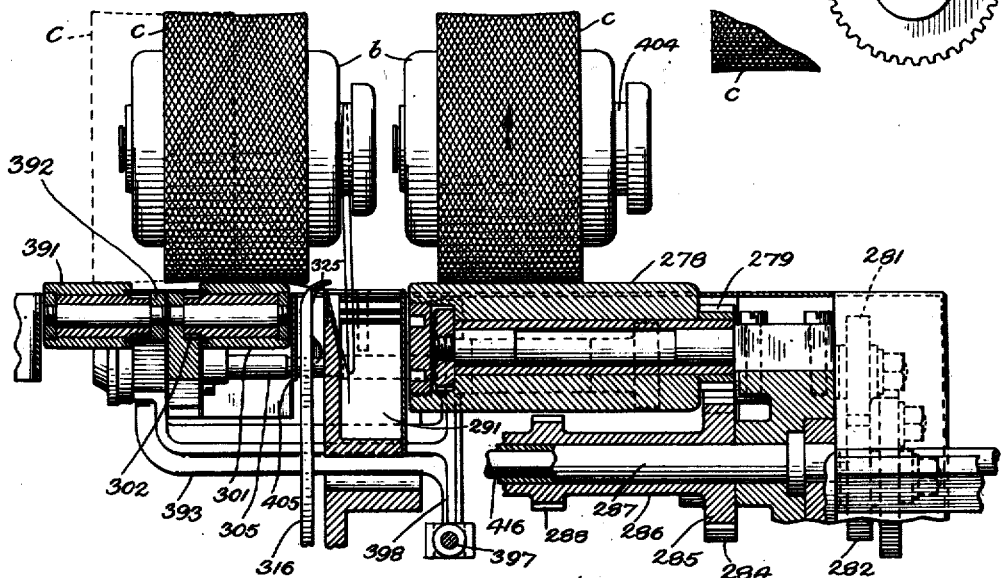
Figure 55:

In the accompanying drawings Figure 1 is a fragmental transverse vertical section through one side of a winder embodying the features of my invention. Fig. 2 is a fragmental front elevation, showing several of the winder units. Fig. 3 is a sectional view illustrating a device for opening and cleaning the yarn-clearers. Fig. 4 illustrates the yarn-clearer in operative position and shows in section the device which opens and cleans said yarn-clearer. Fig. 5 illustrates the yarn-clearer as about to be closed by the winder-tending mechanism. Fig. 6 is a view looking from the left-hand side of Fig. 3. Fig. 7 is a fragmental view of one of the winder units. Fig. 7ª is a sectional view illustrating the bobbin-holder and the reserve-bobbin support of a winder unit. Figs. 8 and 9 are fragmental horizontal sectional views illustrating the operation of resetting the detector mechanism of a winder unit. Fig. 10 is a top plan view of certain thread-controlling means comprised in each winder unit. Fig. 11 is a plan view of one end of the winder framework. Fig. 12 is a diagram illustrating the circuits by means of which power is transmitted to the motor of the winder-tending mechanism. Fig. 13 comprises a fragmental longitudinal central sectional view of that end of the winder framework which is shown in Fig. 11, and a fragmental side elevation of the winder-tending mechanism. Fig. 14 is a horizontal sectional view through the separator showing the removable bottom of said separator. Fig. 15 is a plan view of the parts shown in Fig. 13. Figs. 16, 17 and 18 are transverse sectional views of an electric conduit extending longitudinally of the winder framework, the trolley that travels in said conduit being shown in Figs. 16 and 18. Fig. 19 is a fragmental plan view of the conduit. Fig. 20 is a section on line 20 of Fig. 19. Fig. 21 is a view of the main switch through which electrical energy is transmitted to the motor of the traveling winder-tending mechanism. Figs. 22 and 23 show successive stages in the operation of opening said switch. Fig. 24 is a section taken in the plane of dotted line 24 of Fig. 26. Fig. 25 is a horizontal section on line 25 of Fig. 26. Fig. 26 illustrates the conduit hereinbefore referred to, the trolley which travels through said conduit, and a portion of the means for conveying current from the trolley to the motor of the winder-tending mechanism. Fig. 27 is a view showing a winder-controlled switch for closing a shunt circuit around the main switch hereinbefore referred to. A portion of the casing inclosing said winder-controlled switch is omitted in Fig. 27. Fig. 28 is a horizontal sectional view taken in the plane of dotted line 28 of Fig. 27. Fig. 29 is a vertical section on dotted line 29 of Fig. 27. Fig. 30 is a fragmental plan view taken approximately in the plane of dotted line 30 of Fig. 29. Fig. 31 illustrates a manually-operable switch for closing a shunt around the main switch. Fig. 32 is a fragmental view showing a means for causing said winder-controlled switch to be suddenly closed. Fig. 33 illustrates a means for opening and closing the main switch and a means for opening the winder-controlled switch. Fig. 34 is a fragmental view of some of the devices shown in Fig. 33. Fig. 35 is an elevation of the main switch, a portion of the inclosing casing being removed. Fig. 36 is a fragmental view of the traveling winder-tending mechanism, showing also in dotted lines a portion of a unit. The parts 434 and 435 are shown in the position of rest which they occupy when the winder-tending mechanism is traveling around the ends of the winder. Fig. 37 is a fragmental view of the winder-tending mechanism taken from the side opposite to that seen in Fig. 36. Fig. 38 is a fragmental front elevation of the winder-tending mechanism. Fig. 39 is a horizontal sectional view taken approximately in the plane of dotted line 39 of Fig. 38. Fig. 39ª is a fragmental detail view. Fig. 39ᵇ is a sectional view of a cheese and its pivotal support. Fig. 40 is a vertical sectional view taken approximately in the plane of dotted line 40 in Fig. 39. Fig. 41 is a continuation of the lower left-hand portion of Fig. 40. Fig. 42 is a plan view illustrating a device for breaking a thread which may be running when the winder-tending mechanism reaches it. Fig. 43 is a fragmental vertical sectional view which illustrates the general relation of the winder-tending mechanism to the unit, during operation. Fig. 44 is a fragmental sectional view illustrating a slack-take-up device and a thread-pusher. Fig. 45 is a fragmental plan view of the end-finder, the slack-take-up roller, the slack-take-up device shown in section in Fig. 44, and other portions of the winder-tending mechanism. Fig. 46 is a fragmental plan view taken in the plane of dotted line 46 of Fig. 38. Fig. 47 is a vertical sectional view of an air valve, the view being taken in the plane of dotted line 47 of Fig. 53. Fig. 48 is a fragmental vertical view showing the cheese in the position indicated by dotted lines in Fig. 54. Fig. 49 is a vertical sectional view in the plane of dotted line 49 of Fig. 45. Fig. 50 is a vertical sectional view on dotted line 50 of Fig. 45. Fig. 51 is a vertical sectional view on dotted line 51 of Fig. 45. Fig. 52 is a sectional view taken in the plane of dotted line 52—52 of Fig. 49. Fig. 53 is a vertical sectional view taken in the plane of dotted line 53 of Fig. 45. Fig. 54 is a vertical sectional view showing the relation of the cheeses to the end-finder and other mechanisms. Fig. 55 is a vertical sectional view showing a thread-breaker. Fig. 56 is an elevation showing the knotter and adjacent mechanisms, the view being taken in the plane of dotted line 56 of Fig. 43. Fig. 57 is a fragmental view of a reserve-thread clamp comprised in each winder-unit, and a device on the winder-tending mechanism for opening said clamp. Fig. 58 is an underside view taken approximately in the plane of dotted line 58 of Fig. 56. Fig. 59 is a plan view of some of the mechanisms shown in Fig. 56. Fig. 60 is a plan view of some of the parts shown in Fig. 59, but illustrating the position assumed by said parts when the winder-tending mechanism reaches a full cheese. Fig. 61 is a fragmental view illustrating the relation of the knotter and adjacent parts to the winder unit, the knotter being supposed to be traveling toward the observer. Fig. 62 is a fragmental detail view of an air duct located adjacent to the knotter. Fig. 63 is a plan view showing (on a smaller scale) a shear illustrated in Fig. 61. Fig. 64 illustrates the manner of driving and locking the tying bill. Fig. 65 shows the exhausted thread as having been inserted into the knotter. Fig. 66 represents the completed knot as being stripped from the tying bill. Fig. 67 illustrates a thread-clamping and guiding device. Fig. 68 is a perspective view of a combination thread-clamp and knot-tightener and stripper. Fig. 69 is a horizontal sectional view taken approximately in the plane of dotted line 69 of Fig. 38. Fig. 70 illustrates a device for locking and unlocking the part 435. Fig. 71 is a vertical sectional view taken in the plane of dotted line 71 of Fig. 69. Fig. 72 illustrates a position assumed by the parts shown in Fig. 71. Fig. 73 is a horizontal sectional view of the device for detecting full cheeses, the view being taken in the plane of dotted line 73 of Fig. 38. Fig. 74 is a view taken from the left-hand side of Fig. 73. Fig. 75 illustrates a locking device. Fig. 76 shows a stage of the operation of the devices represented in Fig. 74. Fig. 77 shows how the feeler 506 engages a full cheese.

The present embodiment of the invention consists of mechanism for unwinding yarn from bobbins $a$ onto tubular cores $b$ to form cheeses $c$, and a mechanism arranged to travel along the winding mechanism and attach the ends of the yarn on the bobbins to the ends of the yarn on the cheeses and perform various other operations attending the production of cheeses. The winder consists of an elongated framework similar to that shown in Patent No. 1,175,710 and providing two parallel sides, each side having means for supporting bobbins, and means for supporting and rotating cheeses. The winder-tending mechanism travels around the winder and ties the end of the yarn on a reserve bobbin $d$ to every cheese, except in the case of cheeses that have reached the desired size.

The winder may be considered as consisting of a plurality of units, each unit comprising means for supporting a winding couple (i. e., a bobbin and a cheese), means for rotating the cheese and traversing the yarn, means for throwing the cheese out of operation upon exhaustion of the yarn, a reserve-bobbin support, a reserve-thread-end clamp, a yarn clearer, and yarn-guiding means. Herein is shown by way of example, a winder construction substantially similar to that fully illustrated and described in my copending application Serial No. 5,563, filed February 1, 1915.

The cheeses are rotated through peripheral contact with rotary drums 1 having peripheral yarn-traversing grooves 2. The drums 1 at each side of the machine are mounted upon a shaft 3. In the rotation of the drums the cam grooves 2 guide the yarn back and forth and thus build up crosswound yarn masses on the cores $b$.

Each winder unit comprises a bracket 28 (Fig. 7) having a bearing 29 at its upper end. A cheese-supporting arm 30 is provided upon one side and near one end with a pivot 31 which is mounted in the bearing 29, said pivot being rigid with the lever. At the free end of the arm 30 is means for rotatably supporting a cheese, which means may be of any suitable character, as, for example, a pivotally supported hub $30^a$ such as the one shown in my copending application Serial No. 74,290, filed January 26, 1916. See Fig. $39^b$ herein. On the hub $30^a$ is a stop flange $30^b$. The core $b$ is held between said flange and a spring-pressed locking tongue $30^c$ carried by the hub.

To a short arm 32 rigid with the arm 30 is pivoted at $33^a$ a depending link 33 which may be in the form of an elongated loop. When the yarn exhausts, devices to be presently described swing the link 33 from its normal vertical position to a position within reach of a continuously oscillating hook 34 (Fig. 1) which pulls the link downward and thus throws the arm 30 from the position illustrated in Fig. 1 to that shown in dotted lines in Fig. 7, whereby the cheese is withdrawn from the cam drum. The hooks 34 for the winder units are fixed upon a shaft 35 which may be rocked by any suitable means.

Means is provided for pressing the cheese against the cam drum and for correcting any tendency to the formation of an eccentric yarn mass on the core $b$, which means will next be described. A bell-crank lever 38 (Fig. 7) is pivoted at 39 to the bracket 28. The arm $38^a$ of said bell-crank is arranged to bear against a lug 40 fixed with relation to the pivot 31. A hanger 41 is suspended from the other arm $38^b$ of the bell-crank lever 38 and is connected by means of a coiled spring 42 to the arm $43^a$ of a lever 43 pivoted to the bracket 28. The other arm $43^b$ of the lever 43 bears against the surface 44 of the lever arm $38^b$. This surface is sufficiently steep so that it tends, under the pressure of the spring 42, to force the arm $43^b$ outwardly against a stop shoulder $38^c$ on the arm $38^b$. As the cheese increases in diameter, the upward swinging movement of the lug 40 causes the bell-crank lever 38 to tilt, the lever arm 43$^b$ moving under the action of the spring 42 so as to remain in contact with the surface 44 during such movement of the bell-crank lever 38. The spring 42 keeps the arm 38$^a$ against the lug 40, thus pressing the cheese against the drum.

Owing to the pressure of the arm 43$^b$ against the surface 44, the pressure of the arm 38$^a$ against the lug 40 is greater when said lug is swinging upwardly than when it is swinging downwardly. Hence if the yarn mass should be somewhat eccentric or non-circular, the low place will receive less pressure than the peak or the slope of the peak, and the yarn mass thus restored to proper form.

When the formation of a cheese is started, the lug 40 stands at an acute angle to the arm 38$^a$. As the diameter of the cheese increases, the lug 40 turns toward a position at a right angle with the arm 38$^a$, whereby the spring pressure transmitted to the arm 30 decreases. This graduation in pressure is provided so that the central portion of the cheese shall be harder than the outer portion, thus lessening the spreading tendency exerted by the outer layers of yarn on the inner layers.

When the cheese is being thrown out of driving contact with the cam drum, the lug 40 forces the arm 38$^a$ rearwardly. As soon as the lug 40 has passed the arm 38$^a$ the spring 42 tilts the bell-crank lever 38 until the arm 43$^b$ stops against the shoulder 38$^c$. As the cheese is completing its throwing-out movement, a lug 45 fast on the pivot 31 strikes against the arm 38$^a$, whereby said arm serves to yieldingly arrest the movement of the arm 30. The position of the bell-crank 38 being determined by engagement of the arm 43$^b$ with the shoulder 38$^c$, it will be seen that the thrown-out position of the arms 30 is uniform regardless of variations in the weight of the cheeses.

Each winder unit comprises suitable bobbin-supporting means. The bobbin may be supported either for drawing of the yarn off the end of the bobbin, or for unwinding of yarn from the side of the bobbin. Herein I have shown means for rotatably supporting the bobbin for side-delivery of yarn. I have also illustrated means for supporting a reserve bobbin. The active bobbin-holder and the reserve bobbin-holder or support may be of any preferred construction; in the present embodiment they are similar to those fully described in Patent No. 1,201,998, dated October 17, 1916. 46 is the active bobbin-holder and 47 the reserve-bobbin support. The bobbin holder 46 consists of a pocket 46' and a back stop 46$^a$. The pocket 46' is pivoted at 46$^b$, the rear end of the pocket being normally held up against a stop 46$^c$ by a spring 46$^d$. The pin 46$^e$ projecting from the pocket 46' is arranged to be engaged by a cam member of the winder-tending mechanism, for the purpose of lowering the rear end of the pocket to permit the spent bobbin to slide therefrom.

The reserve-bobbin support 47 is fixed to a pivot 47$^a$ extending lengthwise of and above the support. Gravity normally holds the support 47 in the position shown in Fig. 7$^a$. 47$^b$ is a stationary strip of metal extending lengthwise of the reserve bobbin support and serving as a stop to determine the normal position of the bobbin support 47. The strip 47$^b$ also serves to prevent lateral displacement of the bobbin when the support 47 is swung upwardly. Rigid with the forward end of the pivot 47$^a$ is a crank arm 47$^c$ (Figs. 1 and 2) which extends into the path of movement of a cam member of the winder-tending mechanism. When said cam member reaches the crank arm 47$^c$ of a unit, the arm is raised to withdraw the support 47 from beneath the reserve bobbin, thereby discharging said bobbin laterally into the bobbin-holder 46, the spent bobbin having previously been discharged.

It will be apparent from Fig. 7$^a$ that a space for the running thread is provided between the side edge of the support 47 and the adjacent stop 47$^b$.

The end of the thread on the reserve bobbin is held in proper position to be operated upon by the winder-tending mechanism by any suitable means, as, for example, that shown in Figs. 1 and 57. On a stationary bracket 48 is a thread clamp 49 comprising a surface 50 and a movable member 51. The member 51 is yieldingly pressed against the surface 50 by means of a spring 52 that surrounds a screw 53 seated in the bracket 48. On the movable member 51 is an inclined surface 54 which assists the operative in guiding the thread into the clamp. The edge 55 of the movable clamp member limits the extent to which the thread may be inserted into the clamp and thus insures uniformity in the position of the thread end. Below the thread clamp is a bridge 56 (Figs. 1 and 2) across which the thread extends. The thread clamp 49 and the bridge 56 support a portion of the reserve thread in proper position to be operated upon by the winder-tending mechanism.

Intermediate the active bobbin and the cam drum the running thread extends through a guide or guard 57 (Figs. 1 and 10) stationarily mounted on the supporting frame adjacent to the cam drum. The form of the guard corresponds generally to the shape of the path traversed by the thread. At its upper end the interior width of the guard is approximately the same as the width of the periphery of the cheese, the guard tapering thence downwardly. Upon exhaustion of the thread the guard 57 assists to prevent the cam drum from throwing the loose thread laterally off the periphery of the cheese. When the thread is relieved of the drag of the bobbin, the thread seems to jump into contact with the lower end of the guard 57, whereby sufficient resistance is exerted upon the thread to prevent it from being thrown by the cam drum off the periphery of the cheese. The guard 57 also serves the purpose of reducing the amount of flying lint or fiber.

The forward side of the guard 57 is closed, save for an entrance slot 58 (Fig. 2). On the forward side of the guard and at its upper end are two plates 59 and 60 which form between them a zig-zag guideway 61. When the cheese is moved from the position indicated in dotted lines in Fig. 7 to that represented in full lines in said figure, the thread passes through the zig-zag guideway 61. While the cheese is being accelerated, the bobbin may jump, and thus cause the thread to become somewhat slack. The function of the guideway 61 is to confine the thread against excessive lateral movement, and thus prevent the drum from throwing a thread that is somewhat slack off the periphery of the cheese. The guideway 61 is made of zig-zag form to delay the time of full engagement of the thread with the cam groove 2 until the cheese has been accelerated to some extent by the cam drum, the arc of contact of the thread with the cam groove being gradually lengthened as the thread passes in through the zig-zag guide. It will be understood that the thread is caused to pass inwardly through the zig-zag guideway 61 by reason of rotation of the cheese and the traversing of the thread by the cam groove.

In passing from a bobbin to the guard 57, the thread passes through a yarn clearer 62 (Figs. 1, 4 and 5). The clearer 62 comprises two plates 63 and 64 defining a narrow slot 65 through which the thread may run. The plate 64 has a rounded edge 64ª to guide the thread toward one end of the slot 65; and said end of the slot is made flaring to facilitate the entrance of the thread into the slot under the tension due to the winding of the thread. The clearer 62 further comprises an arm 69 having a notch 70. The arm 69 is pivoted at 71 so that it may be swung across the slot 65, as shown in Fig. 4. It will be seen that the plates 63 and 64 and the notched portion of the arm 69 provide a restricted passage for the thread and thus act to clear the yarn. The arm 69 is yieldingly held in its operative and inoperative positions by suitable means such as that disclosed in said application Serial No. 5,563. The arm 69 is moved into operative position by a device on the traveling winder-tending mechanism arranged to engage an arm 74 which is rigid with the arm 69. 75 is a stop pin to limit the movement of the arm 74 under the action of said device. The yarn clearer is opened by another device on the winder-tending mechanism, said device traveling through the slot 65 and pushing aside the arm 69.

Below the yarn clearer 62 is a detector 77 (Fig. 1), comprising a stationary grid formed of three parallel spaced fingers 78 across which the thread is arranged to run. The detector further comprises a fork consisting of two fingers 79, said fingers being adapted to swing into the spaces between the fingers 78 and bear upon the running thread. The fingers 79 are fixed upon a vertical rock-shaft 80. A torsion spring 83 tends to rock the shaft 80 in the direction to press the fingers 79 against the thread. When the thread exhausts through the emptying of the bobbin or the breakage of the thread, the spring 83 turns the shaft 80 into the position shown in Fig. 8. During such turning movement an arm 84 fixed on the shaft 80 swings the link 33 into the range of action of the hook 34. Upon its next downward movement the hook catches the link 33 and throws the cheese into the position shown in dotted lines in Fig. 7, where it remains until the winder-tending mechanism arrives and ties in the reserve thread.

After the cheese has passed the highest point in the throwing-out movement, the rearward and upward movement of the point 33ª causes the link 33 to fulcrum on a projection 85 (Fig. 1), whereby the lower end of the link is swung forwardly away from the hook 34.

In the winder shown in Patent No. 1,175,710 the weight of the winder-tending mechanism is carried by an endless elevated rail, an endless lower rail being provided to steady said mechanism. In the present machine the winder-tending mechanism is supported entirely by an endless elevated rail 86 (Fig. 11) consisting of two straight parallel portions and semi-circular end-sections. Only one of said end-sections is shown in the present drawings.

The carriage or framework of the winder-tending mechanism consists of a base or main section 88 (Figs. 13 and 15) and a depending frame 89 (Fig. 36) rigidly attached to one end of the base. The end of the base to which said depending framework is connected is provided with two rollers 90 (Figs. 13 and 38) arranged to run upon the rail 86. Adjacent to one of the rollers 90 is a guide roller 91 turning upon a vertical axis and bearing against an endless guide rail 92. Adjacent to the other roller 90 is a pinion 93 (Figs. 15 and 36) rotating upon a vertical axis and meshing with an endless rack 94 arranged at the outer edge of the rail 86. Adjacent to the roller 91 and the pinion 93 are guide rollers 95 and 96 respectively, (Figs. 36 and 37) rotating on vertical axes and bearing against the inner edge of the endless rail 86.

The opposite end of the base 88 is supported upon a roller 97 (Fig. 13). When the winder-tending mechanism reaches one end of the winder and the rollers 90 pass onto the semicircular rail-portion at that end of the machine, the base 88 turns through an arc of 180 degrees as the rollers 90 traverse said semicircular rail section, the roller 97 moving on the curved rail 98 (Fig. 11) to the other side of the winder framework. It will be seen that the semicircular ends of the rail 86 and the rail-section 98 provide a substantially circular track at each end of the winder. The rails 98 are separated from the straight portions of the rail 86 by spaces 98ᵃ (Fig. 11) through which the rollers 95 and 96 travel. The roller 97 has a periphery wide enough to bridge these spaces as the carriage turns.

Referring to Fig. 11: The rollers 95 and 96 are so located with reference to the roller 91 and the pinion 93 that the roller 91 is held in contact with the endless guide rail 92 and the pinion 93 is held in engagement with the endless rack whether said roller and pinion are both on the straight or both on the semicircular portions of said rail and rack. As best shown in Fig. 15, the roller 95 is a little to the rear of the roller 91, and the roller 96 is an equal distance forward of the pinion 93. When the base 88 begins to swing by reason of the roller 95 having passed onto the semicircular track, the roller 96 is withdrawn from contact with the straight portion of the endless track. To hold the pinion 93 in mesh with the rack until said pinion has entered upon the semicircular portion of the rack, I provide a roller 99 (Figs. 11 and 36) turning upon a vertical axis and carried by an arm 100 fixed to the framework 89, said roller 99 being arranged to run in contact with the inner edge of a guide rail 101 (Fig. 11), fixed to the lower edge of the rail 92 and of such length and form as to hold the pinion in mesh with the rack until the roller 96 is again in contact with the inner edge of the semicircular portion of the track 86.

When the roller 91 is entering upon the straight portion of the endless track and the pinion 93 is still upon the curved portion of the track, the roller 96 is swung away from the semi-circular portion of the track. As this occurs, the roller 99 is carried into rolling contact with a guide rail 102 which is of such form and length as to hold the pinion 93 in mesh with the rack until the roller 96 is in contact with the straight portion of the endless track.

Power to actuate the winder-tending mechanism and to cause said mechanism to travel about the winder framework is supplied by an electric motor 103 (Fig. 13) mounted upon that end of the base 88 which is carried by the roller 97. Electric current may be conducted to the motor in any manner suited to the kind of current to be employed. Herein are shown three parallel conductors 104 (Fig. 17) extending longitudinally of the winder frame, approximately in the plane of the endless rail 86, and midway between the straight parallel portions of said rail. The conductors 104 are insulated from each other and are supported within the upper part of a conduit 105 (Fig. 11). Said conduit may, if desired, be constructed of an inverted channel bar 106 (Fig. 18) and two side sections 107 and 108 rigidly secured together. The lower inturned flanges of the sections 107 and 108 constitute tracks 109 upon which is mounted a trolley 110 (Figs. 16, 25 and 26). Upon the trolley are mounted three shoes 111, each carrying two carbon contact blocks 112 (Fig. 25) arranged to make contact with one of the conductors 104. Each shoe 111 is carried by one arm of a bell-crank lever 113 (Fig. 25). A spring 114 (Fig. 26) acting upon the other arm of the bell-crank holds the the carbon blocks 112 in contact with the conductors 104.

The trolley 110 is caused to travel with the winder-tending mechanism by means of an arm 115 (Figs. 16, 25 and 26), the lower end of which arm has an elongated opening 116 (Fig. 25) through which extends a pin 117 (Fig. 26) carried by the trolley. The upper end of the arm 115 is fixed to a carrier 118 (Figs. 16 and 26), which carrier is pivoted to an arm 119 (Fig. 26), said arm being rotatably mounted upon a pivot 120 carried by the central portion of the base 88.

The rail 98 is interrupted at 98ᵇ (Figs. 11 and 16) to permit the travel of the arm 115.

Electrical communication may be established between the shoes 111 and the motor 103 in any suitable manner. Herein, the base plate 121 (Fig. 25) upon which each shoe is mounted is provided with a binding post 122 (Fig. 18), each binding post being connected with a conductor 123 secured to but insulated from the carrier 118. The conductors 123 are connected by means of wires 124 to the lower ends of three binding posts 125 (Fig. 24) carried by but insulated from the arm 119. The upper ends of said binding posts 125 are connected to three contact rings 126 (Fig. 26) arranged concentrically with the pivot 120. The base 88 carries three spring-pressed contacts 127 (Fig. 24) which bear upon the rings 126. The contacts 127 are connected to the motor by suitable means (not herein shown).

The carrier 118 is held against turning movement by means of a guide flange 128

(Fig. 16) on the conduit 105, the lower side of the carrier having a groove 129 for the reception of the flange.

For convenience in manufacturing and erecting the machine, the winder is divided into sections which may be termed "bays." The conduit 105 is made in sections corresponding to the length of the bays. Each of the two end-sections of the conduit is supported by means of a bracket 130 (Figs. 11 and 16). At intermediate points the conduit is supported by means of brackets 131 (Figs. 17 and 19). The abutting ends of the conduit-sections are secured together by the brackets 131. The abutting ends of the sections of the conductors 104 are electrically and mechanically connected together by blocks 132, plates 133 and screws 134 as shown in Figs. 19 and 20.

It is desirable that the winder-tending mechanism shall be ready to operate upon the successive units promptly after the bobbins exhaust. The time required to empty a bobbin varies with the amount of yard thereon. It is therefore desirable that the travel of the winder-tending mechanism shall be subject to control so that it may be varied when changes are made in the character of the yarn being wound. The winder-tending mechanism is therefore arranged to wait at one end of the winder frame-work after each round trip for a sufficient length of time to insure that the active bobbin of the next unit to be operated upon shall exhaust before the winder-tending mechanism reaches it. The length of the stoppage of the winder-tending mechanism is predetermined in accordance with the maximum length of time necessary to unwind bobbins containing a given size of yarn spun with a given amount of traverse and a given size of spinning ring.

The means for controlling the supply of current to the motor 103 in order to start and stop the winder-tending mechanism will next be described, reference being had particularly to the diagrammatic view Fig. 12. One of the conductors 104 is connected to the supply main 135 through a conductor 135$^a$. Another of the conductors 104 is connected to the other supply main 135$^b$ through a switch 136 (Figs. 12, 21 and 35), one contact finger 137 of said switch being connected to said conductor 104 through a conductor 138. The other contact finger 139 is connected to the supply main 135$^b$ through a wire 140. The contact fingers 137 and 139 are arranged to be electrically connected by a bridging contact 141 carried by a cylinder 142 which is rotatably mounted upon a shaft 143. The contact 141 is normally held in contact with the fingers 137 and 139 by a latch 144 pivoted at 145, said latch being held in engagement with a shoulder 146 on the cylinder by a spring 147. Rigid with the shaft 143 is an arm 148 which is adapted to swing the latch 144 out of engagement with the shoulder 146. A coiled spring 149 tends to hold a projection 150 on the cylinder 142 in contact with the arm 148. Fig. 21 shows the switch 136 in closed position. Fig. 22 shows the latch 144 on the point of being disengaged from the locking shoulder 146 by the arm 148, the spring 149 having been stretched by the movement of the arm 148. Fig. 23 shows the latch 144 as having been disengaged from the shoulder 146, and the spring 149 as having turned the cylinder 142 to suddenly withdraw the contact 141 from the contact fingers 137 and 139, thereby opening the motor circuit.

The winder-tending mechanism is arranged to operate the switch 136, as just described, as the winder-tending mechanism approaches the end of the winder where said switch is located. Fixed upon the base 88 is a lug 151 (Figs. 11 and 33) located in position to be carried against a stud 152 carried by a bell crank 153 (Figs. 11 and 33) which is pivoted at 154. Said bell crank is connected by a link 155 to an arm 156 which is rigid with the shaft 143. A coiled spring 157 normally holds the bell crank 153 in contact with a buffer or cushioned stop 158. After the winder-tending mechanism has swung the bell crank 153 into the dotted-line position shown in Fig. 11, the bell crank is locked in such position by a latch 159 (Figs. 11 and 34) which is pivoted at 160 and held in position to engage said bell crank by a spring 161. After the switch 136 has been operated to open the motor circuit, as just described, the winder-tending mechanism continues to travel through momentum until the roller 91 and the pinion 93 have entered upon the semicircular portions of the guide rail 92 and the rack 94, respectively.

When the predetermined idle period of the winder-tending mechanism has expired, a shunt circuit is closed around the switch 136 by means to be now described. A switch 162 (Fig. 12) comprises a contact finger 163 which is connected to the wire 138 by a wire 164. The other contact finger 165 of said switch is connected with the wire 140 by a wire 166. The fingers 163 and 165 are arranged to be electrically connected by a bridging contact 167 (Fig. 27) which is carried by a cylinder 168 formed of insulating material.

The switch 162 is arranged to be closed by the winding mechanism to start the winder-tending mechanism at a predetermined time. Thereafter the winder-tending mechanism withdraws the latch 159 (Fig. 11), as hereinafter described, whereupon the spring 157, acting through the bell-crank 153, the link 155 and the crank arm 156, closes the switch 136. A moment thereafter the winder-tending mechanism opens the switch 162.

The means whereby the winding mechanism rotates the cylinder 168 to place the contact 167 in engagement with the contact fingers 163 and 165 comprises a shaft 169 (Fig. 29) continuously driven in any suitable manner, as by being directly connected to one of the cam drum shafts 3. On the shaft 169 is fixed a worm 170 that meshes with a worm wheel 171 which is fixed upon a shaft 172. Rigid with the shaft 172 is a worm 173 that meshes with a worm wheel 174 fixed upon a sleeve 175. To the lower end of the sleeve 175 is fixed a friction clutch member 176. A coacting friction clutch member 177 is rigidly fixed to the upper side of the cylinder 168. The friction clutch member 177 is fixed upon the lower end of a spindle 178 that extends slidably and rotatably through the sleeve 175. A compression and torsion spring 179 normally holds the friction clutch member 177 in engagement with the clutch member 176. One end of the spring 179 is attached to the clutch member 177 and the other end to a flange 180 on a fixed pivot 181. Through the gear train 170, 171, 173, 174 and the friction clutch 176, 177, the cylinder 168 is very slowly turned in the direction indicated by the arrow in Fig. 27 to place the contact 167 in engagement with the fingers 163 and 165 and thus close a circuit through the motor 103. In order that the circuit shall be quickly closed, a finger 182 is fixed to the cylinder 168, said finger having an outer inclined end. The finger 182 is mounted a little in advance of the contact 167 so as to be carried into engagement with a projection 183 on the finger 165 before the contact 167 has reached said finger 165. The inclined outer end of the finger 182 presses the finger 165 outwardly and holds it away from the contact 167 for a time. As soon as the finger 182 has passed the projection 183, the finger 165 springs against the contact 167, the latter having meanwhile engaged the contact finger 163.

When the shunt circuit is closed through the contacts 163, 165 and 167 as just described, the winder-tending mechanism begins to travel. In moving over the rail sections 98, the roller 97 depresses an arm 184 (Figs. 11 and 33). Rigid with said arm 184 is an arm 185 carrying a pin 186 that overlies the latch 159. It will be seen that when the arm 184 is depressed through the passage of the roller 97 over it, the latch 159 is withdrawn from the bell crank 153, whereupon the spring 157 closes the main switch 136. Simultaneously the friction clutch member 177 is withdrawn from the clutch member 176 by means comprising an arm 187 (Figs 11 and 33) which is rigid with the arms 184 and 185, the arm 187 being connected through a link 188 to one arm of a lever 189 (Fig. 27). The other arm of the lever 189 bears upon the upper end of the spindle 178. As soon as the friction clutch member 177 is separated from the clutch member 176, the torsion spring 179 turns the cylinder 168 in the direction opposite to that indicated by the arrow in Fig. 27, thereby opening the switch 162. A stop 190 (Figs. 27 and 30) fixed in the cylinder 168 limits the action of the spring 179 through engagement of said stop pin with a relatively stationary stop 191.

As soon as the roller 97 has passed the arm 184, the spring 179 moves the clutch member 177 into engagement with the constantly rotating clutch member 176, whereupon the cylinder 168 begins rotating in the direction indicated by arrow in Fig. 27. The time occupied by the cylinder 168 in again closing the shunt circuit at the contacts 163 and 165 depends upon the location of the stop 191. In order that the position of said stop may be conveniently altered when a change is made in the character of the yarn masses to be unwound, the stop 191 is mounted upon a worm wheel 192 (Figs. 29 and 30) rotatably mounted upon the pivot 181, said worm-wheel meshing with a worm 193 which is rigid with a hand-wheel 194.

After the winder-tending mechanism has opened the switch 162 by throwing out the friction clutch 176 and 177, said switch will be again closed by the mechanism driven from the shaft 167 (Fig. 29) after the winder tending mechanism has completed a trip around the winder and has waited until the proper time with reference to the operation of the winder units next to be operated upon.

When the winder-tending mechanism is at a standstill at the end of the winder, the operative may, if she so desires, set said mechanism into operation by closing a switch 195 (Figs. 12 and 31). Said switch comprises a contact 196 mounted upon a swinging arm 197 and adapted to engage two contacts 198 and 199 connected, respectively, with the wires 164 and 166. The arm 197 is fixed upon a shaft 200 provided at its ends with hand-wheels 201. As soon as the winder-tending mechanism has closed the switch 136, the operative opens the switch 195.

If desired, a snap 202 (Fig. 12) or other form of manually-operable switch may be connected into the motor circuit at any convenient point.

Power is communicated from the motor 103 to the pinion 93 by means comprising a belt 203 (Figs. 15 and 37) running over a flanged pulley 204 on the armature shaft and over a pulley 205 (Figs. 37 and 38) rotatably mounted on a shaft 206. 207 is a nut on the shaft 206 preventing sidewise displacement of the pulley 205 in one direction. The side of the pulley 205 opposite to the nut 207 is provided with a tapered friction surface 208 adapted to receive a correspondingly tapered friction clutch member 209 fixed upon a sleeve 210. The sleeve 210 is splined upon the shaft 206. A compression spring 211 surrounding the shaft 206 is interposed between a collar 212 fixed on said shaft and a flange 213 on the end of the sleeve 210, said spring serving to hold the clutch member 209 normally in engagement with the clutch surface 208. The clutch member 209 may be withdrawn from engagement with the clutch surface 208 by means of a hand lever 214 which is pivoted at 215 and has a forked upper end adapted to engage the flange 213. A tension spring 216 moves the lever 214 (against the pressure of the spring 211) to throw out the clutch when said lever is free to move. Normally, the lever is locked against movement by means of a latch lever 217 (Figs. 38 and 69), said latch lever being pivoted at 218. The latch lever 217 is connected by means of a link 219 to an element (hereinafter described) which is acted upon by a spring 220, said spring normally holding the latch lever in engagement with the lever 214.

The shaft 206 carries a bevel pinion 221 (Fig. 38) which meshes with a bevel gearwheel 222 fixed upon the upper end of a shaft 223 mounted upon the frame 89. On the shaft 223 is a pinion 224 (Figs. 15, 36 and 38) that meshes with the pinion 93.

Exhaust air currents are employed for finding the thread ends upon the cheeses, for holding the threads at various points, and for carrying off waste portions of the threads, and an air blast is utilized for blowing lint and dust from the winder units. These air currents may be produced by any suitable means, that herein shown being an exhauster 225 (Fig. 15) of ordinary construction, said exhauster being mounted upon the end of the base 88 which is opposite to the end that supports the motor 103. The exhauster 225 is provided with a tight and a loose pulley 226 and 227, respectively, and is driven by means of a belt 228 adapted to extend around either of said pulleys and around a pulley 229 fixed on the motor shaft. Means is provided for automatically shifting the belt 228 to the loose pulley after the pneumatic devices have passed the last unit on a side, and for shifting the belt to the tight pulley just before the end-finder begins to operate upon the first unit on the other side. The belt-shifting means comprises a shifter fork 230 (Figs. 13 and 15) fixed upon a rock shaft 231 carried by the base 88. The extent of oscillation of the shifter fork 230 is limited through contact of two stop arms 232 on the shaft 231 with fixed portions on the base 88. A coiled spring 233 acting on an arm 234 fixed to the shifter fork 230 tends to hold the belt either on or off the driving pulley. To the lower end of the shaft 231 is fixed a crank arm 235 (Figs. 11 and 13), said crank arm carrying a roller stud 236, which is arranged to engage a pair of stationary cam blocks 237 and 238 at each end of the machine. After the winder-tending mechanism has passed the last unit upon a given side of the machine, the roller 236 is carried into engagement with the cam block 237, whereby the shifter fork 230 is caused to move until the point of connection of the spring 233 with the arm 234 has passed "over center," when the spring 233 completes the shifting of the belt to the loose pulley 227. Before the winder-tending mechanism reaches the first unit upon the other side of the machine, the roller stud 236 is carried into engagement with the cam block 238 and the belt is shifted to the tight pulley.

A handle 239 (Figs. 15 and 36) is fixed to one of the stop arms 232 and provides means for manually shifting the belt 228.

To separate the waste thread-ends from the air current, there is provided a centrifugal separator 240 (Fig. 13) secured to the framework 89 and connected to the exhauster by means of a tube 241. The air current enters the separator tangentially through a tube 242 (see Fig. 15). The rotation of the air in the separator causes the thread-ends to be thrown outwardly to the walls of the separator, whence they fall to the bottom of the separator, the air passing out through the tube 241.

In each round trip of the winder-tending mechanism, the separator 240 is automatically opened to discharge the accumulation of thread clippings. For this purpose the bottom 240$^a$ (Fig. 14) of the separator is loosely pivoted to one arm of a lever 243 which is pivoted at 244. The other arm of the lever 243 has a roller 245 arranged to be carried into engagement with a cam block 246 (Figs. 11 and 13) fixed to the guide rail 92. When the bottom 243 is thus opened, the accumulated waste drops into a suitable receptacle (not shown). After the roller 245 has passed the cam block 246, a tension spring 243$^a$ (Fig. 14) closes the bottom 240$^a$. When the exhauster is operating, atmospheric pressure holds the bottoms 240$^a$ tightly against the lower end of the body of the separator.

When approached by the winder-tending mechanism the winder units are usually idle, but occasionally a cheese will still be running upon its cam drum 1 when the winder-tending mechanism reaches that particular unit. In order to sever the thread of any such unit, I provide a roller 247 (Figs. 40 and 42) carried by a lever 247$^a$ which is pivoted upon a bracket 248. Said bracket is fixed to the framework of the winder-tending mechanism. A spring 247$^b$ normally holds the lever 247$^a$ against a stop pin 247$^c$.

The roller 247 is supported so as to be carried into contact with the middle finger 78 of each unit. Any thread that may be running when the roller 247 arrives will break when clamped between the roller and said finger 78. It will be seen that the traveling thread-breaker just described constitutes means for breaking the thread of a winding couple after a predetermined maximum period of time has expired.

The winder-tending mechanism comprises means for promptly throwing out any cheeses that may be running upon their cam drums when said mechanism arrives, and for positioning successive cheeses with relation to the end-finder. As shown in the side view Fig. 37, the plan view Fig. 39 and the front view Fig. 40, two plows 249 and 250 are rigidly fixed in the framework of the winder-tending mechanism in position to pass at opposite sides of the series of brackets 28 (see also Fig. 1). The plow 249 is arranged to raise the arm 30 of a cheese which is running upon its cam drum and swing said arm up and over into the position shown in dotted lines in Fig. 1. The plow 250 is located rearwardly of the plow 249 in position to lift the thrown-out cheese arms 30 in succession onto a horizontal surface or dwell 251. Rearwardly of the dwell 251 is a rising incline 252 which lifts the cheese arms onto the horizontal surface or dwell 253.

When the operative places a cheese core on a hub 30$^a$, she may neglect to push the cheese core far enough onto the hub to allow the latch finger 30$^c$ to lock the core in place. In order to insure that the cheese core is properly mounted upon the hub 30$^a$ and thus insure that the cheese shall register properly with the parts of the winder-tending mechanism that operate on the cheeses, I provide a cheese-seating device comprising a finger 254 (Fig. 38) pivoted at 255 to a slide 256 which is mounted upon a guide rod 257 of square cross-section fixed in the framework of the winder-tending mechanism and extending parallel with the direction of travel of said mechanism. Pivoted to the finger 254 is a semi-circular member 258 faced with leather or other suitable friction material. A spring 259 yieldingly holds the finger 254 against a stop 260. When the cheese-supporting arm 30 has been placed upon the dwell 251 (Fig. 40) the slide 256 is given a forward and back movement to press the member 258 against the end of the core $b$ and withdraw said member therefrom, by means of a cam 261 (Fig. 38) operating upon a roller stud 262 (Fig. 37) carried by a lever 263 which is pivoted at 264, said lever having a pin-and-slot connection with the slide 256, as shown in Fig. 39$^a$. The cam 261 is fixed upon a horizontal shaft 265 which is driven through gearing 266 (Fig. 38) from the vertical shaft 223. The pressure of the member 258 against the core $b$ is sufficient to insure that the core is properly seated upon the hub 30$^a$ and is locked upon said hub by the locking device 30$^c$. The pressure of the member 258 against the end of the core $b$ also serves to stop rotation of the cheese if the latter be still rotating through momentum.

If a latch 30$^a$ be out of engagement with its cheese, said cheese may be so far out on its hub 30$^a$ as to foul upon an adjacent thrown-out cheese arm, or such an unlatched cheese may prevent the adjacent cheese arm, when thrown out, from descending to its intended position. In order to stop the travel of the winder-tending mechanism in the event of such a condition arising, I provide a member 267 (Fig. 40) rigidly attached to two arms 268 which are fixed upon a rock shaft 269 (Figs. 37 and 39). Pivoted upon the shaft 269 is an arm 270 which normally presses against a lug 271 (Fig. 40) on an arm 272 which is rigid with a shaft 269. (See Figs. 37 and 69). The arm 270 is pivoted to the rod 219. The spring 220 is connected to the arm 270 and normally holds the arms 268 against the relatively stationary part 273 (Fig. 39). One edge of the plate 267 is of such outline as to define, in conjunction with the surfaces 251, 252 and 253, a passageway of sufficient width to admit a single cheese arm 30. If the winder-tending mechanism reaches a cheese arm 30 which has been unable to descend to proper position, the inclined forward edge 274 of the plate 267 rides up on said cheese arm, whereby the plate is lifted and the shaft 269 is turned against the tension of the spring 220. The movement of the shaft 269 is transmitted through the arms 272 and 270 and the rod 219 to the latch lever 217, whereby said latch lever is withdrawn from engagement with the lever 214; thereupon the spring 216 (Fig. 38) moves the clutch member 209 away from the clutch surface 208 thus disconnecting the shaft 206 from the motor. The winder-tending mechanism then stops. After the operative has placed the cheese arm in proper position, she operates the lever 214 to permit the spring 211 to press the clutch member 209 against the clutch surface 208, the latch member 217 springing into position to lock the lever 214 in place.

It may be stated that the extent of throwing-out movement of the plate 267 is limited by the engagement of said plate with the surface 275 (Fig. 39).

As the winder-tending mechanism progresses, the inclined surface 252 (Fig. 40) raises the cheese arm 30 sufficiently so that the cheese can pass over the member 258. After the dwell 253 has passed out from under the arm 30, the arm descends an incline 276 and thereafter an incline 277, thus placing the cheese on the end-finding device. Said device comprises a roll 278 (Fig. 39) on which the cheese rests and whereby the cheese is revolved in the direction to unwind yarn from the cheese. This roll is fixed with relation to a pinion 279 (Fig. 54) that meshes with a pinion 280 (Fig. 45). The pinion 280 is rigidly mounted upon a shaft that carries a pinion 281 (Fig. 45). The pinion 281 meshes with a pinion 282 (Fig. 37) which is fixed upon a shaft 283. On the shaft 283 is fixed a pinion 284 (Fig. 50) that meshes with a pinion 285. The pinion 285 is rigid with a sleeve 286 (Fig. 54) which is rotatably mounted upon a stationary bushing 287. Also fixed upon the sleeve 286 is a pinion 288 (Fig. 54) that meshes with a gear wheel 289. The gear wheel 289 is fixed upon the shaft 265.

At the rear end of the roll 278 is located the suction opening 290 (Fig. 39) of an air duct 291 (Fig. 53). The air duct 291 communicates with the conduit 242. As the winder-tending mechanism progresses, the suction opening 290 arrives under the cheese, and as the latter is revolved by the roll 278 the free end of the yarn on the cheese is drawn into the suction opening.

It sometimes happens that a loose coil of yarn on the periphery of the cheese is drawn into the suction tube together with the free end of the yarn, the coil being pulled laterally off the periphery of the cheese and onto the core $b$ as the mechanism advances. (See Fig. 54). In order to free the cheese from such a displaced coil or strand, I provide a severing mechanism which, while it may be of any suitable character, is herein shown as a thread breaker. (See Figs. 53 and 55). Said thread breaker is located within the suction tube and hence is out of the way of the cheeses. It comprises two stationary blades 292 and three blades 293 which are carried by a slide 294. The slide 294 is reciprocated across the air passage and just below the mouth 290. The top and bottom blades 293 clamp against the blades 292 any thread that may extend from the suction opening to the core $b$, and the middle blade 293 breaks the thread. The blades 293 do not touch the blades 292, and consequently there is no wear on any of the blades, nor any need for lubrication.

The slide 294 is reciprocated by means of an arm 295, (Figs. 45 and 53), the upper end of said arm being forked to receive a stud 296 on the slide. The arm 295 is pivoted at 297 and has a roller stud 298 that runs in the cam groove 299 of a cam disk 300 which is rigid with the gear wheel 289.

As the winder-tending mechanism advances, the strand which extends from the periphery of the cheese is drawn to one end of the suction opening 290. Said strand is thus out of the way of the thread-breaking blades 293 when said blades are advanced to break the strand that extends to the core $b$.

It sometimes happens that the exhausted thread upon the cheese is caught under a piece of leaf or is otherwise held to the periphery of the cheese at a point some little distance from the end of the thread. In such a case, when the end of the thread has been picked off the periphery of the cheese by the exhaust air current, and the held point has passed the suction opening 290, the continuing rotation of the cheese tends to draw the thread out of the suction tube and rewind it on the cheese. In order to increase the resistance to withdrawal of the thread from the air duct 291, the latter may, if desired, be made tortuous as shown in Fig. 53. When drawn into the air duct the thread bears against the walls of the duct at the angles thereof, whereby the resistance to withdrawal is increased. The pressure of the thread against the walls of the duct also counteracts the tendency of the air current to untwist the thread.

Before the roll 278 (Fig. 54) has passed completely out from under the cheese, another roll 301 passes under the cheese. The rolls 278 and 301 revolve in the same direction and their upper sides are in the same horizontal plane. The roll 301 is driven by means of a pinion 302 (Figs. 51 and 54), said pinion being rigid with the roll. The pinion 302 meshes with a pinion 303 which in turn meshes with a pinion 304 fixed upon a shaft 305. The shaft 305 carries a pinion 306 (Fig. 45) that meshes with a pinion 307 fixed on a shaft 308 (Figs. 37, 45 and 50). The shaft 308 carries a pinion 309 that meshes with a pinion 310 which is fixed on the shaft 283.

In order to increase the friction between the cheese and a roller 391 to be hereinafter described, the cheese is pressed against said roller through the action of an arm 311 (Figs. 39 and 40), said arm being pivoted at 312 and being pressed against the arm 30 that carries the cheese by a spring 313 acting upon an arm 314 which is rigid with the arm 311. 315 (Fig. 40) is a stop to limit the action of the spring 313 upon the arm 314. If it be desirable also to increase the friction between the cheese and the roll 301, the arm 311 may be arranged to engage the arm 30 early enough to effect this result.

The means for carrying the exhausted thread to the knot-tying mechanism comprises an arm 316 (Fig. 43) fixed to one end of a rock shaft 317. The shaft 317 is oscillated by means of a pinion 318 (Fig. 50) meshing with a segment 319 pivoted at 320 (Fig. 37). Rigid with the segment 319 is a crank arm 321 (Figs. 37 and 45) carrying a roller stud that runs in a cam groove 322 formed in the side of the gear wheel 289. The arm 316 is arranged to operate in a space 323 provided at the rear side of the air duct 291 (Figs. 39 and 45). On the free end of the arm 316 is a head 324 (Fig. 43) having a hook 325 to engage the portion of the thread extending from the suction opening 290 to the cheese.

The point of the hook 325 is curved, as shown in Fig. 54, to overhang the suction opening 290 to a slight extent, and thus make more certain that said hook shall catch the exhausted thread. The structure at one side of the space 323 has a groove 326 (Fig. 43) which is concentric with the axis of rotation of the arm 316, the point of the hook 325 traveling through said groove.

As the arm 316 swings downwardly it carries a bight of the exhausted thread to the knot-tying mechanism, slack being furnished by the unwinding of the cheese due to the rotation of the roll 301 (Fig. 54). If desired, the peripheral speed of said roll may, as herein shown, be greater than that of the roll 278, and it should be such that the cheese furnishes all of the thread for the loop or bight produced in the downward movement of the arm 316, no thread being drawn from the air duct 291. As the arm 316 swings downwardly it carries one strand of the bight over a stationary hook 327 (Figs. 43 and 45).

The knot-tying mechanism is so located on the framework 89 as to be carried along in a horizontal plane lying between the series of reserve thread clamps 49 and the series of bridges 56. (See Fig. 43). The knot-tying mechanism comprises a rotary tying-bill 328 which may be of any suitable form and construction. It is herein shown as substantially similar to that fully described in Patent No. 959,592, dated May 31, 1910. The movable jaw of the tying bill is actuated by a cam barrel 329 (Fig. 66) as in said patent. The tying bill 328 is secured to a shaft 330 that carries a spiral pinion 331 (Fig. 64) which meshes with a spiral pinion 332 on a shaft 333. Fixed on the shaft 333 is a pinion 334 arranged to mesh with a segmental rack 335 (Fig. 58) fixed to a drum 336, said drum being mounted on the lower end of the shaft 223. (See Fig. 38). The gear elements 334 and 335 are so proportioned as to rotate the tying bill 328 through two revolutions in each revolution of the drum 336. While the pinion 334 is out of mesh with the rack 335, the tying bill is locked against rotation by means of a stop member 337 (Figs. 58 and 64) fixed to the shaft 333 and adapted to slide in contact with a locking flange 338 on the drum 336.

The knot-tying mechanism further comprises a plurality of thread guides and devices for controlling the threads before and during the tying operation. Among said devices is an exhaust air duct 339 communicating with the air passage 242 (Fig. 43).

The mouth of said duct is located above the tying bill. In the upper and lower sides of the duct are formed flaring throatways 340 and 341 (Fig. 62) for the reception of the threads to be united. Just below the mouth of the air duct 339 is a plate 342 (Figs. 61 and 67), said plate having a flaring throatway 343 which is vertically alined with the throatways 340 and 341. A spring clamping member 344 is secured to an arm 345 pivoted at 346 (Fig. 58), said arm being rigid with an arm 347 that carries a roller 348 which bears against a cam surface 349 (Fig. 56) on the periphery of the drum 336. The roller 348 is held in contact with said cam surface by a tension spring 350. The spring finger 344 presses against the lower side of the plate 342 and is arranged to swing across the throatway 343 to clamp the threads and to move the threads into position to be received in the tying bill when the latter is open, as fully described in said Patent No. 959,592.

Below the tying bill is a combination thread clamp and knot-tightener and stripper comprising an arm 351 (Fig. 61) which is pivoted on the axis 352 (Figs. 43, 56 and 59). The arm 351 is provided with a roller stud 353 (Figs. 43 and 59) which runs in a cam groove 354 in the cam drum 336. The arm 351 carries two clamping blades 355 (Fig. 61) lying at opposite sides of the end of the arm 351. A guide pin 356 set in the arm 351 passes loosely through the blades 355. To the lower blade 355 is fixed a screw 357 which extends loosely through the arm 351 and through the top blade 355. A coiled spring 358 is interposed between the head of the screw 357 and the top blade 355. Said spring yieldingly holds the blades 355 in contact with opposite sides of the arm 351. 359 (Figs. 65 and 66) is a fixed bracket which coöperates with the clamp arm 351 in the stripping operation, as will appear more fully hereinafter.

As the winder-tending mechanism progresses, the suction tube 339, the throatway 343, the tying bill 328, and the thread clamping blades 355 are carried against the reserve thread, as shown in Fig. 61. As soon as the reserve thread has reached the inner portion of the throatway 343, it is clamped therein by the spring clamping finger 344 which swings across the throatway. A moment after the reserve thread is thus clamped in the throatway 343 it is released from the clamp 49 through the action of a projection 360 (Fig. 61) which is carried by an arm 361 (Fig. 60), said arm being pivoted at 362. (The arm 361 has no pivotal movement except in a case to be hereinafter mentioned.) As the winder-tending mechanism travels, the projection 360 is moved against an inclined lug 363 (Figs. 43, 57 and 61) on the movable clamp member 51, whereby said clamp member is tilted away from the surface 50 (Fig. 57), the rear end 364 serving as a fulcrum. The opening in the member 51 through which the screw 53 passes is large enough to permit the member 51 to tilt, as just described.

One strand of the bight of the exhausted thread which is drawn down by the arm 316 is placed in operative relation to the knot-tying mechanism by an arm 365 (Figs. 59 and 60) which is pivoted at 366 (Fig. 58), said arm having a roller stud 367 that travels in a cam groove 368 in the drum 336. Fixed to the free end of the arm 365 are two notched fingers 369 and 370 connected by a plate 371. Referring to Fig. 59: The entrance to the notch 372 in the upper finger 369 is defined by a hook 373 and a point having an inclined surface 374. Referring to Fig. 58: The notch 375 in the lower finger 370 has at one side a hook 376. Fig. 59 shows the position occupied by the arm 365 as the arm 316 completes its downward movement. As the arm 316 swings downwardly, it carries against the surface 374 the strand of the exhausted thread which extends to the hook 327. Said strand slips down the surface 374 and passes inside the hook 373 and into the notch 372, as shown in Fig. 59. The arm 316 also carries said strand against the hook 376 and comes to rest in the position shown in full lines in Fig. 43. The arm 365 then swings toward the knot-tying mechanism, thereby carrying the exhausted thread into the throatways 340 and 341 (Fig. 62), and the throatway 343 (Fig. 67), laying the exhausted thread against the tying bill, and pushing both threads between the clamping blades 355 (Fig. 65). A moment after the arm 365 has acted, the spring clamping finger 344 (Fig. 67) is moved aside to allow the exhausted thread to pass into the inner end of the throatway 343, said clamping finger immediately returning into clamping position so as yieldingly to hold both of the threads in position for the tying operation.

As the exhausted thread is placed in position at the knotter, an exhaust air current is inaugurated in the tube 339 (Fig. 61) by reason of the opening of a valve 377 (Fig. 53). This valve is located near the junction of the tube 339 with the conduit 242 and has a port arranged to establish communication between said tube and conduit. The stem of the valve 377 has a crank arm 378 which is connected by means of a link 379 (Fig. 38) to an arm 380, (Fig. 39) which is pivoted at 381. Rigid with the arm 380 is an arm 382 (Fig. 38) which has a roller stud running in a cam groove 383 in a cam disk 384 mounted on the shaft 223.

Figs. 61 and 63 illustrate a shear for severing the exhausted thread, said shear comprising a fixed blade 385 located above the air tube 339. Coacting with the blade 385 is a shear blade 386 which is rigid with one arm of a bell crank 387 pivoted at 388. The other arm of the bell crank carries a roller stud that travels in a cam groove 389 in the drum 336. For convenience in sharpening or renewing the blade 386, the latter may be detachably connected to the bell crank 387. In Fig. 63 the blade 386 is shown as having a forked end fitted over the pivot 388, and the bell crank as having a pin 390 which extends through an opening in the blade 386.

The shear blade 386 is in closed position when the reserve thread is received by the knot-tying mechanism. The blade 386 then opens to receive the exhausted thread as the latter is inserted in the knot-tying mechanism by the arm 365. After the clamping finger 344 (Fig. 67) has clamped both threads in the throatway 343, the shear blade 386 closes, thereby severing the exhausted thread. The portion of said thread extending between the shear and the suction opening 290 is immediately drawn into the air duct 291.

As soon as the reserve and exhausted threads have been positioned at the tying mechanism, the tying bill 328 is rotated to tie the knot. The slack required in the formation of the loops of the knot is obtained through slippage of the threads past the spring clamping finger 344. Said finger is swung away from the throatway 343 after the threads have been clamped by the tying bill. As the threads are clamped in the tying bill they are also sheared, whereby the ends of the knot are trimmed to a suitable short length, the trimmed-off portions being withdrawn through the tube 339. The loops of the knot are pulled off the tying bill and over the ends clamped in said bill by a simultaneous movement of the arms 351 and 365 (Figs. 43, 56 and 68). As indicated in said figures the axes 352 and 366 are vertically alined. In the movement of the arms 351 and 365 the threads are carried against the end of the stationary finger 359, the continuing movement of said arms finally causing the ends of the knotted threads to be pulled out of the tying bill. (See Fig. 66). The movement just referred to is imparted to the arms 351 and 365 by the cam grooves 354 and 368. The valve 377 is closed after the tying of the knot is completed. When the arm 365 is in the position shown in Fig. 65, the guard plate 371 is between the tying bill and the strand leading to the cheese, thereby insuring that the suction shall not draw said strand against the tying bill and cause the thread to be broken.

The arm 316 rises shortly after the arm 365 has inserted the exhausted thread into the knot-tying mechanism.

As the arm 316 completes its downward swing, the cheese passes into position above a slack-take-up roller 391 (Fig. 54) which revolves in the direction opposite to the direction of rotation of the roller 301. The roller 391 is carried by an arm 392 (Figs. 45, 49 and 52) which is rigid with a frame 393. Said frame has two alined bearings whereby the frame is suspended from the shaft 305. The arm 392 and frame 393 are arranged to be swung by means of a bell crank 394 (Fig. 53) which is pivoted at 395. One arm of the bell crank has a roller stud that runs in the groove 396 of the cam disk 300, while the other arm of the bell crank is connected by means of a link 397 to an arm 398 which is rigid with the frame 393. As the arm 316 is completing its downward stroke, the cheese passes from the roller 301 into position above the roller 391, whereupon the arm 392 is raised to lift the cheese off the roller 301 in order that the cheese shall be quickly stopped and reversed. By the time the knot has been tied and stripped the slack-take-up roller 391 has caused the cheese to reverse its direction of rotation and thereby take up slack in the united threads. The roller 391 is driven by the gear train shown in Fig. 52 and consisting of the gears 399, 400, 401, 402 and 403.

The bight of the exhausted thread was moved by the arm 316 down through the space 323 (Fig. 45), one side of which space is bounded by a guard plate 405 (Figs. 45 and 54) and a guide bar 406 (Figs. 43, 45, 56 and 59). As the winder-tending mechanism progresses, the strand extending from the hook 325 (Fig. 43) on the arm 316 to the cheese passes through a narrow space extending parallel with the direction of movement of the winder-tending mechanism, one side of which space is defined by a guard plate 407 (Figs. 45 and 49), the other side of said space being defined by the horizontal portion 408 of the bar 406 and by flanges 409, 410, 411, 412, 413, 414 (Figs. 45 and 49). The friction of the plate 407 and the pull of the arm 316 are prevented from dragging the thread off the periphery of the cheese as the winder-tending mechanism advances by means of a thread-pushing device consisting of a plate 415 (Figs. 43, 44 and 49) attached to a rod 416 (Figs. 39, 45 and 53). The rod 416 is slidably supported in the bushing 287 (Fig. 54), and is attached to the slide 256 (Fig. 37). It will be remembered that this slide is reciprocated on the guide 257 by the cam 261. As indicated in Fig. 43, the arm 316 is made of angular form so as to avoid conflict between said arm and the rod 416. After the arm 316 has carried down a bight of the exhausted thread, the rod 416 is moved rearwardly to keep the plate 415 in such relation to the cheese as to guard against the possibility of the strand slipping over the side of the cheese and onto the core b. During the slack-take-up rotation of the cheese the plate 415 keeps the thread near the center of the periphery of the cheese.

It is desirable to keep the exhausted thread substantially taut at all times in order that it shall be under control, and, further, so that the thread shall not have an opportunity to kink, and so that if kinks are formed the thread shall be straightened out before the kinks can be wound upon the cheese, it being understood that such kinks cause the thread to break when the thread is being woven into cloth in the loom. I, therefore, provide means which acts to take up slack in the exhausted thread during the period between the time when the exhausted thread is clamped between the blades 355 (Fig. 61) and the time when the roller 391 becomes effective to take up slack. This means comprises two fingers 417 (Fig. 49) which are pivoted on the axis 418. The plate 415 is slotted to permit the fingers 417 to bear against a thread extending across said plate, as shown in Figs. 44 and 49. A torsion spring 419 presses the fingers 417 against the thread a moment after the thread has been clamped by the blades 355. The flanges 409, 410, 411, 412, 413 and 414 insure that the thread shall not be displaced to one side of the plate 415. After the slack in the united threads has been taken up by the roller 391 and the cheese is about to be lifted off said roller, the fingers 417 are swung away from the thread by an arm 420 (Figs. 45 and 46) which is fixed upon a shaft 421. On the lower end of the shaft 421 is an arm 422 that carries a roller stud which travels in a cam groove 423 in the lower side of the cam disk 384.

The exhausted thread having been tied to a reserve thread and the slack in the united threads having been taken out, the cheese is ready to be placed on its cam drum 1. This is accomplished by means of a plow 424 (Figs. 36, 39 and 40) which throws the cheese arm 30 upward over center, whereupon the cheese arm falls onto an inclined cam surface 425. The surface 425 controls the descent of the cheese onto the cam drum.

It may be here stated that in the travel of the winder-tending mechanism the reserve thread is pulled along the front edge of the bridge 56 by the knot-tying mechanism until said thread comes to the space between said bridge and the next adjacent bridge. The reserve thread then passes into the space between said bridges, and when the slack in the united threads is taken up by the rotation of the cheese when driven by the roller 391 and the cheese is transferred to the cam drum 1, the thread passes through the space 426 (Fig. 39) and is guided by the surfaces 427 and 428 to the zig-zag guideway 61 (Fig. 10). 429 (Figs. 36 and 39) is a guard extending from a point below the path of movement of the thread-pusher 415 to a point above the series of brackets 28. This guard insures that the thread shall not foul on the upper end of the bracket 28 as the cheese is being transferred to the cam drum.

430 (Figs. 43 and 60) is a finger having a portion 430ª which normally lies in position to push the reserve thread off the bridge 56 in case the thread has not entered the space between the two adjacent bridges by reason of the travel of the knot-tying mechanism. The finger 430 is shown in normal position in dotted lines in Fig. 60. Said finger is attached to an arm 431 which is fixed to a shaft 432. The means for moving the finger 430 into and out of operative position will be described hereinafter.

While the cheese is being transferred from the slack-take-up roller 391 to the cam drum 1, the drag of the bobbin would cause the cheese to revolve upon its pivot in the direction to unwind yarn if means were not provided to prevent such rotation. By reference to Figs. 1 and 36 it also will be apparent that after the cheese has passed a certain point in its travel from the slack-take-up roller 391 to the cam drum 1, the distance between the cheese and the bobbin will be decreasing. In order to prevent the thread from becoming slack while the cheese is being transferred from the slack-take-up roller to the cam drum, I provide means comprising two plates 434 and 435 (Fig. 36) pivotally mounted upon a fixed pivot 436. The plate 434 is arranged below the plate 435 and is touched and raised by the cheese as the latter is being elevated by the cam surface 424 (Fig. 40). 437 is a stop for limiting downward movement of the plate 434, which stop is so arranged that the cheese shall come into contact with said plate as soon as practicable after the cheese leaves the slack-take-up roller 391.

Downward movement of the plate 435 is limited by engagement of a portion 438 (Figs. 40 and 70) on said plate with a fixed stop 439. The plate 435 is prevented from bounding or vibrating while the winder-tending mechanism is passing around the ends of the winder by means of a latch 440 pivoted to said plate and arranged to engage the portion 441 of the stop 439. A spring 442 tends to hold the latch in locking position. As the plate 434 is swung upwardly by the cheese, said plate engages a finger 443 fixed to the latch 440 and disengages said latch from the locking portion 441. In the continuing upward movement of the plate 434 said plate raises the plate 435. As the cheese swings out from under the plate 434 it rolls into contact with the plate 435. The friction between the cheese and the plates 434 and 435 is sufficient to cause the cheese to revolve in the direction to wind up yarn and thus prevents the yarn from becoming slack.

The reason for providing two plates 434 and 435 is to cause the cheese to come into contact with the slack-preventing means promptly after the cheese leaves the slack-take-up roller 391. As shown in the drawings, the lower plate 434 is shorter than the upper plate 435, and when in its lowermost position is considerably closer to the axis of the arm 30 than the plate 435 (see Fig. 36). Thus the cheese comes into contact with the plate 434 very soon after the cheese is lifted off the slack-take-up roller 391, even in the case of a cheese of small diameter.

The plate 435 is arranged to remain in contact with the cheese until after the latter has touched the cam drum. It is undesirable to allow the plate to drop off the side of the cheese, since the side of the cheese is not quite vertical, and the pressure of the plate against the side of the cheese would tend to push the cheese off the hub 30ª and might result in unlatching the cheese from the hub. I therefore provide means for lifting the plate off the cheese soon after the cheese touches the cam drum, which means will now be described.

Rigid with the plate 435 is an arm 444 (Fig. 71) having a ratchet-toothed locking plate 445 attached thereto. The teeth of said locking plate are arranged to be engaged by a dog 446 pivoted to an arm 447 which is loosely mounted on the pivot 436. A spring 448 tends to move the dog 446 into engagement with the plate 445. 449 is an inclined tripping projection fixed in the framework and arranged to be engaged by the end of a dog 446 for disengaging said dog from the toothed plate 445. The arm 447 has a roller stud 450 which runs in a grooved cam 451 fixed upon the shaft 223.

In its rotation the cam 451 raises and immediately lowers the dog 445. In its descent the dog 445 lifts the plate 435 off the cheese. Such lifting of the plate is timed to occur a moment after the cheese touches the cam drum, assuming the cheese to be of the smallest diameter. A dwell portion of the cam now causes the dog to pause, after which the dog is lowered until it strikes the trip 449 whereupon the dog is disengaged from the plate 445 and the plate 435 drops until it strikes the plate 434 or until the stop 438 (Fig. 70) strikes the stop 439.

The provision of a plurality of teeth in the plate 445 enables the dog to lift the plate 435 just enough to be clear of the cheese, notwithstanding the fact that the plate 435 assumes different positions in accordance with variations in the diameters of the cheeses.

When the winder-tending mechanism is traveling around the ends of the winder, the teeth of the plate 445 are up out of reach of the dog 446, the dog sliding idly on the smooth surface 445ª (Fig. 72) of said plate.

After the lug 40 (Fig. 7) had left the arm 38ª in the throwing-out movement of the cheese, the spring 42 tilted the bell crank 38 until the parts 38ᶜ and 43ᵇ came into engagement with each other. In order to rock the bell crank so as to remove the arm 38ª from the path of return movement of the lug 40, and to hold the bell crank so that the pressure of the spring 42 shall not be applied to the cheese when the latter is returned into contact with the cam drum until after the cheese has been accelerated to full winding speed, there is mounted on the framework of the winder-tending mechanism a roller 433 (Fig. 40) arranged to pass under the arm 38ᵇ and thus raise said arm until a locking shoulder 43ᶜ on the arm 43ᵇ has passed under a lug 38ᵈ on the arm 38ᵇ. The bell crank is retained in this position by the arm 43ᵇ until after the cheese has been returned to the cam drum and accelerated.

After the cheese has been accelerated to normal winding speed, the bell crank 38 (Fig. 7) should be released in order that it may act to press the cheese against the cam drum. For this purpose there is mounted upon the framework of the winder-tending mechanism a roller 452 (Figs. 1 and 40) which passes under the forward end of the arm 38ᵇ and lifts said arm sufficiently to remove the lug 38ᵈ from the arm 43ᵇ. A moment thereafter another roller 453 (Figs. 1 and 40) passes over the arm 43ª and depresses said arm, thereby swinging the arm 43ᵇ outwardly. The roller 452 passes out from under the arm 38ᵇ before the roller 453 leaves the arm 43ª. As soon as the roller 452 leaves the arm 38ᵇ the spring 42 tilts the bell crank 38, thereby bringing the arm 38ª against the lug 40. The roller 453 then leaves the arm 43ª, whereupon the arm 43ᵇ springs into contact with the surface 44. The means for pressing the cheese against the cam drum and for preventing eccentricity of the yarn mass are then in the normal running position, as in Fig. 7.

The winder-tending mechanism comprises means for opening the yarn clearer 62 (Fig. 4) to receive the new thread, and for freeing the yarn clearer of accumulations of lint and foreign matter. This means, in the present embodiment, consists of a blade 454 (Figs. 3, 4, 6, 37 and 40) mounted on the winder-tending mechanism in position to pass through the slot 65 between the plates 63 and 64. Because of variations in the location of the slots of the different units, the blade 454 is mounted so as to be free to accommodate itself to the walls of said slots. Herein the blade 454 is shown as mounted upon a slide 455 (Fig. 3) which is mounted in a guide-way 456 in the bracket 248. 458 is a stop on the slide 455, said stop serving to limit adjusting movement of the blade 454 through contact of said stop with the adjacent portion of the bracket 248 and a stop consisting of the head 459 of a screw seated in said bracket. As the blade 454 passes through the slot 65, it pushes the arm 69 aside into the position shown in Fig. 5 and removes lint and other matter from said slot.

The detector fingers 79 are withdrawn from the abnormal position shown in Fig. 8, before the new thread is placed in running position, and are allowed to swing into contact with the thread after the latter is in place. This is accomplished, in the present embodiment, by means comprising a series of projections and cam surfaces carried by the framework of the winder-tending mechanism. (See Figs. 8 and 9). Before describing these, it may be stated that if an exhaust should occur in a unit just before the winder-tending mechanism reaches that particular unit, the link 33 of the unit may not have come to rest by the time the first detector-resetting projection reaches said link, and may swing into the path of movement of said projection. To hold any such link out of the way of the first resetting projection, I provide a guard plate 460 (Figs. 39 and 40) fixed in the framework of the winder-tending mechanism and having a rounded edge adapted to push back a link 33. As shown in Fig. 40, the first detector-resetting projection 461 is located rearwardly of and below the guard plate 460. Said projection is arranged to engage an arm 462 (Fig. 8) fixed to the rock shaft 80, said arm being substantially in the position indicated in Fig. 8 when the projection 461 approaches said arm. As the projection 461 passes the said arm, the shaft 80 turns until the arm 84 is in the path of a projection 463. The engagement of the projection 463 with the arm 84 causes the arm to turn into the position shown in Fig. 9, in which position the arm 84 is held for the required length of time by the dwell 464. The turning of the shaft 80 brings the detector fingers 79 into position to allow the new thread to pass into contact with the fingers 78. The dwell 464 is interrupted by an opening 465 (Figs. 9 and 39) through which the new thread passes as the cheese is moved into contact with the cam drum, the thread passing into the zig-zag guideway 61 and through the entrance slot 58 into the guard 57. The movement of the shaft produced by the projections 461 and 463 causes a bent finger 466 on said shaft to follow the link 33 as the latter swings by gravity toward its normal position, thus preventing said link from swinging into the path of the hook 34. In the travel of the winder-tending mechanism, the incline 467 permits the arm 462 to swing into contact with a dwell 468, after which the inclined surface 469 permits the shaft 80 to turn still further to place the detector fingers 79 in contact with the running thread. The detector fingers 79 are thus moved step by step toward their operative position so as not to strike the thread with undue momentum.

The new thread may extend from any point along the yarn mass on the reserve bobbin d. It will be evident from Fig. 1 that if the thread extends from a point near the tip of the bobbin the movement of the cheese into position upon the drum may not suffice to move the lower portion of the thread against the guide surface 64ª (Fig. 5) and close to the fingers 78 (Figs. 1 and 8). In order that the lower portion of the new thread shall always be thus positioned, and so that the detector fingers 79 may be placed upon the thread, I provide the following described device.

As the cheese is moving into contact with the cam drum, the lower portion of the new thread is forced toward the fingers 78 (Fig. 8) through the action of the rounded edge 470 (Fig. 39) of a flange 471 (Figs. 36, 40 and 41), said flange being integral with a plate 472 fixed in the framework of the winder-tending mechanism. The thread is thus pushed toward the yarn clearer and the fingers 78, after the detector fingers 79 have been placed in the position shown in Fig. 9. The straight edge 473 of the flange 471 holds the thread toward the unit until the detector fingers 79 move the thread away from said edge and against the fingers 78.

The yarn clearer is closed by means comprising, in this embodiment of the invention, an arm 474 (Figs. 5, 36, 39 and 41) which is pivoted at 475 to a bracket on the plate 472. 476 is a spring attached to an arm 477 which is rigid with the arm 474, said spring normally holding the arm 474 in position so that the angular end of said arm 474 may engage the free end of the arm 74. 478 is a stop pin limiting action of the spring 476. In the travel of the winder-tending mechanism the arm 474 is carried against the arm 74, thereby swinging the arm 69 across the slot 65 to confine the new thread in said slot. When the arm 74 strikes the stop 75, the arm 474 swings aside against the tension of the spring 476 to pass the arm 74.

The fingers 78 and the detector fingers 79 may be freed from waste pieces of yarn by suitable means, as, for example, a brush 479 (Figs. 1, 37 and 40). The brush is arranged to revolve in a horizontal plane and is mounted on the framework of the winder-tending mechanism in position to be carried into contact with the fingers 78 and 79 of successive units. The detector fingers 79 swing back against the torsion of the spring 83 as the brush 479 passes the fingers. The brush 479 consists of a core 480 (Fig. 50) carrying relatively long soft bristles. The core 480 is fixed to the lower end of a shaft 481 which is driven from the shaft 308 through intermeshing gears 482 (Fig. 40). The shaft 481 is incased within a sleeve 483 (Fig. 50) which is fixed in the framework of the winder-tending mechanism. Upon the lower portion of the sleeve 483 is rotatably mounted a spool 484. This spool is provided to permit of the convenient removal of any waste yarn which may become wound on said spool, and to keep such yarn from getting between the core 480 and the end of the sleeve 483.

Means is provided for detecting the fact that a cheese has reached the desired diameter. When such a cheese is reached by the winder-tending mechanism, devices are actuated to prevent the reserve thread from entering the knot-tying mechanism, to prevent the reserve thread from being pushed off the bridge 56, to prevent the reserve threads clamp 49 from being opened, and to prevent the reserve bobbin from being discharged into the bobbin holder 46. The means for preventing the reserve thread from entering the knot-tying mechanism comprises two arms 361 and 361ª (Fig. 61) arranged to be moved to deflect the reserve thread out of the path of the knot-tying mechanism as indicated by dotted lines in said Fig. 61. The arms 361 and 361ª are fixed upon a pivot 362 (Fig. 60) and their free ends extend forward beyond the tying bill and the flaring thread guides 339 and 342, as indicated in Figs. 56 and 60. Fixed to the pivot 362 is an arm 485 having an elongated opening 486 into which extends a crank pin 487 carried by a crank disk 488 (Fig. 56) fixed to the lower end of a rock-shaft 489. The means for rocking the shaft 489 comprises a pinion 490 (Fig. 73) fixed on the upper end of said shaft and meshing with a gear segment 491 carried by a lever 492 which is pivoted at 493. The means for moving the lever 492 comprises a spring 494 connected to said lever and a lever 495 loosely mounted on the pivot 493. One arm of the lever 495 carries a roller stud that lies in a groove 496 of a cam disk 497 fixed to the constantly rotating shaft 223. When the winder-tending mechanism reaches a full cheese, the lever 492 is connected to the lever 495 so as to be moved by the cam 497 against the tension of the spring 494. The means for thus connecting the levers 492 and 495 comprises a latch 498 (Fig. 76) pivoted upon one end of the lever 492 and having a projection 499 adapted to enter a locking recess 500 in the lower side of the lever 495. The latch 498 has a surface 498ª which is adapted to underlie the lever 495 and thus hold the projection 499 out of position to interfere with the movement of the lever 495. A spring 501 interposed between a portion of the lever 492 and the latch 498 tends to swing said latch into position for the projection 499 to enter the recess 500. Normally the latch 498 is locked against movement by the spring 501. When a full cheese is reached, the latch is unlocked so that when the cam 497 moves the lever 495 into the position shown by dotted lines in Fig. 73 and full lines in Fig. 76, the projection 499 shall enter the recess 500 thereby locking the arms 492 and 495 together. Upon the return of the lever 495 to the full line position shown (see Fig. 73), the lever 492 also is moved thereby turning the shaft 489 and causing the reserve thread deflecting arms 361 and 361ª to move into the position shown in dotted lines in Fig. 61.

The means for holding the latch 498 out of engagement with the lever 495 until a full cheese is reached, comprises an arm 502 (Figs. 73, 74 and 76) mounted on a pivot 502ª, said arm having a locking shoulder 503 adapted to engage a locking stud 504 thereby locking the latch 498. The arm 502 is moved into and out of position for engagement with the stud 504 through being connected with a feeler 505 mounted on the pivot 502ª. The end 506 of the feeler lies in the vertical plane occupied by the series of thrown-out cheeses and is arranged to engage a full cheese lying upon the roll 301. The normal position of the feeler 505 is adjustable to correspond with the size of cheese desired. The means for adjustably connecting the arm 502 and the feeler 505 comprises a worm 508 carried by the feeler and engaging a segment 509 carried by the arm 502. It will be seen that the worm and segment constitute a rigid connection between the feeler and the arm 502. The normal position of the feeler may be changed by rotating the knurled hand-wheel 510, said hand-wheel being locked in adjusted position by means of a spring plunger 511 (Fig. 75).

When the feeler 505 rises over a full cheese, the arm 502 is lifted thereby disengaging the shoulder 503 from the stud 504. The spring 501 then places the surfaces 498ª in contact with the lower side of the lever 495. Upon the next movement of the lever 495 into the position shown in Fig. 76, the projection 499 moves into the recess 500 under the action of the spring 501. When the lever 495 swings in the opposite direction it carries the latch 498 and the lever 492 with it, thereby turning the shaft 489 to place the arms 361 and 361ª in the dotted-line position shown in Fig. 61 and the full-line position shown in Fig. 60. This movement of the arms 361 and 361ª occurs just as the free ends of said arms arrive alongside the reserve thread. The reserve thread is thus pushed aside out of the path of the knot-tying mechanism, as shown in dotted lines in Fig. 61. The arms 361 and 361ª remain in this position during nearly a full revolution of the shaft 223 (Fig. 73). The feeler 505 having in the meantime passed the full cheese, the arm 502 has descended so that the shoulder 503 is engaged by the stud 504 when the lever 492 again moves to the dotted-line position shown in Fig. 73, the engagement of the stud 504 with the shoulder 503 causing the projection 499 to leave the recess 500.

When the reserve thread is deflected rearwardly out of the path of the knot-tying mechanism by the arms 361 and 361ª, as just described, the projection 360 (Fig. 61) passes clear of the lug 363 so that the reserve-thread clamp 49 is not opened.

The finger 430 is moved out of the way of the reserve thread and into the position shown in Fig. 60 at the same time that the arms 361 and 361ª are moved against said thread. The arm 431, to which the finger 430 is attached, is fixed to the shaft 432. Fixed to the upper end of said shaft is a crank arm 513 (Figs. 56 and 60) carrying a roller stud 514 that lies within an elongated opening 515 in the arm 485. When the arm 485 is moved by the crank pin 487, the arm 513 also is moved to withdraw the finger 430 from position to engage the reserve thread.

It will thus be seen that when a full cheese is met with, the reserve thread clamp 49 is not opened, the reserve thread is deflected out of the path of the knotter, and the finger 430 is moved aside so as to pass the reserve thread. The latter therefore remains in position to be tied to a cheese core *b* on the next round trip of the winder-tending mechanism.

After the reserve thread has been pushed out of the path of the tying mechanism, the exhausted thread is passed into said mechanism as usual, and severed by the shear blade 386 and the tying bill 328, the sheared-off portions being withdrawn by the air ducts 291 and 339, and the free end of the thread being wound up on the full cheese through the action of the slack-take-up roll 391. The cheese is thereafter transferred by the cam surface 424 to the cam drum just as though a reserve thread has been tied thereto. As soon as the surface 469 (Figs. 9 and 39) permits the detector fingers 79 to move the link 33 within the range of action of the hook 34, said hook throws out the cheese. The operative then replaces the cheese with a core *b* having a small amount of yarn thereon. It may be here stated that the cheeses are not intended to be wholly unwound in the warper creel, the cores being returned to the winder from the creel with a small amount of yarn remaining thereon.

If the new thread breaks while the winder-tending mechanism is passing the unit, or if for any reason the reserve thread has not been tied to the exhausted thread, the cheese is thrown out as soon as the surface 469 permits the link 33 to be moved into reach of the hook 34.

The winder-tending mechanism comprises means for tilting the pocket 46' of the bobbin-holder 46 to permit the spent bobbin to slide therefrom. Said means comprises a bar 516 attached to a bracket 517 which is fixed to the framework of the winder-tending mechanism. The front end of the bar 516 has an upwardly-inclined surface 518 which is arranged to pass under and raise the pin 46$^e$ which is rigid with the pocket 46', whereby the rear end of the pocket is lowered to carry the butt of the spent bobbin below the backstop 46$^a$. The bobbin thereupon slides out of the bobbin-holder and is received upon a conveyer or other suitable receptacle (not shown). As shown in Fig. 38, the upper edge of the bar 516 is made wavy so as to cause the pocket 46' to shake as the bar 516 is passing the pin 46$^e$, and thus insure that the bobbin shall slide out of the bobbin-holder. As the inclined surface 519 on the rear end of the bar 516 passes the pin 46$^e$, the spring 46$^d$ restores the pocket 46' to its normal position.

The winder-tending mechanism also comprises means for moving the support 47 out from under the reserve bobbin $d$ after the reserve thread has been tied to the axhausted thread. This means comprises a cam 520 (Fig. 56) which is mounted upon the arm 431. In the travel of the winder-tending mechanism the cam 520 is carried against the crank arm 47$^c$ of the reserve-bobbin holder 47 and raises said crank arm to withdraw the support 47 from beneath the reserve bobbin. The latter thereupon drops into the open upper side of the bobbin-holder 46, the descent of the bobbin assisting to take up any slack there may be in the new thread. Referring to Fig. 56: 522 is an arm pivoted at 523 and yieldingly held in normal position by a spring 524. 525 is a stop-pin engaged by an arm 526 which is rigid with the arm 522. The arm 522 travels above the series of cranks 47$^c$. As a crank arm 47$^c$ rides up the cam 520, the crank arm raises the arm 522, thereby stretching the spring 524. After the crank arm has passed the high point of the cam 520, the arm 522 forces the crank arm down and thus promptly restores the reserve bobbin support 47 to position over the bobbin-holder, in which position the reserve bobbin support keeps the bobbin from rearing.

When a full cheese is reached by the winder-tending mechanism, the arm 431 is moved as heretofore described to withdraw the cam 520 from position to operate the crank arm 47$^c$ of that particular unit.

A cheese may happen to fall into the space behind the series of brackets 48, or the operative may lay some article in said space. To throw out the clutch 208—209 (Fig. 38) in the event that the winder-tending mechanism meets some such obstruction I provide a feeler 527 (Figs. 1, 39 and 40) of suitable shape to travel through said space, said feeler being carried by a bar 528 (Fig. 40) which is slidable in the framework of the winder-tending mechanism, in the plane of movement of said mechanism. On said bar is an inclined surface 529 adapted to raise a cam member 530 into position to engage a cheese arm that has been lifted by the plow 250. A cheese arm thus engaged by the cam member 530 is forced against the edge 274 of the member 267, whereby the member 267 is lifted and the latch lever 217 withdrawn from the clutch lever 214, thus stopping the travel of the winder-tending mechanism. The obstruction having been removed and the feeler 257 drawn forward to normal position, the mechanism is again set in operation.

The air discharged from the exhauster 225 may, if desired, be directed by means of a nozzle 531 (Figs. 1 and 36) against the parts adjacent to the path of the running thread, for the purpose of preventing the accumulation of lint and dirt near the thread.

If the stop finger 466 should be broken, the throwing of the cheese into contact with the cam drum might cause the loop 33 to swing into the path of the hook 34 and thereby cause the cheese to be thrown out. To prevent the cheese or cheese arm, when thus thrown out, from striking or fouling on the nozzle 531 there is provided on the winder-tending mechanism a guard-bracket 532 (Figs. 36, 39 and 40) located behind the nozzle.

For manually actuating the winder-tending mechanism (with the exception of the exhauster), I provide a hand-crank 533 (Fig. 38) fixed to a shaft 534 mounted in bearings 535 and 536. On said shaft is secured a pinion 537 arranged to mesh with the spur gear 289. A spring 538 normally holds the shaft 534 in such position that the pinion is out of mesh with the spur gear. When the mechanism is to be driven by hand, the pinion is locked in mesh with the gear 289 by means of a detent 539 pivoted at 540 (Fig. 37) and adapted to enter an annular groove 541 (Fig. 38) in the shaft 534. When the mechanism is to be manually actuated, the clutch 208—209 is first thrown out.

The exhauster may be driven by the motor 103 while the remainder of the winder-tending mechanism is being manually actuated, the hand lever 239 providing means for connecting and disconnecting the exhauster at will.

542 (Fig. 38) is a vacuum gage connected to the pipe 242 by a tube 543.

As indicated by the several yarn masses shown in Fig. 54, the various instrumentalities mounted on the traveling carriage act concurrently upon several winder units.

While the present embodiment of the invention has been described in considerable detail it will be understood that the invention is not limited to the construction and arrangement of parts herein desclosed, as many modifications and rearrangements may be made within the scope of the appended claims without departing from the spirit of the invention.

In certain of the following claims I have used the term "winding couple" to indicate two yarn masses, one of which is being unwound onto the other, without regard to the size, form or location of such masses.

This application is a continuation in part of application Serial No. 809,797 filed December 31, 1913.

I claim as my invention:

1. In a winder, a row of winder units, each unit including a pivoted yarn-mass-supporting arm and a device to throw out the arm, a device arranged to travel along the units to operate upon the arms, and means traveling with said device for detecting a displaced thrown-out arm.

2. In a winder, a row of winder units, each unit including a pivoted yarn-mass-supporting arm and a device to throw out the arm, a carriage arranged to travel along the row of units, a plow on the carriage for positioning a thrown-out arm, and a device on the carriage for detecting a displaced thrown-out arm.

3. A winder having, in combination, a row of winder units, each unit including a pivoted yarn-mass-supporting arm and a device to throw out the arm, a carriage arranged to travel along the row of units, a device on the carriage for positioning a thrown-out arm, a detector on the carriage for detecting a displaced thrown-out arm, driving means for the carriage, and means actuated by said detector for throwing the driving means out of operation.

4. A winder having, in combination, a row of winder units, each unit including a pivoted yarn-mass-supporting arm and a device to throw out the arm, a carriage arranged to travel along the row of units, a plow on the carriage to engage thrown-out arms, and a device yieldably mounted on the carriage and forming with said plow a passageway of sufficient width to admit a single arm.

5. A winder having, in combination, a row of winder units, each unit including a yarn-mass-supporting arm arranged to be thrown into and out of operative position, a carriage arranged to travel along the row of units, and devices mounted on the carriage and forming a passageway of sufficient width to admit a single thrown-out arm, a portion of said devices being yieldable upon contact with a displaced arm.

6. A winder having, in combination, a row of winder units, each unit including a yarn-mass-supporting arm arranged to be thrown into and out of operative position, a carriage arranged to travel along the row of units, a member on the carriage to throw out the arms, and devices mounted on the carriage and forming a passageway of sufficient width to admit a single thrown-out arm, a portion of said devices being yieldable upon contact with a displaced arm.

7. A winder having, in combination, a row of winder units, each unit including a pivoted yarn-mass-supporting arm and a device to throw out the arm, a carriage arranged to travel along the row of units, a plow on the carriage to engage thrown-out arms, and a device yieldably mounted on the carriage and forming with said plow a passageway of sufficient width to admit a single arm, driving means for the carriage, and means actuated by the yieldable device for throwing the driving means out of action.

8. A winder having, in combination, a row of winder units each unit including a pivoted yarn-mass-supporting arm and a device to throw out the arm, a device arranged to travel along the units to operate upon the arms, means traveling with said device for detecting displaced thrown-out arms, and means controlled by the detecting device for stopping the travel of the second-mentioned device.

9. A winder having, in combination, a row of winder units each including a pivoted yarn-mass-supporting arm and a device to throw out the arm, a carriage arranged to travel along the row of units, a plow on the carriage for positioning a thrown-out arm, a device on the carriage for detecting a displaced thrown-out arm, and means controlled by the detecting device for stopping the travel of the carriage.

10. A winder comprising a series of winder units and a mechanism arranged to travel along the series and operate upon the units, characterized by the fact that means is combined with the winder for automatically stopping and restarting said mechanism after each trip along the series of units.

11. A winder having, in combination, a series of supports for yarn containers, a device reciprocable into contact with the end of a container, and means for causing relative separating movement between said device and successive supports in a direction at right angles to the line of reciprocation of said device.

12. A winder having, in combination, a row of winder units, each including a rotary drum and a pivoted arm to support a yarn-mass in contact with the drum, a carriage arranged to travel along the row of units, and a device on the carriage to move said arms away from the drums.

13. A winder having, in combination, a series of movable yarn mass supports, a carriage arranged to travel along the series, and means on said carriage for selectively engaging said yarn mass supports to move them out of operative position.

14. A winder having, in combination, a row of winder units, each including a pivoted yarn-mass-supporting arm, a detector to detect exhaustion of the thread of the unit, and a device controlled by the detector for throwing out the arm; a carriage arranged to travel along the row of units, a device on the carriage to sever the threads of units whose arms have not been thrown out, and a device on the carriage to throw out the last mentioned arms.

15. A winder having, in combination, a row of winder units each including a pivoted yarn-mass-supporting arm, a carriage arranged to travel along the row of units, a device on the carriage to throw out the arms, an end-finder on the carriage, and a device on the carriage to move the thrown-out arms to position the yarn-masses on the end-finder.

16. A winder having, in combination, a row of brackets; an arm pivoted upon each of said brackets; a carriage arranged to travel along said row; and two plows fixed to said carriage and extending forwardly therefrom, one of said plows being arranged to travel at one side of the row of brackets, and the other plow being arranged to travel at the other side of the row of brackets, one of said plows being arranged to lift arms lying in its path and deposit them in the path of the other plow.

17. A winder having, in combination, a row of brackets, an arm pivoted upon each of said brackets; a carriage arranged to travel along said row; and two plows fixed to said carriage, one of said plows being arranged to travel at the inner side of the row of brackets, and the other plow being arranged to travel at the outer side of the row of brackets, the inner plow being arranged to lift arms lying in its path and deposit them in the path of the outer plow.

18. A winder having, in combination, a pivoted arm having a hub adapted to receive a tubular yarn container, said hub having a stop portion to determine the position of the container on the hub, a driving roll arranged for peripheral contact with the yarn container, said arm being arranged to swing to place the yarn container in and out of contact with the roll, and means acting when the arm is in inoperative position for insuring that the container is in contact with said stop portion.

19. A winder having, in combination, a series of supports for yarn-containers; a carriage arranged to travel along said series; container-seating means mounted on said carriage and arranged to strike successive containers; and a plow on said carriage arranged to lift each support to carry the respective container above the seating means after the latter has acted on such container.

20. A winder having, in combination, a series of supports for yarn-containers; a container-seating member arranged to travel along the series and engage successive containers; and means for raising each support to carry the respective container above the seating member after the latter has acted on such container.

21. A winder having, in combination, a series of supports for tubular yarn-containers, each support being movable into and out of operative position; and container-seating means arranged to travel along said series and strike successive containers when in inoperative position.

22. A winder having, in combination, a series of pivotal supports for yarn-containers, all of said pivotal supports extending in the same direction; a container-seating member arranged to travel in the same direction along the series and reciprocable in said direction into and out of contact with one end of each container.

23. A winder having, in combination, a series of devices for supporting yarn-containers for rotation upon horizontal axes, a container-seating member arranged to travel along the series; and means for horizontally reciprocating said member into and out of contact with one end of each container.

24. A winder having, in combination, a pivoted arm having a hub adapted to receive a tubular yarn container, said hub having a stop portion to determine the position of the container on the hub, a driving roll arranged for peripheral contact with the yarn container, said arm being arranged to swing to place the yarn container in and out of contact with the roll, and a member to press the container against said stop portion.

25. A winder having, in combination, a pivoted arm having a hub adapted to receive a tubular yarn container, a spring locking member on the hub adapted to engage the container to retain it on the hub, a driving roll arranged for peripheral contact with the yarn container, said arm being arranged to swing to place the yarn container in and out of contact with the roll, and means acting when the arm is in inoperative position to push the container into position where said locking member will be effective.

26. In a winder, a carriage, a knotter stationarily mounted on the carriage for uniting two threads, yarn-mass-rotating means on the carriage for taking up slack in the united threads, and supplementary means on the carriage located between the knotter and the yarn-mass-rotating means, to take up slack in the united threads.

27. A winder having, in combination, a row of winder units each comprising a support movable to place a yarn container in and out of operative position, a carriage arranged to travel along the row of units, a device on the carriage to engage the ends of the containers to stop rotation of said containers and means to move the supports to withdraw the containers from the path of said device.

28. In a winder, a carriage, a knotter stationarily mounted on the carriage for uniting the threads of two yarn masses, a roller on the carriage for supporting and rotating one of the yarn masses to take up slack in the united threads, and a finger on the carriage arranged to press against the united threads to take up slack therein.

29. A winder-tending mechanism having, in combination, a suction air duct; a thread severing blade reciprocable across the mouth of said duct and located within said duct; and a stationary blade arranged to coact with the reciprocable blade.

30. A textile machine having, in combination, a suction air duct having a suction opening, and a thread-severing device located below said suction opening and comprising a member movable transversely of the suction opening to engage a strand extending through said opening.

31. A textile machine having, in combination, a suction air duct having a suction opening, and a thread-severing device located below said suction opening and comprising a member movable transversely of the suction opening to engage a strand extending through said opening, a space being provided between said movable member and one end of the suction opening to receive another strand.

32. A winder-tending mechanism having, in combination, a carriage; means for causing the carriage to travel; a cheese-rotating roll on said carriage; a suction device arranged adjacent to the rear end of the roll; another cheese-rotating roll arranged rearwardly of the suction device; a thread-carrying arm arranged to swing in the space between the suction device and the second-mentioned roll; and means for driving said rolls, the second-mentioned roll being driven at a higher peripheral speed than the other roll to furnish slack to the arm.

33. A winder-tending mechanism having, in combination, a carriage; means for causing the carriage to travel; a cheese-rotating roll on said carriage; a suction device arranged adjacent to the rear end of the roll; another cheese-rotating roll arranged rearwardly of the suction device; a thread-carrying arm arranged to swing in the space between the suction device and the second-mentioned roll; a slack-take-up roll arranged rearwardly of the second-mentioned roll; and means for driving said rolls, the slack-take-up roll being driven in the direction opposite to the direction of rotation of the other rolls, and the second-mentioned roll being driven at a higher peripheral speed than the first roll to furnish slack to the arm.

34. A winder having, in combination, a row of winder units, a knotter for uniting two threads, yarn-mass-rotating means for taking up slack in the united thread, supplementary means arranged to press against the thread to take up slack therein and means for causing the knotter, the yarn-mass-rotating means and the pressing means to travel along the row of units and operate upon the threads of successive units.

35. A winder having, in combination, a row of winder units, a knotter for uniting the threads of two yarn masses, a roller for rotating one of the yarn masses to take up slack in the united thread, a spring finger arranged to press against the united thread to take up slack therein and means for causing the knotter, the yarn-massing-rotating means and the pressing means to travel along the row of units and operate upon the threads of successive units.

36. The combination of a winder unit and mechanism arranged to travel past said unit to unite the exhausted and a reserve thread, said mechanism comprising a knot-tying mechanism, a yarn-mass-rotating roller for taking up slack in the united threads, and a spring finger arranged to press against the united threads to take up slack therein.

37. The combination of a winder unit and mechanism arranged to travel past said unit to unite the exhausted and a reserve thread, said mechanism comprising knot-tying means; means providing a passageway extending in the direction of travel of said mechanism, through which passageway the united threads extend, yarn-mass-rotating means located at one side of said passageway for taking up slack in the united threads, and supplementary means arranged to press against the united threads to take up slack therein.

38. The combination of a winder unit and mechanism arranged to travel past said unit to unite the exhausted and a reserve thread, said mechanism comprising knot-tying means, means providing a passageway extending in the direction of travel of said mechanism, through which passageway the united threads extend, yarn-mass-rotating means located at one side of said passageway for taking up slack in the united threads, and a spring-pressed finger arranged to press against the united threads to take up slack therein.

39. A winder-tending mechanism having, in combination, a carriage; means for causing the carriage to travel; a cheese-rotating roll on said carriage; a suction device arranged adjacent to the rear end of the roll; a second cheese-rotating roll arranged rearwardly of the suction device; a down-take arm arranged to swing in the space between the suction device and the second roll; a slack-take-up roll arranged rearwardly of the second roll; means for driving said rolls, the slack-take-up roll being driven in the direction opposite to the direction of rotation of the other rolls, and the second roll being driven at a higher peripheral speed than the first roll to furnish slack to the down-take arm; and means for raising and lowering the slack-take-up roll to lift the cheese off the second roll.

40. A winder-tending mechanism having, in combination, a carriage, a knotter, an arm to carry a thread of a cheese to the knotter, a roll for rotating the cheese to furnish slack to the arm, a roll for rotating the cheese in the opposite direction to take up slack in the thread, and means for raising and lowering the second roll to lift the cheese off the first roll.

41. A winder having, in combination, a roll for rotating a yarn mass in one direction, a roll for rotating the yarn mass in the opposite direction, said rolls passing the yarn mass successively, and means for bodily moving one of the rolls to remove the yarn mass from driving contact with the other roll.

42. A winder-tending mechanism having, in combination, two hinged plates, one above the other, the lower plate being shorter than the upper plate; and means for swinging a cheese into contact with the under sides of said plates.

43. A winder-tending mechanism having, in combination, two hinged plates, one above the other, the lower plate being shorter than the upper plate; and means for swinging a cheese into contact with the under sides of said plates, the lower plate being adapted to raise the upper plate.

44. A winder-tending mechanism having, in combination, two hinged plates, one above the other, the lower plate being shorter than the upper plate, a stop to limit downward movement of the upper plate; a stop to limit downward movement of the lower plate; means for locking the upper plate in its lowermost position; and means for moving a cheese into contact with the lower sides of said plates, the lower plate being adapted to operate said locking means to release the upper plate.

45. A winder-tending mechanism adapted to operate upon cheeses and having, in combination, a curved plate adapted for contact with the periphery of a cheese, said plate being mounted to swing; and means for lifting said plate off the cheese.

46. A winder-tending mechanism having, in combination, a plate mounted to swing; an arm mounted to swing on the axis of said plate; an arm fixed to said plate and having a plurality of ratchet teeth; a dog carried by the first mentioned arm; a spring tending to move said dog into engagement with any of the teeth on the toothed arm; means for swinging the first mentioned arm; and means for disengaging the dog from the toothed arm when the first mentioned arm is moved in a certain direction.

47. A winder having, in combination, a rotary cam drum; a cheese-supporting arm which is pivotally movable to carry the cheese into and out of contact with the drum; a carriage movable past said arm and cam drum; means on said carriage for moving the arm to place the cheese on the cam drum; a hinged curved plate on said carriage with which plate the cheese makes peripheral contact when moving toward the cam drum; and means for raising said plate off the cheese.

48. A winder having, in combination, a rotary cam drum; a cheese-supporting arm which is pivotally movable to carry the cheese into and out of contact with the drum; a carriage movable past said arm and cam drum; means on said carriage for moving the arm to place the cheese on the cam drum; a hinged curved plate on said carriage with which plate the cheese makes peripheral contact when moving toward the cam drum; an arm mounted to swing on the axis of said plate; an arm fixed to said plate; a dog carried by the second mentioned arm and adapted to engage the third mentioned arm; and means for moving the second mentioned arm to lift the plate off the cheese.

49. A winder having, in combination, a rotary cam drum; a cheese-supporting arm which is pivotally movable to carry the cheese into and out of contact with the drum; a carriage movable past said arm and cam drum; means on said carriage for moving the arm to place the cheese on the cam drum; a hinged curved plate on said carriage with which plate the cheese makes peripheral contact when moving toward the cam drum; an arm mounted to swing on the axis of said plate; an arm fixed to said plate and having a plurality of ratchet teeth; a dog carried by the second mentioned arm and adapted to engage any of the teeth on the third mentioned arm; and means for moving the second mentioned arm to lift the plate off the cheese.

50. A winder having, in combination, a rotary cam drum for rotating a yarn mass and traversing the yarn, a device providing a zig-gag passage for the yarn, and means for placing the yarn mass on the drum and for placing the yarn in operative relation to said device.

51. A winder having, in combination, a rotary cam drum for rotating a yarn mass and traversing the yarn, a bobbin-support, a pivoted arm for supporting the yarn mass for movement into and out of contact with the drum, a device providing a zig-zag passage for the yarn extending from a bobbin on the bobbin-support to the yarn mass, and means for swinging the arm to place the yarn mass on the drum and for placing the yarn in operative relation to said device.

52. A winder having, in combination, means for supporting a winding couple, a detector located between the members of the couple, said detector comprising a pivoted finger for engaging the thread of the couple, and a mechanism movable past the winding couple for operating upon said couple, said mechanism including a device for pushing the thread within reach of said finger.

53. A winder having, in combination, means for supporting a winding couple, a movable detector finger for engaging the thread of the couple, and a mechanism movable past the winding couple for operating upon said couple, said mechanism including a fixed member having a cam edge for pushing the thread within reach of said finger.

54. A winder having, in combination, means for supporting a winding couple, a movable detector finger for engaging the thread of the couple, a carriage arranged to travel past the winding couple, and a member on the carriage extending substantially parallel with the path of movement of the carriage and relatively close to the vertical plane of the detector finger, said member having a curved forward portion to engage the thread of the couple and push said thread within reach of the detector finger.

55. A winder having, in combination, means for supporting a winding couple, a detector arranged to engage the thread of the couple, a carriage movable past the couple, a device on the carriage to place the receiving member of the couple in operative position, a series of devices on the carriage to operate the detector, said series being interrupted to permit the thread to pass therethrough, and a member on the carriage below said series and having a surface adapted to push the thread toward operative relation with the detector.

56. A winder having, in combination, means for supporting a winding couple, a detector arranged to engage the thread of the couple, a carriage movable past the couple, a device on the carriage to place the receiving member of the couple in operative position, and a series of cam members fixed on the carriage to operate the detector, there being a gap in said series intermediate the ends of the series to permit the thread to pass toward operative relation to the detector.

57. A winder having, in combination, means for supporting a winding couple, a detector arranged to engage the thread of the couple, a carriage movable past the couple, a device on the carriage to place the receiving member of the couple in operative position, and a series of devices on the carriage to operate the detector, said series being interrupted to permit the thread to pass therethrough.

58. A winder having, in combination, means for supporting a winding couple, a detector for the thread of the couple, a throw-out member, a device arranged to travel past the detector to reset the detector, and a device traveling with the resetting device to prevent the throw-out member from engaging the resetting device.

59. A winder having, in combination, a series of supports for yarn masses; a carriage arranged to travel along said series; a roll on said carriage for rotating the yarn masses successively; and means for pressing the yarn masses succesively againt the roll.

60. A winder having, in combination, a series of supports for yarn masses; a carriage arranged to travel along said series; a roll on said carriage for rotating the yarn masses successively; and means on said carriage arranged to act upon the successive supports for pressing the respective yarn masses against said roll.

61. A winder having, in combination, a series of pivoted levers, each arranged to support a yarn mass; a carriage arranged to travel along the series; a roll on said carriage for rotating the yarn masses successively; and a spring-pressed member on said carriage arranged to press against the levers as the carriage progresses for pressing the yarn masses against the roll.

62. A winder having, in combination, means for rotating a yarn mass, a pivoted member for supporting a yarn mass in contact with said rotating means, a bell-crank lever, one arm of which is arranged to act upon said pivoted member, a spring acting upon the other arm of the bell-crank lever, means to restrain the movement of the last mentioned arm under the action of the spring; and means to reset the restraining means.

63. A winder having, in combination, yarn-mass rotating means, a pivoted arm for supporting a yarn-mass on said rotating means; a spring-pressed member against which a portion of said arm is arranged to bear to press the yarn-mass against said rotating means, said member tending to move in a certain direction; means for preventing movement of said member in said direction; and means to reset the preventing means.

64. A winder having, in combination, yarn-mass rotating means; a pivoted arm for supporting a yarn mass on said rotating means; a bell-crank against which a portion of said arm is arranged to bear, a spring acting upon said bell-crank to resist movement of said arm-portion in one direction; means to prevent said bell-crank from following said arm-portion when the latter moves in the opposite direction; and means to reset the preventing means.

65. A winder having, in combination, yarn-mass rotating means, a pivoted lever for supporting a yarn mass on said rotating means; a bell-crank against one arm of which a portion of said lever is arranged to bear; a bell-crank, one arm of which underlies the other arm of the first mentioned bell-crank; a spring strained between said other arm of the first mentioned bell-crank and the other arm of the second mentioned bell-crank, means to lift said other arm of the first mentioned bell-crank; and means to depress said other arm of the second mentioned bell-crank.

66. A winder having, in combination, a pivoted arm, a spring acting on the arm, a stop to prevent movement of the arm under the action of the spring, said stop being movable to follow said arm in one direction and thus remain in operative relation to the arm, and a resetting device to move the stop in the opposite direction.

67. A winder having, in combination, a pivoted arm arranged to resist certain movement of a yarn mass, a stop to prevent movement of the arm in one direction, said stop being movable to follow the arm, a device to disengage the arm from the stop, and a device to reset the stop.

68. A winder having, in combination, a series of yarn clearers each adapted to be opened to receive a thread, a carriage arranged to travel along the series, and a device on the carriage for successively opening the yarn clearers for the reception of threads.

69. A winder having, in combination, a series of yarn clearers, each having a slot for a thread, a carriage arranged to travel along the series, and a device mounted on the carriage in position successively to enter the slots of the yarn clearers.

70. A winder having, in combination, a series of winder units each including winding means and a clearer for the yarn being wound, a carriage arranged to travel along the series, and mechanism on the carriage for operating in succession upon the units, said mechanism including a clearing device for successively engaging and cleaning the yarn clearers.

71. A winder having, in combination, a yarn clearer arranged to be opened and closed, a device for opening the yarn clearer, means for placing a thread in the yarn clearer, and a device for thereafter closing the yarn clearer.

72. A winder having, in combination, a series of yarn clearers each adapted to be opened to receive a thread, a carriage arranged to travel along the series, and devices on the carriage for opening and closing the yarn clearers.

73. A winder having, in combination, a pocket adapted to rotatably support a warp bobbin while the latter is being unwound, said pocket having an open upper side, a reserve bobbin support mounted for oscillation above the pocket, and means to swing the reserve bobbin support out from under the reserve bobbin to uncover the upper side of the pocket and allow the bobbin to descend approximately vertically into the pocket.

74. A winder having, in combination, a support for a bobbin to be unwound, a rotatory drum, means for supporting a receiving yarn container on the drum, a detector for the thread being wound, means controlled by the detector for moving said supporting means to withdraw said container from the drum, and means operating on the bobbin support for automatically effecting the removal of the spent bobbin from said support after the receiving container has been removed from the drum.

75. A winder having, in combination, a series of winder units each including means for rotating a receiving yarn mass, a supply bobbin support, and a reserve bobbin support, means acting successively on the units for uniting the thread of a reserve bobbin to the thread of the corresponding receiving yarn mass, and means for effecting the discharge of the reserve bobbin from its support to the corresponding supply bobbin support.

76. A winder having in combination, a series of winder units each including means for rotating a receiving yarn mass, a bobbin holder to support a supply bobbin, and a reserve bobbin support, a carriage arranged to travel along the series of units, means on the carriage for uniting the thread of a reserve bobbin to the thread of the corresponding receiving yarn mass, and means for effecting the discharge of the reserve bobbin from its support to the corresponding bobbin holder.

77. A winder having, in combination, a series of pivoted bobbin supports, a back stop associated with each support, and a device arranged to travel along the series for pivotally moving the bobbin supports in succession to carry the bobbins clear of the respective back stops.

78. A winder having, in combination, a series of bobbin-holders, a movable reserve-bobbin support above each bobbin-holder, each reserve-bobbin support having an arm, a carriage arranged to travel along the series, and a member on the carriage arranged to engage said arms successively for moving the reserve-bobbin supports to discharge the reserve bobbins into the bobbin-holders.

79. A winder, having in combination, two independent bobbin supports one below the other, the lower bobbin support having an open upper side and being adapted to support a bobbin for rotation during the delivery of yarn therefrom, the upper support being pivoted, and adapted and arranged to support a bobbin lying loosely thereon, and a device for pivotally moving the upper support to dump the bobbin laterally into the open upper side of the lower support.

80. A winder having, in combination, a series of winder units each including means for rotating a receiving yarn mass, a supply bobbin support, and a reserve bobbin support, a carriage arranged to travel along the series of units, means on the carriage for uniting the thread of a reserve bobbin to the thread of the corresponding receiving yarn mass, and means on the carriage for thereafter effecting the discharge of the reserve bobbin from its support to the corresponding supply-bobbin support.

81. A winder having, in combination, a series of active bobbin-supports, a series of reserve-bobbin supports, a device to effect the discharge of bobbins from the reserve-bobbin supports to the active bobbin-supports, and automatic means for selectively actuating said device.

82. A winder having, in combination, a series of pivoted bobbin-holders, a movable reserve-bobbin support for each bobbin-holder, a carriage arranged to travel along the series, a device on the carriage for pivotally moving the bobbin-holders in succession to discharge the spent bobbins, and a device on the carriage for moving the reserve-bobbin supports in succession to discharge the reserve bobbins into the bobbin-holders.

83. A winder having, in combination, a series of active-bobbin supports, a series of reserve-bobbin supports, and automatic mechanism for selectively effecting the transfer of bobbins from the reserve-bobbin supports to the active-bobbin supports.

84. A winder having, in combination, a series of active-bobbin supports, a series of movable reserve-bobbin supports, and automatic mechanism for selectively moving the reserve-bobbin supports to dump bobbins from the reserve-bobbin supports onto the active-bobbin supports.

85. A winder having, in combination, a row of yarn-mass supports; a carriage arranged to travel along the row; means on the carriage to support a yarn mass; and a gage member located on the carriage in position to touch a yarn mass while the latter is on said supporting means.

86. A winder having, in combination, a row of yarn-mass supports; a carriage arranged to travel along the row; a roll on the carriage to rotate a yarn mass; and a gage member pivoted on the carriage in position to touch a yarn mass while the latter is on the roll.

87. A winder having, in combination, a reserve thread holder; a knot-tying mechanism; means for causing relative approaching movement between the knot-tying mechanism and the reserve thread holder; and means for displacing the reserve thread to prevent action thereon by the knot-tying mechanism.

88. A winder having, in combination, a reserve thread holder; a knot-tying mechanism; means for moving said knot-tying mechanism past the reserve thread holder; a member at each side of the knot-tying mechanism for deflecting the reserve thread out of the path of movement of the knot-tying mechanism; and means for actuating said members.

89. A winder having, in combination, means for supporting a thread, a knot-tying mechanism, means for causing relative approaching movement between said mechanism and said supporting means, and means for preventing the thread from being engaged by the knot-tying mechanism as said mechanism and thread-supporting means pass each other.

90. A winder having, in combination, means for supporting a reserve thread; a knot-tying mechanism arranged to travel into operative relation to said supporting means; and means for preventing the reserve thread from being engaged by the knot-tying mechanism as said mechanism passes the thread.

91. A winder having, in combination, a reserve thread holder; a knot-tying mechanism; a carriage on which said mechanism is mounted; means for moving the carriage toward the reserve thread holder; and means on said carriage for displacing the reserve thread to prevent action thereon by the knot-tying mechanism.

92. A winder having, in combination, a reserve thread holder; a knot-tying mechanism; means for moving said knot-tying mechanism past the reserve thread holder; a device movable transversely of the path of movement of the knot-tying mechanism for deflecting the reserve thread out of the path of movement of the knot-tying mechanism; and means for operating said device.

93. A winder having, in combination, means for supporting yarn masses and means for supporting reserve threads, traveling means for detecting yarn masses of predetermined size; a traveling knot-tying mechanism; and means actuated by said detecting means for preventing a reserve thread from being engaged by the knot-tying mechanism as said mechanism passes the thread.

94. The combination of a winder unit including means for supporting a yarn mass and a reserve thread holder; a knot-tying mechanism; means for moving the knot-tying mechanism past the reserve thread holder; means for gaging the yarn mass; and means actuated by said gaging means for displacing the reserve thread to prevent action thereon by the knot-tying mechanism.

95. A winder having, in combination, a winder unit including means for supporting a yarn mass and a reserve thread holder; a knot-tying mechanism; means for moving said knot-tying mechanism past the reserve thread holder; a member at each side of said knot-tying mechanism, said members being movable transversely of the path of movement of the knot-tying mechanism for deflecting the reserve thread out of the path of movement of the knot-tying mechanism; means for gaging the yarn mass; and means actuated by said gaging means for operating said members.

96. A winder having, in combination, a row of active-bobbin supports, a row of pivoted reserve-bobbin supports above said other row, and means for pivotally moving the reserve-bobbin supports out from under the reserve bobbins to dump the reserve bobbins onto the active-bobbin supports.

97. A winder having, in combination, a winder unit including means for supporting a yarn mass and a reserve thread holder; a knot-tying mechanism; means for moving the knot-tying mechanism past the reserve thread holder; a device movable transversely of the path of movement of the knot-tying mechanism for deflecting the reserve thread out of the path of movement of the knot-tying mechanism; means for gaging the yarn mass; and means actuated by said gaging means for operating said deflecting means.

98. A winder having, in combination, a thread clamp, a clamp opener, a thread deflector, and means for moving one of the last mentioned two elements into operative position and the other into inoperative position.

99. A winder having, in combination, a clamp for a reserve thread; a knot-tying mechanism; a device for opening said clamp, means for moving the knot-tying mechanism and the clamp opener past the reserve thread clamp, a device also traveling with said knot-tying mechanism and clamp opener for deflecting the reserve thread out of the path of movement of the knot-tying mechanism; and means for moving said clamp opener and thread-deflecting device into and out of operative position.

100. A winder having, in combination, means for supporting a yarn mass and a clamp for a reserve thread; a knot-tying mechanism; a device for opening said clamp; means for moving the knot-tying mechanism and the clamp opener past the reserve thread clamp; a device also traveling with said knot-tying mechanism and clamp opener for deflecting the reserve thread out of the path of movement of the knot-tying mechanism; means for gaging the yarn mass; and means actuated by said gaging means for moving said clamp opener and thread-deflecting device into and out of operative position.

101. A winder having, in combination, a series of bobbin-holders, a movable reserve-bobbin support above each bobbin-holder, each reserve-bobbin support having an arm, a carriage arranged to travel along the series, a member on the carriage arranged to engage said arms successively for moving the reserve-bobbin supports to discharge the reserve bobbins into the bobbin-holders, and means to move said member into inoperative position.

102. A winder having, in combination, a bobbin-holder, a reserve-bobbin-support, means for uniting the thread of the reserve bobbin to another yarn mass, means for effecting the transfer of the reserve bobbin to the bobbin-holder, a gage for gaging the yarn mass, and means controlled by the gage for preventing effective action of the uniting means and the transferring means.

103. A winder comprising a plurality of winder units and a traveling mechanism to operate on the units, each unit having a pair of bobbin containers, characterized by the fact that an invariable one of the pair of bobbin containers is intended to receive the bobbin, and that the traveling mechanism comprises means to transfer the bobbin to the other container to be there rewound upon a receiving yarn container.

104. A winder as specified in claim 103, having means to render the transferring means ineffective when the receiving yarn container has been filled.

105. A winder having, in combination, a series of winder units, each including a detector consisting of a pivoted finger, a spring for actuating the finger, and a coacting part; a carriage arranged to travel along the series; a device on the carriage for moving the finger against the tension of its spring, and a brush on the carriage arranged to brush said finger and coacting part after the finger has been moved against the tension of its spring.

106. A winder having, in combination, an elongated framework, winder units on the framework, an endless support carried by the framework and comprising two parallel straight portions connected by a semicircular portion, a carriage arranged to travel upon said support, and supplemental means to guide the carriage while the latter is passing from a straight portion to the curved portion and vice versa.

107. A winder having, in combination, an elongated framework, winder units on the framework, an endless support carried by the framework and comprising two parallel straight portions connected by a semicircular portion, a carriage having two rollers arranged to run upon said support, supplemental guide rails, and a roller on said carriage arranged to engage the supplemental guide rails to guide the carriage while the latter is passing from a straight portion to the curved portion and vice versa.

108. A winder having, in combination, an elongated framework, winder units on the framework, an endless support carried by the framework and including straight and curved portions, a carriage arranged to travel upon said support, an endless rack associated with the support, a driving pinion on the carriage arranged to mesh with the rack, a roller on the carriage to hold the pinion in mesh with the rack, and supplemental means to hold the pinion in mesh with the rack while the carriage is passing from one portion of the support to another.

109. A winder having, in combination, an endless mechanism-supporting rail having straight parallel sides united by a curved end portion, and a curved rail coöperating with the curved end-portion to form a substantially circular track at the end of the straight parallel sides and a carriage having rollers to run upon the upper edge of said rails and guide rollers to engage the vertical sides of the endless rail.

110. A winder having, in combination, a plurality of winder units arranged in two rows; two straight parallel rail sections extending longitudinally of and above said rows; a curved track section joining the ends of said rail sections; a carriage having a base provided at one end with a roller arranged to run upon one of said rail sections and at its other end with a roller arranged to run upon the other of said rail sections and upon said curved track section; a curved track upon which the first mentioned roller runs when the second mentioned roller is traversing the first mentioned curved track section, said carriage comprising a portion depending from one end of said base; and mechanism on said depending portion adapted to operate upon said units.

111. A winder having, in combination, a plurality of winder units; a carriage arranged to travel along the winder, said carriage comprising a base, an electric motor on one end of said base, an air-current-creating means on the other end of said base, a driving connection between the motor and the current-creating means; a framework depending from one end of said base; mechanisms on said depending framework for operating on the winder units; a driving connection between the motor and said operating mechanisms; and a centrifugal thread-separator mounted on said depending framework and operatively connected to said air-current-creating means.

112. A winder having, in combination, an elongated framework, winder units on the framework, a single endless rail carried by the framework above the winder units, a carriage comprising a base, the opposite ends of which are arranged to be supported by said rail at opposite sides of the framework, a motor on one end of the base, an air-current-creating device on the other end of the base, a frame attached to one end of the base and extending downwardly in front of the units, and devices on said frame for operating on the units, said devices being driven by the motor.

113. A winder having, in combination, two parallel rows of winder units; a mechanism arranged to travel around the winder and operate upon said units; an electric motor traveling with said mechanism for driving the latter; an electrical conductor extending longitudinally of the winder and between the two rows of winder units; and contact means traveling with said mechanism and arranged to be in contact with said conductor.

114. A winder having, in combination, two parallel rows of winder units; a support above said row of units; a mechanism carried by and arranged to travel along said support for operating upon the units, said mechanism being arranged to turn through a half revolution at each end of said support; a motor traveling with said mechanism for driving the latter; an electrical conductor extending longitudinally of the winder between the two rows of units; and contact means carried by said mechanism and arranged to engage said conductor, said contact means being rotatably connected to said mechanism.

115. A winder having, in combination, two parallel rows of winder units; a support above said rows of units; a mechanism carried by and arranged to travel along said support for operating upon the units, said mechanism being arranged to turn through a half revolution at each end of said support; a motor traveling with said mechanism for driving the latter; an electrical conductor extending longitudinally of the winder between the two rows of units; contact means carried by said mechanism and arranged to engage said conductor, said contact means being rotatably connected to said mechanism; and means to prevent the contact means from rotating when the mechanism turns.

116. A winder having, in combination, two parallel rows of winder units; a support on the winder above said rows of units; a mechanism carried by and arranged to travel along said support for operating upon the units, said mechanism being arranged to turn through a half revolution at each end of said support; a motor traveling with said mechanism for driving the latter; an electrical conductor supported on the winder and extending longitudinally of the winder between the two rows of units; contact means carried by said mechanism and arranged to engage said conductor, said contact means being rotatably connected to said mechanism; and means to prevent the contact means from rotating when the mechanism turns.

117. A winder having, in combination, two parallel rows of winder units; a support above said rows of units; a mechanism carried by and arranged to travel along said support for operating upon the units, said mechanism being arranged to turn through a half revolution at one end of said support; a motor traveling with said mechanism for driving the latter; a stationary electrical conductor extending longitudinally of and centrally between the rows of units and approximately in the horizontal plane of the support; and contact means carried by said mechanism and arranged to engage said conductor.

118. A winder having, in combination, a plurality of winder units; a winder-tending mechanism arranged to travel around the winder and operate on said units, and means for automatically stopping and starting the travel of said mechanism.

119. A winder having, in combination, a plurality of winder units arranged in two parallel rows; a winder-tending mechanism arranged to travel around the winder and operate on said units; and means at one end of said rows for automatically stopping and starting the travel of said mechanism.

120. A winder having, in combination, a plurality of winder units; a winder-tending mechanism arranged to travel around the winder and operate on said units; means for automatically stopping the travel of said mechanism; means for automatically causing resumption of travel of said mechanism; and means for adjusting the last mentioned means to vary the time of operation thereof.

121. A winder having, in combination, a plurality of winder units; a winder-tending mechanism arranged to travel around the winder and operate on said units; a motor for actuating said mechanism; a switch for opening the motor circuit; a device traveling with said mechanism for operating said switch to open the circuit; and automatic means for closing a shunt circuit around said switch.

122. A winder having, in combination, a plurality of winder units arranged in two parallel rows; a winder-tending mechanism arranged to travel around the winder and operate on said units; a motor for actuating said mechanism; a switch at one end of said rows for opening the motor circuit; a device traveling with said mechanism for operating said switch to open the circuit; and means for closing a shunt circuit around said switch.

123. A winder having, in combination, a plurality of winder units; a winder-tending mechanism arranged to travel around the winder and operate on said units; a motor for actuating said mechanism; a switch for opening the motor circuit; a device traveling with said mechanism for operating said switch to open the circuit; and means actuated by the winder for closing a shunt circuit around said switch.

124. A winder having, in combination, a plurality of winder units; a traveling winder-tending mechanism arranged to travel around the winder and operate on said units; a motor for actuating said mechanism; a switch for opening the motor circuit; a device traveling with said mechanism for operating said switch to open the circuit; and adjustable means actuated by the winder for closing a shunt circuit around said switch.

125. A winder having, in combination, a plurality of winder units; a winder-tending mechanism arranged to travel around the winder and operate on said units; a motor for actuating said mechanism; means actuated by said mechanism for opening the motor circuit; a shunt circuit around said circuit-opening means; a switch in said shunt circuit, means tending to open said switch;

means actuated by the winder for closing said switch; and means actuated by the winder-tending mechanism for disconnecting said switch-closing means from the switch so as to permit the operation of the means which tends to open said switch.

126. A winder having, in combination, a plurality of winder units; a winder-tending mechanism arranged to travel along the winder and operate on said units, said mechanism comprising an air tube and an air-current-creating means and means for automatically starting and stopping said current-creating means.

127. A winder having, in combination, a plurality of winder units arranged in two parallel rows; a winder-tending mechanism arranged to travel around the winder and operate on said units; means for guiding said mechanism around the end of the winder, said mechanism comprising an air tube and an air-current-creating means; and means for suspending the operation of said air-current-creating means while said mechanism is traveling around the end of the winder.

128. A winder-tending mechanism having, in combination, an end finder; a knotter; an arm for carrying a strand into the knotter; means for carrying the strand from the end finder to said arm; a member provided with a clamping device, said arm being adapted to coöperate with said clamping device to clamp the thread; means whereby a reserve thread is placed in the knotter; and means for moving said arm and said member to strip the knot from the knotter.

129. A winder-tending mechanism having, in combination, an end finder; a knotter; an arm for carrying a strand into the knotter; means for carrying the strand from the end finder to said arm; a member provided with a clamping device, said arm being adapted to coöperate with said clamping device to clamp the thread; means whereby a reserve thread is placed in the knotter; means for moving said arm and said member to strip the knot from the knotter; and a relatively stationary part across which the united threads are pulled in the stripping operation.

130. A winder having, in combination, a knotter; an element for carrying a strand into the knotter; a member provided with a clamping device, said element being adapted to coöperate with said clamping device to clamp the thread; means whereby a reserve thread is placed in the knotter; and means for moving said element and said member to strip the knot from the knotter.

131. In combination, a knotter; an element for carrying a strand into the knotter; a member provided with a clamping device, said element being adapted to coöperate with said clamping device to clamp the thread; means whereby a reserve thread is placed in the knotter; means for moving said element and said member to strip the knot from the knotter; and a relatively stationary part across which the united threads are pulled in the stripping operation.

132. A winder having, in combination, a tying bill, a thread clamp at one side of the tying bill, a clamping device at the other side of the tying bill, means whereby a thread is positioned at the tying bill in the thread clamp and at the clamping device, and a device for placing another thread at the tying bill and in the thread clamp and for inserting both threads into the clamping device, said clamping device and placing device being movable to tighten the knot and strip it from the tying bill.

133. The combination of a bobbin-holder, a reserve-bobbin support mounted for oscillation above the bobbin-holder, means to swing the reserve-bobbin support out from under the reserve-bobbin to dump the bobbin into the bobbin-holder, and means to swing the reserve-bobbin support back to normal position.

134. The combination of a stationary bobbin-holder having an open upper side and adapted to rotatably support a warp bobbin, a device to close the upper side of the bobbin-holder, and means to move the device into and out of closing position.

135. A winder having, in combination, a side-delivery bobbin-holder adapted to rotatably support a warp bobbin while being unwound, said bobbin-holder having an open upper side, a reserve bobbin support above the bobbin-holder, and means to swing the reserve-bobbin support to uncover the upper side of the bobbin-holder and to discharge a bobbin into the bobbin-holder.

136. A winder having, in combination, a series of pivoted bobbin supports, a member movable along the series for successively moving the supports to discharge bobbins therefrom, and a member movable along the series for restoring the supports to normal position.

137. A winder having, in combination, a series of movable bobbin supports, a member movable along the series for successively moving the supports to discharge bobbins therefrom, and means for restoring the supports to normal position.

138. A winder having, in combination, a series of pivoted bobbin supports, a crank arm connected to each support, a member arranged to move along the series of supports for moving the crank arms successively in one direction, and means arranged to travel along the series for successively moving the crank arms in the opposite direction.

139. A winder having, in combination, a series of movable bobbin supports, a member connected to each support, a device arranged to move along the series of supports for moving the members successively in one direction, and means arranged to travel along the series for successively moving the members in the opposite direction.

140. A winder having, in combination, a series of pivoted bobbin supports, each support having a crank arm, a cam arranged to travel along the series for successively moving the crank arms in one direction, and a yieldable member traveling with said cam against which the crank arms bear as said crank arms are moved by the cam, said member serving to move the crank arms successively in the opposite direction after the cam has passed the respective crank arms.

141. A winder having, in combination, a series of movable bobbin supports, each support having an operating member, a cam arranged to travel along the series for successively moving said members in one direction, and a spring-pressed arm traveling with said cam against which the said members bear as said members are moved by the cam, said arm serving to move the members successively in the opposite direction after the cam has passed the respective members.

142. A winder having, in combination, a series of pivoted bobbin supports, and a member arranged to travel along the series for successively moving the supports to discharge bobbins therefrom, said member being arranged to shake the supports while the supports are in discharging position.

143. A winder having, in combination, a series of pivoted bobbin supports, a member arranged to travel along the series for successively moving the supports to discharge bobbins therefrom, said member having an inclined portion for pivotally moving the supports and a wavy edge to cause vibration of the supports.

144. A winder having, in combination, a support for a yarn mass; a suction air tube; means to produce relative movement between the yarn mass and the mouth of the air tube with said mouth and the periphery of the yarn mass in close proximity; a thread-severing device reciprocable across the mouth of the tube and located within said tube out of the way of the yarn mass; and a stationary severing device coacting with the reciprocable device and located within the tube.

145. A winder having a plurality of supports for yarn-receiving carriers; supports for an active and a reserve thread supply for each receiving carrier; and means for rotating each receiving carrier; in combination with a traveling winder-tender coöperating in timed relation and in succession with each of said carriers and its wound and reserve threads, said winder-tender having the following characteristics, namely, a wound-end finder; means to move the carriers in succession away from their rotating means and into coöperation with the end finder; a knotter acting to tie a reserve thread to the end of a thread extending from a wound-yarn mass; means to transfer the found end of a wound yarn-mass within reach of the knotter; means for restoring the carriers in succession to winding position after the tying; and means to prevent tying when the tender travels past a fully-wound yarn-mass.

146. A winder having a plurality of supports for yarn-receiving carriers; supports for an active and a reserve thread supply for each receiving carrier; and means for rotating each carrier; in combination with a traveling winder-tender coöperating in timed relation and in succession with each of said carriers and its wound and reserve threads, said winder-tender having the following characteristics, namely, a wound-end finder; means to move the carriers in succession away from their rotating means and into coöperation with the end finder; a knotter acting to tie a reserve thread to the end of a thread extending from a wound yarn-mass; means to transfer the found end of a wound yarn-mass within reach of the knotter; and means for restoring the carriers in succession to winding position after the tying.

147. A winder having a plurality of supports for yarn-receiving carriers; supports for an active and a reserve thread supply for each receiving carrier; and means for rotating each carrier until after the active thread supply thereof is exhausted; in combination with a traveling winder-tender coöperating in timed relation and in succession with each of said carriers and its wound and reserve threads, said winder-tender having the following characteristics, namely, means to stop the rotation of the carriers; a thread-uniter acting to unite a reserve thread and the end of a thread extending from a wound yarn mass; and means for causing the winding to be resumed.

148. A winder having a support for a yarn-receiving carrier; supports for an active and a reserve thread supply for said carrier; and means for rotating said carrier; in combination with a winder-tender coöperating in timed relation with said carrier and its wound and reserve threads; said winder-tender having the following characteristics, namely, means to stop the rotation of the carrier; a thread-uniter acting to tie a reserve thread to the end of the thread extending from the wound yarn-mass; and means for causing the winding to be resumed.

149. A winder having, in combination, a row of winder units, each including a movable supply yarn-mass support, a carriage arranged to travel along the row of units, and a device on the carriage to move said supports out of operative position.

150. A winder having, in combination, a row of winder units, each including a movable reserve yarn mass support, and a cam arranged to travel along the row of units into engagement with successive supports to move said supports out of operative position.

151. A winder having, in combination, a row of winder units, a carriage arranged to travel along the row of units, and means on the carriage for selectively operating upon the units.

In testimony whereof, I have hereunto set my hand.

HOWARD D. COLMAN.

It is hereby certified that in Letters Patent No. 1,267,977, granted May 28, 1918, upon the application of Howard D. Colman, of Rockford, Illinois, for an improvement in "Winders," errors appear in the printed specification requiring correction as follows: Page 7, line 24, for the word "yard" read *yarn;* page 8, line 82, before the word "arrow" insert the article *the;* same page, line 117, after the word "snap" insert the word *switch;* page 9, line 90, for the word "separtor" read *separator;* page 19, line 37, for the word "axhausted" read *exhausted;* page 25, strike out line 45 and insert the words *movable in one direction to follow said arm;* and that the said Letters Patent should be read with these corrections therein that the same may conform to the record of the case in the Patent Office.

Signed and sealed this 2d day of July, A. D., 1918.

[SEAL.]

F. W. H. CLAY,

*Acting Commissioner of Patents.*

Cl. 242—44.